(12) United States Patent
Zheng et al.

(10) Patent No.: US 8,404,379 B2
(45) Date of Patent: Mar. 26, 2013

(54) VEHICLE WITH A BATTERY SYSTEM

(75) Inventors: Weixin Zheng, Shenzhen (CN); Jianhua Zhu, Shenzhen (CN); Xi Shen, Shenzhen (CN)

(73) Assignee: BYD Co., Ltd., Shenzhen (CN)

( * ) Notice: Subject to any disclaimer, the term of this patent is extended or adjusted under 35 U.S.C. 154(b) by 638 days.

(21) Appl. No.: 12/341,773

(22) Filed: Dec. 22, 2008

(65) Prior Publication Data

US 2009/0162744 A1 Jun. 25, 2009

(30) Foreign Application Priority Data

| Dec. 25, 2007 | (CN) | 2007 2 0196395 |
| Jun. 30, 2008 | (CN) | 2008 2 0116496 |
| Aug. 7, 2008 | (CN) | 2008 1 0135477 |
| Aug. 7, 2008 | (CN) | 2008 1 0135478 |
| Aug. 14, 2008 | (CN) | 2008 1 0145734 |
| Aug. 26, 2008 | (CN) | 2008 1 0142080 |
| Aug. 26, 2008 | (CN) | 2008 1 0142082 |
| Aug. 26, 2008 | (CN) | 2008 1 0142083 |
| Aug. 26, 2008 | (CN) | 2008 1 0142084 |
| Aug. 26, 2008 | (CN) | 2008 1 0142085 |
| Aug. 26, 2008 | (CN) | 2008 1 0142086 |
| Aug. 26, 2008 | (CN) | 2008 1 0142087 |
| Aug. 26, 2008 | (CN) | 2008 1 0142088 |
| Aug. 26, 2008 | (CN) | 2008 1 0142089 |
| Aug. 26, 2008 | (CN) | 2008 1 0142090 |
| Aug. 26, 2008 | (CN) | 2008 2 0146848 |
| Aug. 26, 2008 | (CN) | 2008 2 0146849 |
| Aug. 26, 2008 | (CN) | 2008 2 0146851 |
| Oct. 10, 2008 | (CN) | 2008 1 0217018 |

(51) Int. Cl.
*H01M 6/46* (2006.01)

(52) U.S. Cl. ......... 429/152; 429/153; 429/170; 429/120

(58) Field of Classification Search ................ 429/152, 429/153, 170, 120
See application file for complete search history.

(56) References Cited

U.S. PATENT DOCUMENTS

| 6,377,432 | B1 | 4/2002 | Hashimoto | |
| 2002/0146620 | A1 | 10/2002 | Connell | |
| 2003/0134189 | A1 | 7/2003 | Kanai et al. | |
| 2005/0214634 | A1 | 9/2005 | Kim | |
| 2005/0238930 | A1 | 10/2005 | Yoshida et al. | |
| 2005/0277019 | A1 | 12/2005 | Riley, Jr. et al. | |
| 2006/0096797 | A1* | 5/2006 | Tsuchiya | 180/68.5 |
| 2006/0110657 | A1 | 5/2006 | Stanton et al. | |
| 2007/0196728 | A1* | 8/2007 | Yang | 429/120 |

FOREIGN PATENT DOCUMENTS

| CN | 1185664 A | 6/1998 |
| CN | 1241305 A | 1/2000 |

(Continued)

*Primary Examiner* — Jane Rhee

(74) *Attorney, Agent, or Firm* — Brinks Hofer Gilson & Lione

(57) ABSTRACT

A battery system for a vehicle capable of being driven by electric power is disclosed. The vehicle includes at least one motor/generator and a battery system for supplying electrical power to and receiving electrical power from the motor/generator. The battery system includes multiple battery packs, each comprising a plurality of cells. The plurality of cells in each battery pack are electrically connected with one another. Multiple battery pack housings are provided to house the plurality of cells. Each battery pack housing facilitates electrical connection to one or more other battery pack. The system also includes a compartment containing the multiple battery packs in their housings. The compartment facilitates electrical connection to the motor/generator.

20 Claims, 45 Drawing Sheets

FOREIGN PATENT DOCUMENTS

| | | |
|---|---|---|
| CN | 2433734 Y | 6/2001 |
| CN | 1319901 A | 10/2001 |
| CN | 97117532.2 | 7/2002 |
| CN | 1442927 A | 9/2003 |
| CN | 97120801.8 | 12/2003 |
| CN | 200420026421.3 | 4/2004 |
| CN | 1497753 A | 5/2004 |
| CN | 200420034061.1 | 6/2004 |
| CN | 1540792 A | 10/2004 |
| CN | 2679860 Y | 2/2005 |
| CN | 1604357 A | 4/2005 |
| CN | 1610168 | 4/2005 |
| CN | 200520071106.7 | 4/2005 |
| CN | 2704119 Y | 6/2005 |
| CN | 2717037 | 8/2005 |
| CN | 2717038 Y | 8/2005 |
| CN | 1716658 A | 1/2006 |
| CN | 1738096 A | 2/2006 |
| CN | 1750295 | 3/2006 |
| CN | 03103954.5 | 3/2006 |
| CN | 1773747 A | 5/2006 |
| CN | 1783576 | 6/2006 |
| CN | 1841820 A | 10/2006 |
| CN | 1841831 A | 10/2006 |
| CN | 1841834 A | 10/2006 |
| CN | 1855608 A | 11/2006 |
| CN | 2849999 Y | 12/2006 |
| CN | 1941458 A | 4/2007 |
| CN | 1949580 A | 4/2007 |
| CN | 1976095 Y | 6/2007 |
| CN | 101088192 A | 12/2007 |
| CN | 200993972 Y | 12/2007 |
| CN | 200510092257.5 | 2/2008 |
| EP | 1780819 A1 | 5/2007 |
| JP | 5-21086 | 1/1993 |
| JP | 7-169452 A | 7/1995 |
| JP | 11067278 A | 3/1999 |
| JP | 11-204130 A | 7/1999 |
| JP | 11-312512 A | 9/1999 |
| JP | 2001085042 A | 3/2001 |
| JP | 2001-126683 | 5/2001 |
| JP | 2001-283940 A | 10/2001 |
| JP | 2001338628 A | 12/2001 |
| JP | 2002-260745 A | 9/2002 |
| JP | 2002-329530 | 11/2002 |
| JP | 2006-173095 | 11/2002 |
| JP | 2003 168405 A | 6/2003 |
| JP | 2003288882 A | 10/2003 |
| JP | 2004-253262 | 9/2004 |
| JP | 2004-327311 | 11/2004 |
| JP | 2005-71640 A | 3/2005 |
| JP | 2005-190885 | 7/2005 |
| JP | 2005-251617 | 9/2005 |
| JP | 2006-79960 A | 3/2006 |
| JP | 2006-294531 A | 10/2006 |
| JP | 2007-194035 A | 8/2007 |
| JP | 2008-123800 | 5/2008 |
| JP | 2008-181765 | 8/2008 |
| JP | 2008-181822 | 8/2008 |
| KR | 2001057628 A * | 7/2001 |
| WO | WO 2008/144994 A1 | 12/2008 |

\* cited by examiner

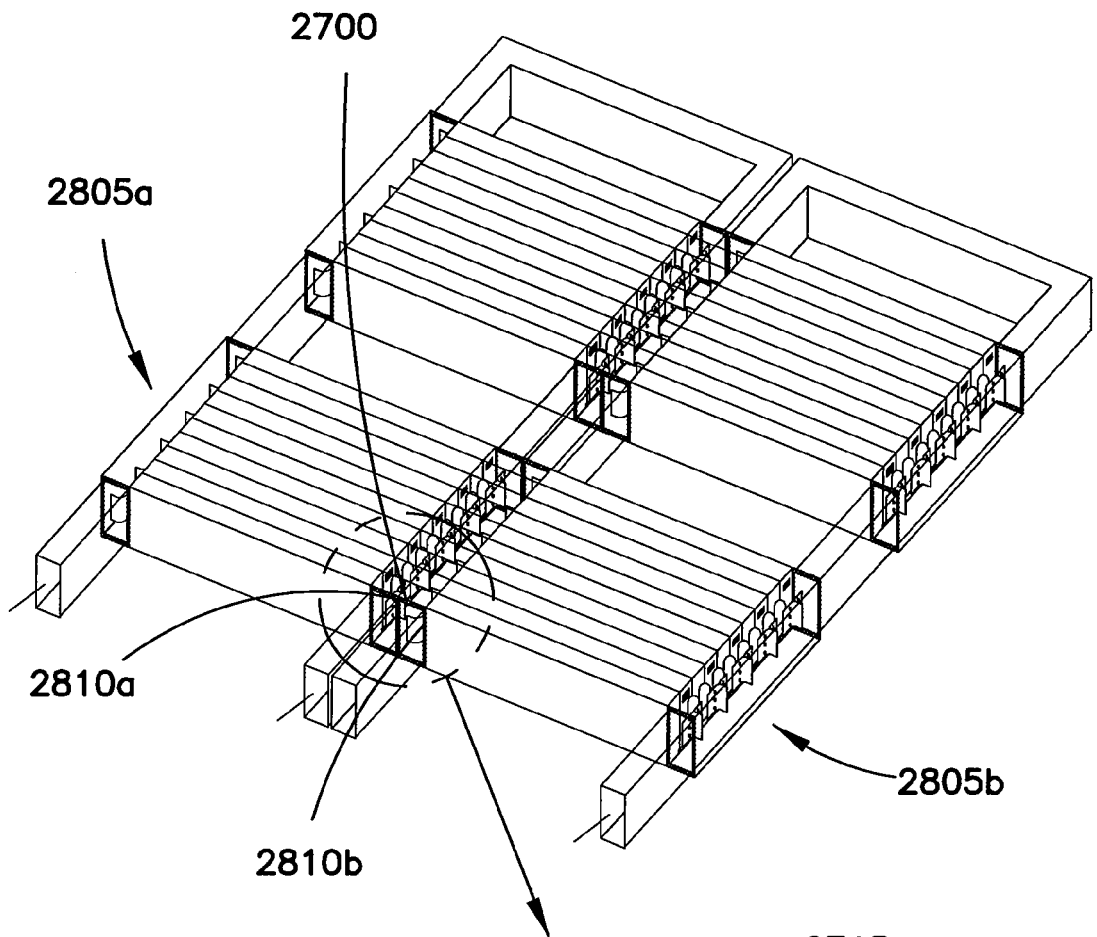
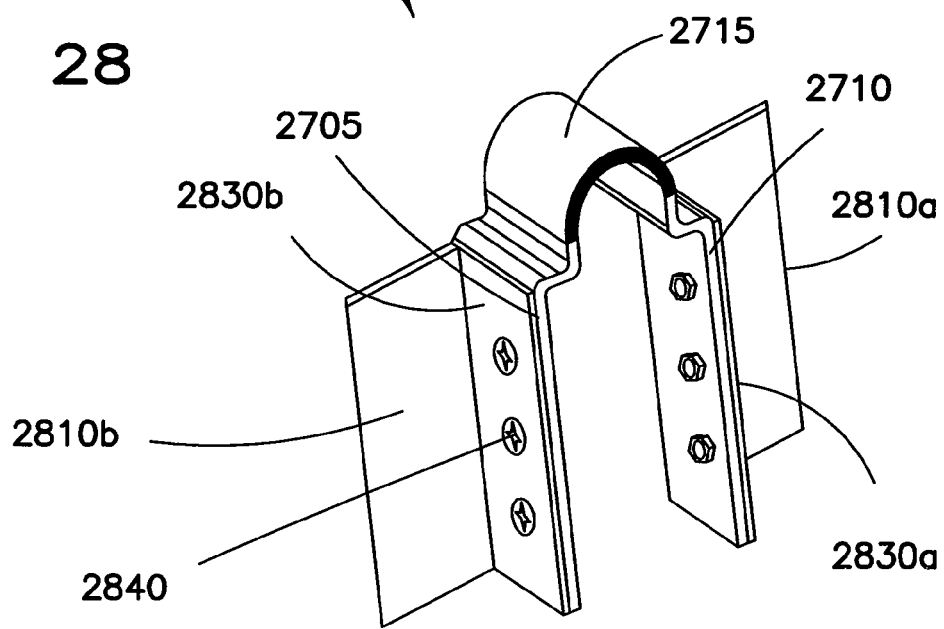
FIG. 28

| Number of battery cycles | Battery capacity after cycles (Ah) | | Capacity ratio with respect to original capacity | | Maximum temperature of anode connector °C | | Maximum temperature of cathode connector °C | | Maximum temperature at core center °C | |
|---|---|---|---|---|---|---|---|---|---|---|
| | A | B | A | B | A | B | A | B | A | B |
| 1 | 50 | 50 | 100% | 100% | 55.3 | 44.8 | 63.5 | 51.5 | 41.5 | 35.3 |
| 10 | 47.5 | 49 | 95% | 98% | 54.6 | 43.9 | 64.2 | 52.3 | 41.6 | 34.8 |
| 200 | 46.35 | 48.25 | 92.79% | 96.5% | 56.2 | 45.0 | 63.6 | 53.2 | 40.8 | 36.6 |
| 500 | 44.05 | 46.75 | 88.1% | 93.5% | 58.6 | 45.3 | 65.7 | 52.8 | 42.2 | 33.5 |
| 1000 | 41.75 | 45.25 | 83.5% | 90.5% | 55.9 | 43.4 | 65.8 | 51.6 | 43.6 | 35.3 |

FIG. 34

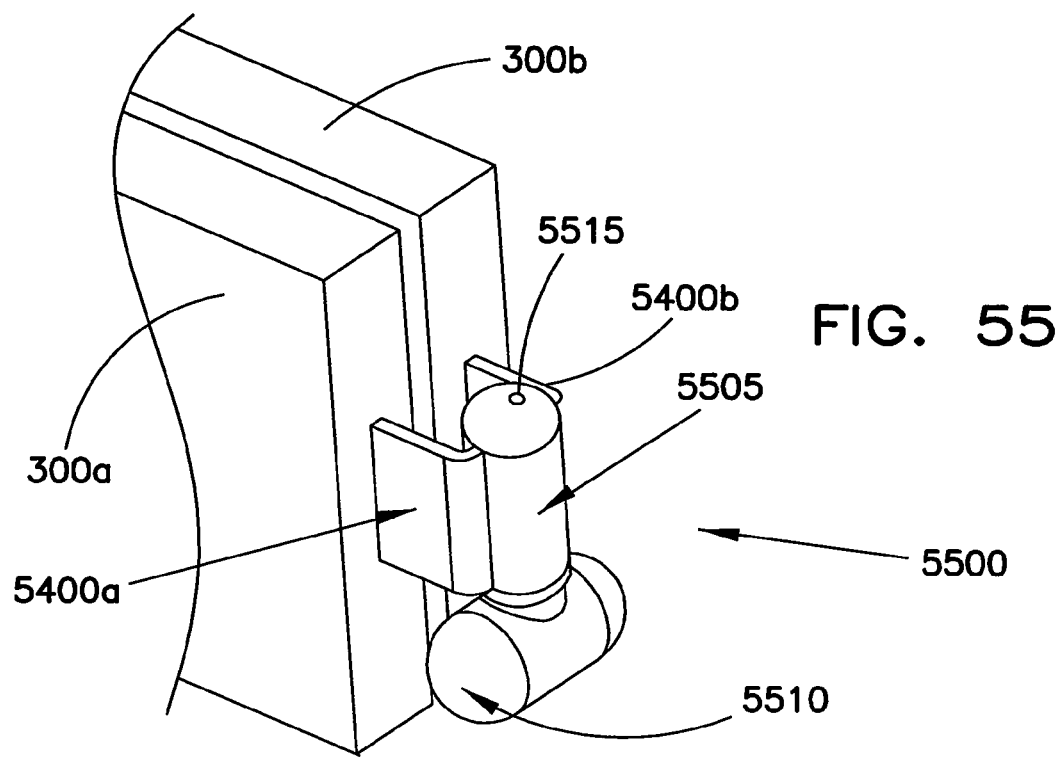
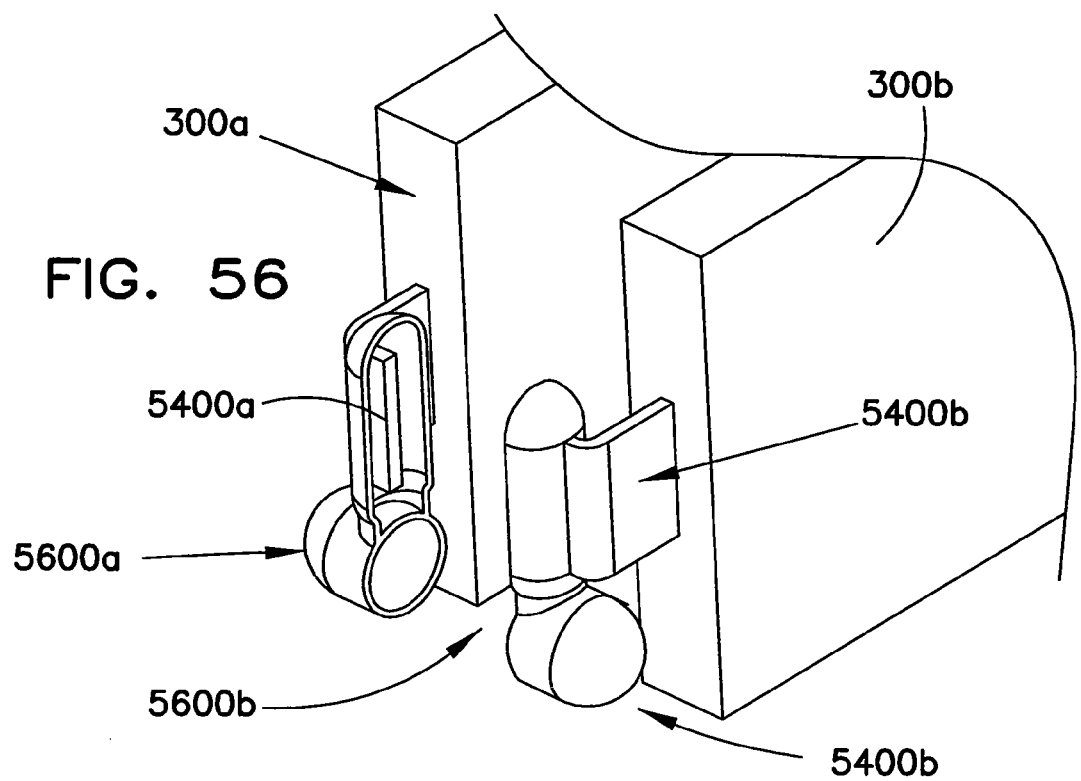

VEHICLE WITH A BATTERY SYSTEM

PRIORITY CLAIM

The present application claims priority to the following Chinese Patent Applications, which are hereby incorporated by reference:
1) Chinese Patent Application No. 200810217018.1, filed Oct. 10, 2008;
2) Chinese Patent Application No. 200820116496.9, filed Jun. 30, 2008;
3) Chinese Patent Application No. 200810145734.3, filed Aug. 14, 2008;
4) Chinese Patent Application No. 200810135478.X, filed Aug. 7, 2008;
5) Chinese Patent Application No. 200810135477.5, filed Aug. 7, 2008;
6) Chinese Patent Application No. 200810142082.8, filed Aug. 27, 2008;
7) Chinese Patent Application No. 200810142090.2, filed Aug. 27, 2008;
8) Chinese Patent Application No. 200820146848.5filed Aug. 27, 2008;
9) Chinese Patent Application No. 200820146851.7, filed Aug. 27, 2008;
10) Chinese Patent Application No. 200820146849.X, filed Aug. 27, 2008;
11) Chinese Patent Application No. 200810142084.7, filed Aug. 27, 2008;
12) Chinese Patent Application No. 200810142085.1, filed Aug. 27, 2008;
13) Chinese Patent Application No. 200810142089.X, filed Aug. 27, 2008;
14) Chinese Patent Application No. 200810142086.6, filed Aug. 27, 2008;
15) Chinese Patent Application No. 200810142087.0, filed Aug. 27, 2008;
16) Chinese Patent Application No. 200810142088.5, filed Aug. 27, 2008;
17) Chinese Patent Application No. 200810142080.9, filed Aug. 27, 2008;
18) Chinese Patent Application No. 200810142083.2, filed Aug. 27, 2008. and
19) Chinese Patent Application No. 200720196395.2, filed Dec. 25, 2007.

BACKGROUND

1. Technical Field

The present application is directed to battery cells and systems and, more particularly, to lithium ion battery cells and systems that may be used in a vehicle, such as an electric and/or hybrid vehicle, having an electric drive motor.

2. Related Art

Re-chargeable batteries, such as lithium ion polymer batteries, have a wide range of applications. These include, for example, laptop batteries, cell phone batteries, as well as power for other personal electronic devices. Such devices require low weight batteries having a moderate power output. However, lithium ion polymer batteries are also capable of providing power to devices needing substantially more power output than the personal electronic devices noted above. For example, high output lithium ion polymer batteries may be used to power industrial equipment, high power communications facilities, mobile vehicles, etc. The use of high output lithium ion polymer battery systems may be particularly significant in the area of mobile vehicle propulsion.

The public has become increasingly sensitive to cost and environmental issues associated with the use of fossil-based fuels. One concern is the emissions from vehicles burning fossil-based fuels and the corresponding pollution.

Alternatives to such vehicles include electric vehicles that are solely driven by electric motors, and hybrid electric vehicles that employ both electric motors and fossil-based fuel engines. These alternatives are likely to play an increasingly important role as substitutes for current vehicles.

Although consumers are attracted to the environmental benefits of pure electric and hybrid vehicles, they want vehicles which use electric motors to have the same general characteristics as their fossil-fuel counterparts. Battery performance and safety issues must be overcome to achieve these goals. To this end, lithium ion batteries are preferable to other more conventional battery types. Lithium ion batteries are useful for this purpose in that they have a high energy density which reduces the amount of space needed for the battery in the vehicle. Further, they may be constructed so that they weigh less than the more conventional battery types.

Battery systems for use with electric motors employed in pure electric and hybrid vehicles are currently deficient in many respects. Individual battery cells of the battery system are frequently heavy, bulky, and unreliable. Further, current battery cells are neither constructed nor used to effectively provide the high power output needed to accelerate the vehicle at an acceptable acceleration level. Still further, individual battery cells use electrochemistry, cell core constructions, electrical interconnections, and shell constructions that are often unreliable, unsafe, and generally not suitable for use in electrical powered vehicles.

To overcome the power deficiencies associated with individual battery cells, attempts have been made to interconnect multiple individual battery cells with one another so that their combined power output provides the necessary driving power. The interconnections between the individual battery cells, again, are often unreliable. Further, little has been accomplished to ensure the safety of such multi-cell battery systems. Short-circuits as well as explosions have not been adequately addressed. High power output battery systems must be constructed to address issues such as performance, longevity, reliability, and safety if they are to find a place in the large number of applications available to such systems.

SUMMARY

A battery system for a vehicle capable of being driven by electric power is disclosed. The vehicle includes at least one motor/generator and a battery system for supplying electrical power to and receiving electrical power from the motor/generator. The battery system includes multiple battery packs, each comprising a plurality of cells. The plurality of cells in each battery pack are electrically connected with one another. Multiple battery pack housings are provided to house the plurality of cells. Each battery pack housing facilitates electrical connection to one or more other battery pack. The system also includes a compartment containing the multiple battery packs in their housings. The compartment facilitates electrical connection to the motor/generator.

BRIEF DESCRIPTION OF THE DRAWINGS

The invention can be better understood with reference to the following drawings and description. The components in the figures are not necessarily to scale, emphasis instead being placed upon illustrating the principles of the invention.

Moreover, in the figures, like referenced numerals designate corresponding parts throughout the different views.

FIG. 28 shows how the connector of FIG. 27 may be used.

FIGS. 30 through 34 illustrate advantages associated with providing connections to the anode and cathode of a coiled core at opposite ends of the core.

FIGS. 54-60 illustrate battery cell interconnection structures having overcurrent protection substructures based on electrical connections/disconnections provided by the presence/absence of a liquid conductor.

DETAILED DESCRIPTION OF THE PREFERRED EMBODIMENTS

Lithium-ion polymer batteries are a type of rechargeable battery in which a lithium ion moves between an anode and cathode. The lithium ion moves from the anode to the cathode during discharge and from the cathode to the anode when charging.

Figure 1:
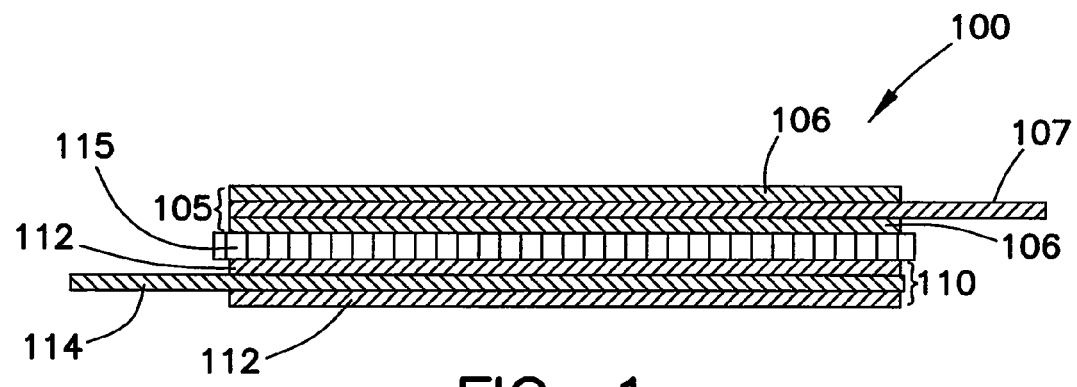
FIG. 1 is a cross-sectional view through an exemplary multilayer battery sheet that may be used to form a coiled battery core.

FIG. 1 is a cross-sectional view through an exemplary multilayer battery sheet 100 that may be wound to form a coiled battery core. The battery sheet 100 of FIG. 1 includes three functional components: an anode sheet 105, a cathode sheet 110, and a separator sheet 115. The anode sheet 105 may include active anode layers 106 disposed on opposite sides of an anode substrate 107. The anode substrate 107 may be formed from one or more layers of a metal foil, such as copper. The active anode layers 106 may be formed from graphite or other carbon-based material. In one example, active layers 106 of the anode sheet 105 may be produced using 100 grams of natural graphite with 3 grams of polyvinylidene fluoride (PVDF) binder material and 3 grams of acetylene black conductive agent to 100 grams of NI-methylpyrrolidone (NMP). The components may be mixed in a vacuum mixer into a uniform slurry. The slurry may be applied as a coating of about 12 microns thick to each side of substrate 107, such as a copper foil, to form a structure having a combined layer thickness of about 100-110 μm. The coated foil may then be dried at a temperature of about 90° C. to form the anode 115.

The cathode sheet 110 may include active cathode layers 112 disposed on opposite sides of a cathode substrate 114. The cathode substrate 114 may be formed from one or more layers of a metal foil, such as aluminum. The active cathode layers 112 may be formed from materials such as a layered oxide (e.g., lithium cobalt oxide), a material based on a polyanion (e.g., lithium iron phosphate), or a spinel (e.g., lithium manganese oxide), although materials such as $TiS_2$ (titanium disulfide) may also be used.

In one example, the active layers 112 of the cathode sheet 110 may be formed by combining at least one lithium metal compound with at least one mixed metal crystal, wherein the mixed metal crystal includes a mixture of metal elements and metal oxides. The lithium compound may be a metal intercalation compound that has the general formula $LiM_aNbX0_c$, wherein M is a first-row transition metal such as Fe, Mn, Ni, V, Co and Ti; N is a metal selected from the group Fe, Mn, Ni, V, Co, Ti, Mg, Ca, Cu, Nb, Zr and rare-earth metals; X is selected from elements P, Si, S, V and Ge; and a, b and c have values that render the metal intercalation compound charge-neutral. The metal compound may have the general formula $M_cNd$, wherein M is a metal selected from IA, 11A, IIIA, IVA, VA, IIIB, IVB and VB groups in the periodic table; N is selected from O, N, H, S, SO4, PO4, OH, Cl, F, and C; and 0<c5.4 and 0<d56. In other instances, the metal compound may include one or more members selected from the group consisting of MgO, SrO, $Al_2O_3$, $SnO_2$, $Sb_2O_3$, $Y_2O_3$, $TiO_2$ and V200. The metal compound and the lithium compound may be heated or sintered at about 600-900° C. in an inert gas or reducing gas atmosphere for about 2 hours to form the material for the cathode sheet 110.

In a further example, the metal compound may be formed as a mixed crystal compound with the general formula $LiaA1_{-y}B_y(X04)b/McNd$, wherein: A is a first-row transition metal including Fe, Mn, Ni, V, Co and Ti; B is a metal selected from the group Fe, Mn, Ni, V, Co, Ti, Mg, Ca, Cu, Nb, Zr and rare-earth metals; X is selected from elements P, Si, S, V and Ge; M is metal selected from groups IA, IIA, IIIA, IVA, VA, IIIB, IVB and VB of the periodic table; N is selected from O, N, H, S, SO4, PO4, OH, Cl, F and C; and wherein 0<a51, 05y50.5, 0<b51, 0<c5.4 and 0<d56. Particle sizes may be less than about 10 um, with 3-5 um being preferable.

The active cathode material may include a first crystalline compound and a second crystalline compound. The first crystalline compound may be distributed within the second crystalline compound to form a composite compound. The first crystalline compound may be prepared by heating a combination of at least one lithium source, at least one iron source, and at least one phosphate source while the second crystalline compound may be prepared by heating at least two metal compounds. The second crystalline compound may also include one or more members selected from groups IA, IIA, IIIA, IVA, VA, IIIB, IVB and VB of the periodic table.

During formation of the active cathode material, a large number of crystal defects may be introduced within the intermediary or composite crystals such that the electronic states and formation of the metal oxides are altered or changed. The metal compound with its mixed crystalline structure, therefore, may include a large number of oxygen vacancies and missing oxygen atoms. The oxygen vacancies may facilitate carrier conduction thereby enhancing the conductivity of the mixed crystal. To this end, the metal compound may have a smaller crystal lattice than the lithium compound so that it is received or distributed within the lithium compound. Alternatively, the metal compound may be received or distributed between two or more large crystal lattices. Still further, the metal compound may reside within grain boundaries of the lithium compound. Lastly, the metal compound may be dispersed about the exterior grain surfaces of the lithium compound. In each instance, lithium ion migration serves as a bridge either within a crystal lattice or in between two or more crystal lattices. The lithium ions may be fully released for enhanced electrical properties including electrical conductance, capacitance and recyclability.

Preferably, the metal compound may be distributed within a lithium iron phosphate compound to form a composite compound for use in the cathode sheet 110. The metal compound may be distributed within the lithium iron phosphate compound to form a mixed crystal. In one instance, the lithium iron phosphate compound and the metal compound may have molar ratios of about 1 to 0.001-0.1. The cathode material may be doped with carbon additives scattered between grain boundaries or coated on the grain surfaces. The doped carbon additive may provide the final cathode material product with 1-15% of carbon by weight. The carbon additive may include one or more members selected from the group consisting of carbon black, acetylene black, graphite and carbohydrate compound.

The composite compound may include a lithium source, iron source, phosphate source and second crystalline compound having a Li:Fe:P:crystalline compound molar ratios of about 1:1:1:0.001-0.1. In other instances, various Li:Fe:P: crystalline compound molar ratios may be adopted. The lithium source may include one or more members selected from the group consisting of lithium carbonate, lithium hydroxide, lithium oxalate, lithium acetate, lithium fluoride, lithium chloride, lithium bromide, lithium iodide and lithium dihydrogen phosphate. The iron source may include one or more members selected from the group consisting of ferrous oxalate, ferrous acetate, ferrous chloride, ferrous sulfate, iron phosphate, ferrous oxide, ferric oxide, iron oxide and ferric phosphate. The phosphate source may include one or more members selected from the group consisting of ammonium, ammonium phosphate, ammonium dihydrogen phosphate, iron phosphate, ferric phosphate and lithium hydrogen phosphate.

A method of preparing a mixed crystal lithium iron phosphate cathode material includes evenly mixing at least one LiFePO4 compound with a mixture compound and heating the resulting mixture to 600-900° C. in an inert gas or reducing gas atmosphere for between about 2-48 hours. The mixture compound may include two or more metal oxides wherein the metal can be selected from groups IA, IIA, IIIA, IVA, VA, IIIB, IVB and VB of the periodic table. The mixture compound provides a mixed crystalline structure, wherein a method of preparing the mixture compound with the corresponding mixed crystalline structure includes mixing metal oxides from groups IA, IIA, IIIA, IVA, VA, IIIB, IVB and VB, and heating the mixture to 600-1200° C. for between 2-48 hours.

One method of preparing a mixed crystal cathode material includes evenly mixing lithium, iron and phosphate sources and heating them to 600-900° C. in an inert gas or reducing gas atmosphere for at least about 2 hours. The resulting mixture can then be combined with the mixed metal compound having a combination of two or more metal oxides selected from groups IA, IIA, IIIA, IVA, VA, IIIB, IVB and VB of the periodic table. In one embodiment, the lithium source, iron source, phosphate source and mixed metal compound are capable of providing Li:Fe:P:mixed metal compound molar ratios of 1:1:1:0.0010.1. In other embodiments, different Li:Fe:P:mixed metal compound molar ratios may be adopted. Furthermore, at least one carbon source can be added to the resulting mixture, the carbon source including one or more of the following without limitation: carbon black, acetylene black, graphite and carbohydrate compound. The amount of carbon source added to the resulting mixture should be able to provide the final product with 1-15% of carbon by weight.

The lithium sources used to form the cathode material may include one or more of the following compounds without limitation: lithium carbonate, lithium hydroxide, lithium oxalate, lithium acetate, lithium fluoride, lithium chloride, lithium bromide, lithium iodide and lithium dihydrogen phosphate. Iron sources include one or more of the following compounds without limitation: ferrous oxalate, ferrous acetate, ferrous chloride, ferrous sulfate, iron phosphate, ferrous oxide, ferric oxide, iron oxide and ferric phosphate. When using a trivalent iron compound as a source of iron, the ball milling process may include the addition of a carbon source to reduce the trivalent iron to a divalent iron. Phosphorous sources may include one or more of the following compounds without limitation: ammonium, ammonium phosphate, ammonium dihydrogen phosphate, iron phosphate, ferric phosphate and lithium hydrogen phosphate.

During the grinding in a ball mill, one or more solvents may be introduced including ethanol, DI water and acetone. In other, embodiments, other mixing media and solvents may be utilized. In addition, the mixture can be dried between 40-80° C. or stirred until dry.

The types of inert gases that may be utilized include helium, neon, argon, krypton, xenon, radon and nitrogen. Additionally, reducing gases including hydrogen and carbon monoxide can also be incorporated. Other suitable gases may also be adopted.

The cathode sheet 110 may be formed using a cathode slurry that includes one of the foregoing active cathode materials. The cathode slurry may be formed by mixing a thickener, the active cathode material, and a solvent. First, the thickener and the solvent are mixed to provide a colloidal solution. The resulting colloidal solution, residual solvent, and the active material are mixed in a double planetary mixer. A portion of the solvent as well as a binder are then provided to the planetary mixer for further mixing.

The colloidal solution, the active cathode material, and solvent may be mixed in the double planetary mixer in accordance with a specified mixing sequence. To this end, the colloidal solution, the active material, and the solvent may be mixed for about 3-5 minutes at a rotation frequency of about 2-20 Hz that decreases to a lower rotation frequency of about 0-2 Hz. Next, the colloidal solution, the active material, and the solvent may be mixed for about 30-50 minutes at a rotation frequency between about 35-60 Hz that decreases to a lower rotation frequency between about 35-60 Hz. At this point, the double planetary mixer may generate a vacuum lasting about 3-5 minutes so that the mixing takes place at a pressure of about 0.0005 MPa to about 0.05 MPa. The residual solvent and the adhesives are then added to the double planetary mixer and mixed for about 5-10 minutes at a rotation frequency of about 35-60 Hz that decreases to a lower rotation frequency between about 35-60 Hz. Again, the double planetary mixer may generate a vacuum lasting about 3-5 minutes so that the mixing takes place at a pressure of about 0.0005 MPa to about 0.05 MPa. The mixing then takes place between about 20-35 minutes at a rotation frequency that decreases from about 10-25 Hz to about 0 Hz.

The proportion by weight of the active material of cathode, the thickener, the adhesives and the solvent may be about 100: (0.05-10): (0.01-10): (50-150). The proportion by weight of the solvent mixed with the thickener may be about 60-90%. When mixed with the colloidal solution and active material, the proportion by weight of the solvent may be about 0.1-30%, and may be about 8-20% when with binder is added.

The cathode sheet 110 may be formed by coating a conductive substrate, such as an aluminum foil, with the slurry. The slurry may be applied onto the conductive substrate using a rolling operation, although other application methods may be employed. The conductive substrate and slurry are then dried to form the cathode sheet 110. The cathode sheet 110 preferably has a thickness between 100 and 110 µm, although other thicknesses may also be used.

The separator sheet 115 may be a micro-porous polypropylene and/or polyethylene electrolytic membrane. Such membranes are available from US Celgard of Charlotte, N.C.

With reference again to FIG. 1, the anode sheet 105 includes a region in which the substrate 107 of the anode sheet 105 does not include active anode layers 106. Rather, the copper substrate 107 is exposed to facilitate electrical connection with the anode sheet 105. The exposed region of substrate 107 extends substantially along the entire length of the anode sheet 105 so that the first edge of the anode sheet 105 defines a conductive region 107 when the battery sheet 100 is wound to form a coiled core 200 (see FIG. 2). The exposed region of substrate 107 may be formed by limiting the area to which the active anode layers 106 are applied to the substrate 107. Additionally, or alternatively, the exposed region of substrate 107 may be formed after the application of the active anode layers 106 by selectively removing the active anode layers 106 from the substrate 107 along a predetermined width of the anode sheet 105. This removal may be accomplished using a mechanical removal technique and/or chemical removal technique.

The cathode sheet 110 includes a region in which the substrate 114 of the cathode sheet 110 does not include active cathode layers 112. Rather, the aluminum substrate 112 is exposed to facilitate electrical connection with the cathode sheet 110. The exposed region of substrate 112 extends substantially along the entire length of the cathode sheet 110 so that an edge of the cathode sheet 110 defines a conductive region 114 when the battery sheet 100 is wound to form the coiled core 200 of FIG. 2A. The exposed region of substrate 114 may be formed by limiting the area to which the active cathode layers 112 are applied to the substrate 114. Additionally, or alternatively, the exposed region of substrate 114 may be formed after the application of the active cathode layers 112 by selectively removing the active cathode layers 112 from the substrate 114 along a predetermined width of the cathode sheet 110. This removal may be accomplished using a mechanical removal technique and/or chemical removal technique.

Figure 2A:
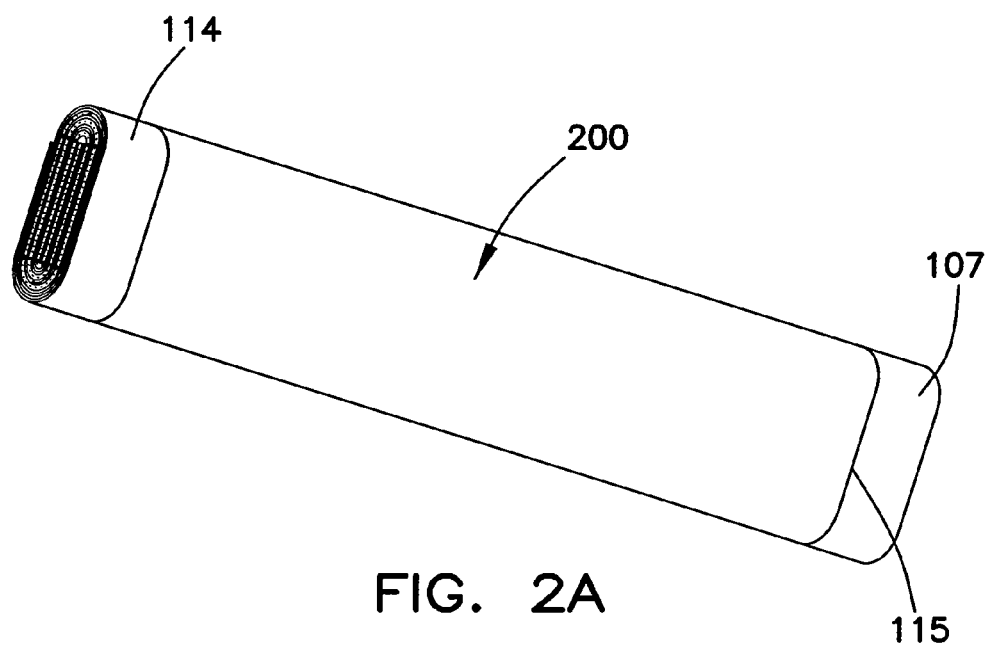
FIG. 2A is a perspective view of a flattened coiled core used in a battery cell.

As shown in FIG. 2A, the anode sheet 105, cathode sheet 110, and separator sheet 115 may be wrapped to form the coiled core 200. The exposed substrate 114 forms a multilayer current collector structure for the cathode of the coiled core 200 while the exposed substrate 107 forms a multilayer current collector structure for the anode of the coiled core 200. The current collector for the cathode and current collector for the anode are disposed at opposite ends of the length of the core 200 and provide low resistance contacts that may carry a substantial amount of current. Forming the current collectors at opposite sides of the coiled core 200 also simplifies the manufacturing process.

The current collectors may be formed in a number of different manners. For example, the current collectors may be formed solely from the exposed substrate layers. Additionally, or in the alternative, the current collectors may be formed by attaching a conductive ribbon of material along a length of each of the anode and cathode sheets, respectively, prior to or after winding.

The exterior layer of the coiled core 200 may be an insulator. In one example, the separator sheet 115 is longer than the anode sheet 105 and cathode sheet 110. As such, the anode sheet 105 and cathode sheet 110 are terminated in the wrapping operation before the end of the separator sheet 115 is reached. The excess length of the separator 105 is then wrapped about the core 200 a predetermined number of times (e.g., two or more) to form the exterior insulating layer 115. This construction simplifies the manufacturing of the core 200 and, further, increases the homogeneity of the core structure.

Once the coiled core 200 has been formed, the exposed layers of the anode substrate 107 and cathode substrate 114 are compressed to change their shape so that the outside cross-sectional area of each end portion of the coiled core 200 is less than the interior cross-sectional area of the core 200. To this end, the exposed layers of the anode substrate 107 of the coiled core 200 may be welded to one another, secured to one another with a mechanical fastener, and/or secured to one another using an adhesive, etc. Preferably, the exposed layers of the anode substrate 107 are secured with one another by compressing them together, welding them together along the entire length or portions of the length of the exposed substrate 107 to form a single anode current collector structure. The layers of the cathode substrate 114 may be formed in a similar manner as the layers of the anode substrate 107.

Figure 2B:
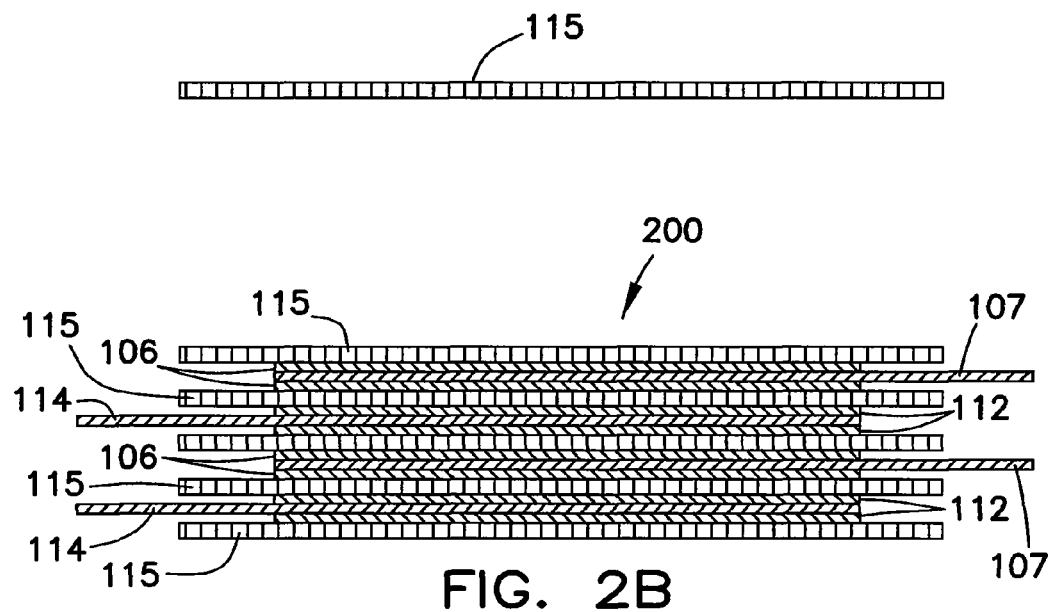
FIGS. 2B-2D show an alternative embodiment of a core where the sheets forming the core are not coiled.
Figure 2C:
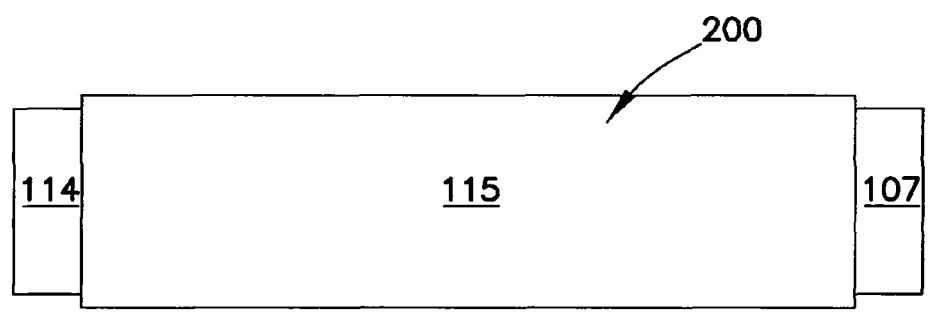
Figure 2D:
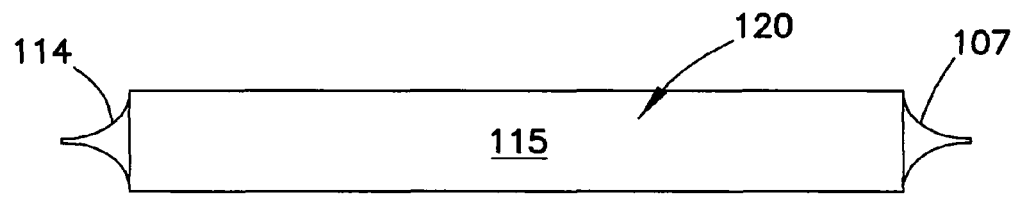

An alternative structure for the core 200 is shown in FIGS. 2B through 2D. In this embodiment, multiple anode sheets, cathode sheets, and separator sheets are layered adjacent one another. However, unlike the previously described core structure, the sheets forming the core are not wound to form a coil. Rather, the core 200 is comprised of a plurality of planar sheets, such as shown in the arrangement of FIG. 2B. Preferably, the end sheets of the core 200 are insulator sheets and, more preferably, one or more separator sheets 115. A top plan view of this embodiment of the core 200 is shown in FIG. 2C while a side plan view is shown in FIG. 2D. As illustrated, the insulator/separator sheets preferably extend beyond the lateral edges of the stacked cathode and anode sheets and may be wrapped around the side edges to isolate the cathode and anode sheets from one another. Alternative methods for sealing the stacked cathode and anode sheets to prevent undesired contact between them and to prevent environmental exposure may also be used. Although the current collectors 114 and 107 of FIGS. 2B through 2D are formed from the substrate layers of the anode and cathode sheet material, they may also be formed as ribbons that are connected to the individual stacked substrate layers.

Figure 3:
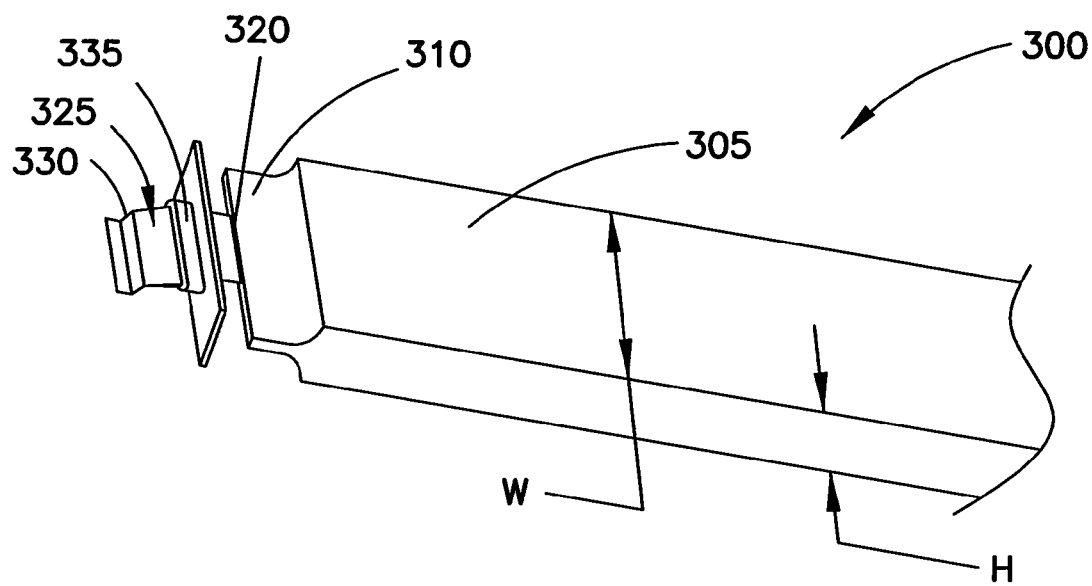
FIG. 3 is an exploded view of the anode end of a battery cell 300 having the coiled core of FIG. 2A.

FIG. 3 shows an exploded view of the anode end of a battery cell 300 having the coiled core 200 (not shown but implied in FIG. 3). In FIG. 3, battery cell 300 includes a protective shell 305 that receives the coiled core 200. Current collector 310 electrically engages a first end 320 of a connection structure 325 through an end cover assembly 335. A second end 330 of the connection structure 325 extends through a corresponding cover plate/end cap 335 to provide an exterior contact for the anode of the battery cell 300.

As shown in FIG. 3, the protective shell 305 is rectangular in shape and is dimensioned so that the core 200 fits snugly within its interior. Although the shell 305 (and, as such, core 200) may have various dimensions, protective shell 305 may have a width W and a height H, where W is greater than about 50 mm and H is greater than about 100 mm. Preferably, the ratio between the width and height of the shell 305 corresponds to the following equation:

$$0.18 < W/H < 0.5$$

This relationship is also suitable to generally define the dimensions of the core 200, and is particularly well-suited when the battery cell 300 is a high capacity, high power output battery.

When the W/H ratio is larger than 0.5, the width of the battery cell 300 is very large, and the total surface area of the shell 305 may not be capable of withstanding the pressure generated within its interior thereby causing it to fail and/or distort. This may create a safety/security risk. When the W/H ratio is smaller than 0.18, the height of the battery cell 300 is very small, so that the battery cell 300 is very thin. The available volume available to the core 200 within the protective shell 305 is quite small and does not favor the accommodation of a high capacity, high current core.

Figure 4:
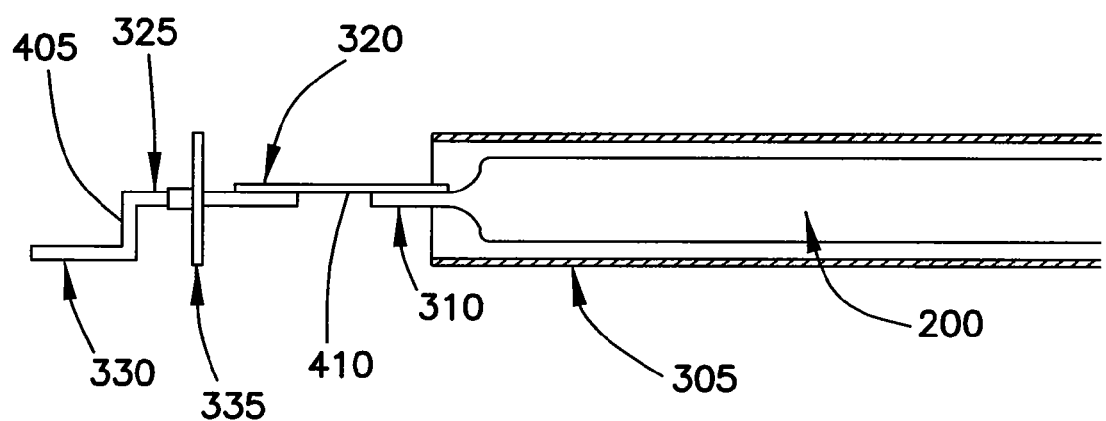
FIG. 4 is a schematic view through a cross-section of battery cell 300.

FIG. 4 is a schematic view through a cross-section of battery cell 300. In this example, the connection structure 325 includes an angled connector 405 that extends through cover plate/end cap 335. Here, the angled connector 405 is substantially Z-shaped. Current collector 310 may be formed in the manner described above. For simplicity, the current collector 310 of FIG. 4 only illustrates a single anode current collector strip. A flexible connection piece 410 electrically connects the angled connector 405 to the current collector 310. The flexible connection piece 410 may include multiple metal foil layers, such as copper, that have been annealed and welded to both the angled connector 405 and the current collector 310. A similar technique may be used to connect the cathode collector to a corresponding angled connector of a connection structure. However, the flexible connection piece between the angled connector and the cathode current collector may be formed from multiple aluminum foil layers that have been annealed and welded to both the angled connector and cathode current collector. The use of this type of interconnection structure facilitates the ease with which a battery using coiled core 200 may be manufactured. Further, the interconnection structure may be used to provide a low resistance, high current path through the battery. Still further, this structure may be used to dissipate heat thereby promoting battery safety.

Figure 5:
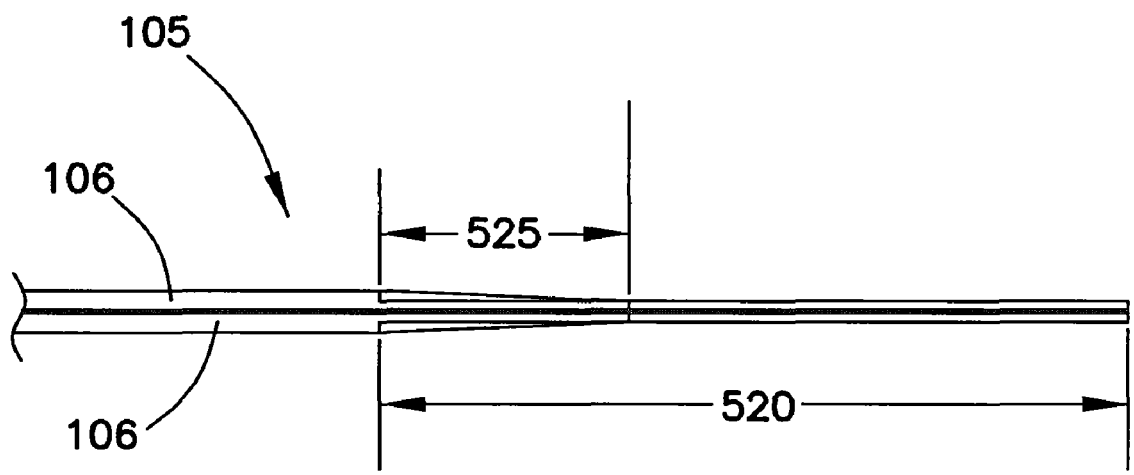
FIGS. 5 and 6 illustrate one manner of forming the regions of the anode sheet and/or cathode sheet which are proximate the exposed substrates.
Figure 6:
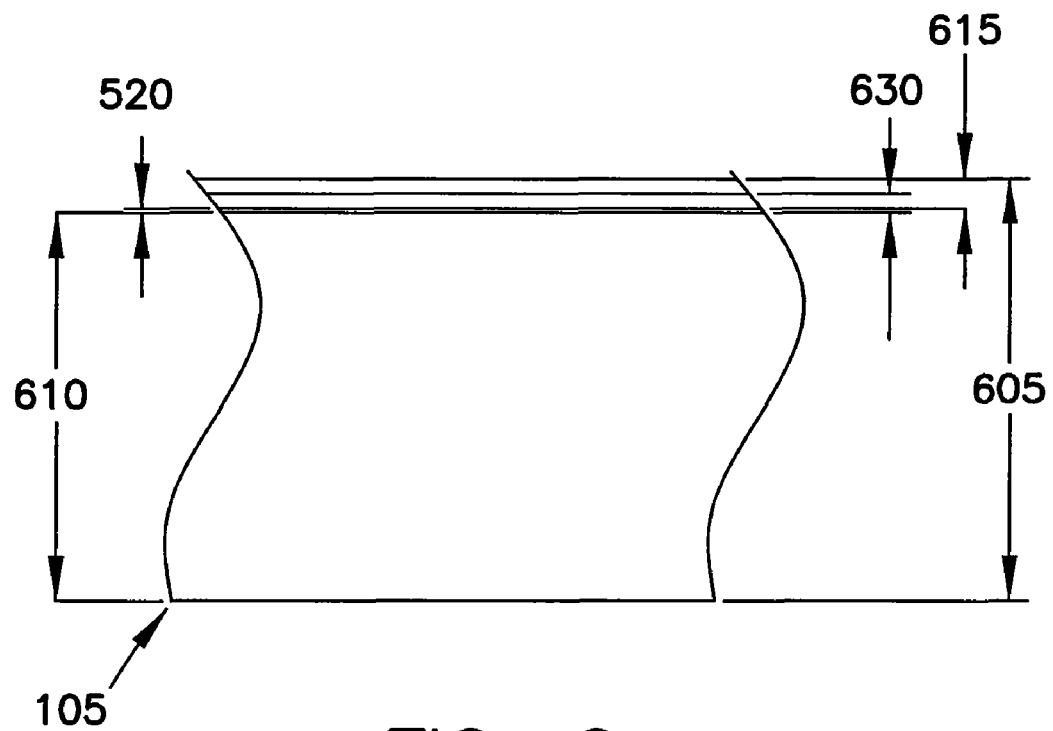

FIGS. 5 and 6 show one manner of forming the regions of the anode sheet 105 and/or cathode sheet 110 which are proximate the exposed substrates 107 and/or 114, respectively. Only the region proximate the exposed substrate 107 is described, although the corresponding region proximate the exposed substrate 114 may have the same basic structure.

In FIGS. 5 and 6, the anode sheet 105 has a total width 505. The active layers 106 of the anode sheet 105 are applied along a width 510 of the sheet leaving an uncoated region having a width 515. Alternatively, the uncoated region may be formed by removing a portion of the active component of the anode sheet 105. The coating of the active component is gradually thinned at the edge of the sheet along a width 520. In the region to the left of region 520, layers 106 are formed to their full thickness. Thinning begins at a coating thickness transition region 525. An insulating plaster or coating is applied along region 530. The width of the plaster (coated with insulating coatings) fully covers the thinning coating area on the conductive substrate and terminates in an area that exposes the conductive substrate. The plaster/coating should be electron or/and ion insulating, and capable of maintaining its integrity at high temperatures. One such coating is polyphenylene sulfide (PPS). Using this configuration reduces the possibility that a short circuit will occur between the anode and cathode. Further, thinning the coating in the described manner reduces wrinkling that may otherwise result from roller pressing a coating having a thick edge.

Figure 7:
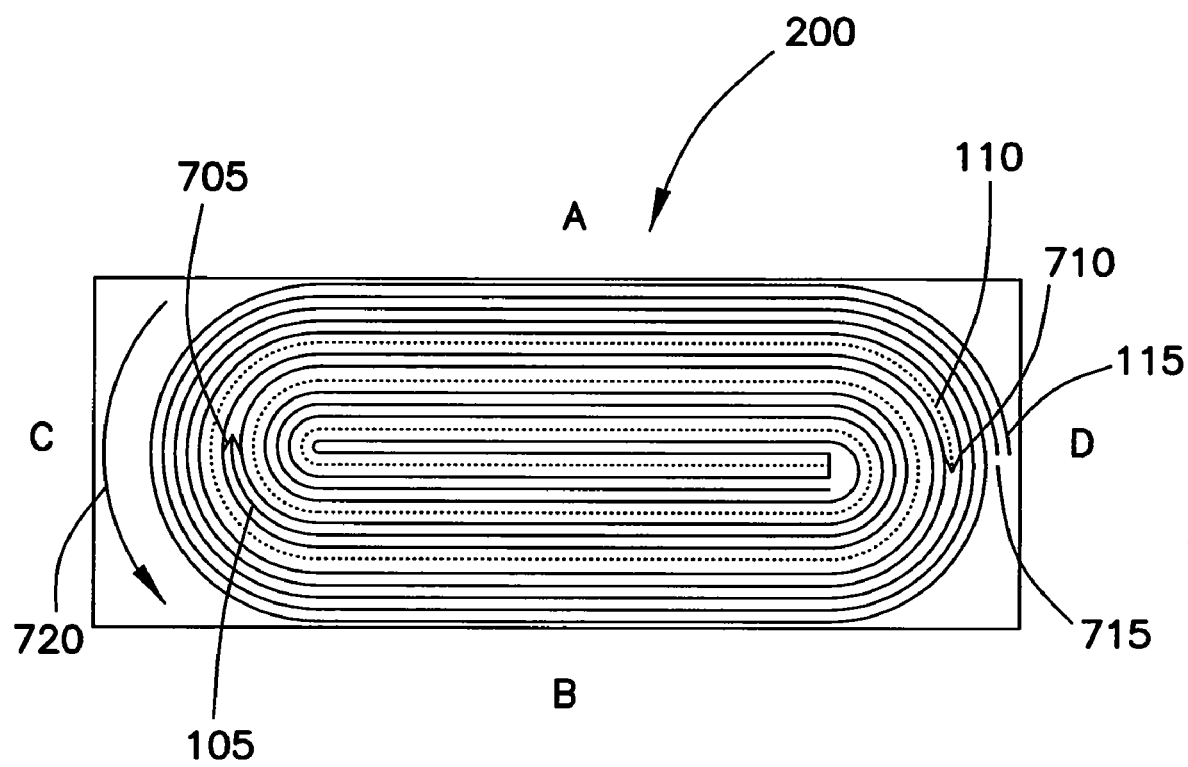
FIG. 7 is a cross-sectional view of one example of a coiled core.

FIG. 7 is a cross-sectional view of one example of a coiled core 200. In a coiled core, variable thicknesses and/or forces on the core 200 at opposed regions A and B may be problematic. To limit such problems, the anode sheet 105 and cathode sheet 110 terminate at opposed arcuate regions C and D instead of terminating at opposed planar regions A and B. As shown in FIG. 7, the anode sheet 105 terminates at 705 of region C while the cathode sheet 110 terminates at 710 of region D. The separator sheet 115 extends beyond the termination points 705 and 710 so that it wraps around to form the outer portion of the core 200. The separator sheet 115 terminates at 715 along an arced side of the core 200. The direction in which the sheets are wound to form the core 200 is designated by arrow 720. In this structure, the cathode sheet 110 may be longer than the anode sheet 105.

In accordance with the construction of the core 200 shown in FIG. 7, regions A and B are substantially flat and do not have significant thickness variations. As a result, there is a reduction in wrinkles that would otherwise form through swelling of the core 200 during electrolyte soakage as well as during charging and discharging of the battery cell. Such wrinkles occur when the forces on the core 200 at regions A and B are substantially non-uniform. By reducing this wrinkling, the lifespan of the core may be increased. Similarly, hidden safety issues caused by the non-uniform charging or discharging of the core 200 are addressed (e.g., situations in which a wrinkled area of the core 200 produces lithium dendrites that cause a short inside the battery resulting in an explosion).

Figure 8:
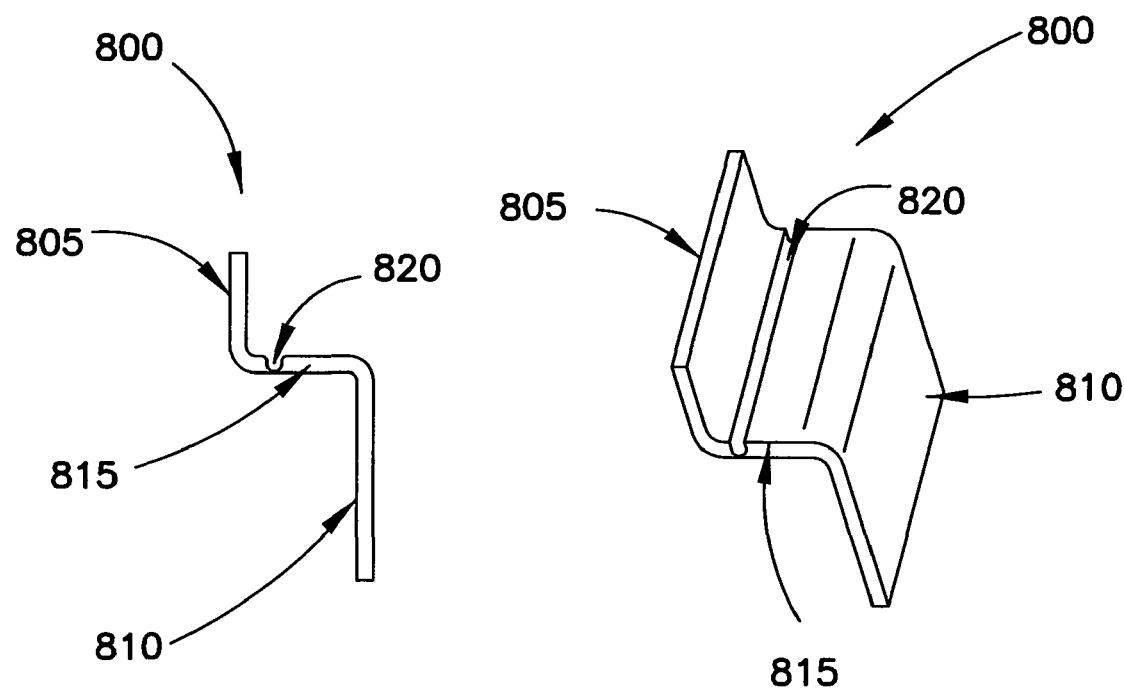
FIG. 8 shows one embodiment of a frangible bent connector.

FIG. 8 illustrates one embodiment of a bent connector 800 that may be used in the connection structure 325 of FIG. 4. Bent connector 800 is formed from a conductive material that is suitable for establishing an electrical connection as well as a mechanical bond with the material used to form connector 410 of FIG. 4 and preferably has a width that is at least 25% of the width W of the protective shell 305. The bent connector 800 of FIG. 8 is generally Z-shaped and includes a first arm 805 and second arm 810 that extend in opposite directions from a transverse portion 815. The second arm 810, as will be described below, extends from an interior to an exterior portion of the battery cell where it engages transverse portion 815. Transverse portion 815 is positioned exterior to the battery cell where it electrically connects the second arm 810 with the first arm 805. First arm 805 effectively forms an electrical terminal of the battery that may be used to access the anode (or cathode) of the coiled core 200.

Bent connector 800 may include a weakening structure, such as groove 820, which causes the bent connector 800 to break its electrical connection with the core 200 under certain extraordinary forces, such as those that occur when the vehicle is involved in an accident. In FIG. 8, a single groove 820 extends substantially along a width of the transverse member 820. Additionally, or alternatively, groove 820 may extend along a length of the first arm 805 exterior to the battery cell 300 and/or along a portion of the second arm 810 exterior to the battery cell 300. Multiple weakening structures may also be used.

Depending on the electrical resistance characteristics of the material forming the bent connector 800, the groove 820 may increase the resistance in an undesirable manner. In such instances, groove 820 may be filled with a conductive material that is mechanically ductile. A number of materials are suitable for this purpose including, without limitation, tin, conductive rubber, and other conductive ductile materials. The resistance of the area having the groove 820 is thus decreased while the overall safety characteristic that the groove is meant to enhance remains.

Figure 9:
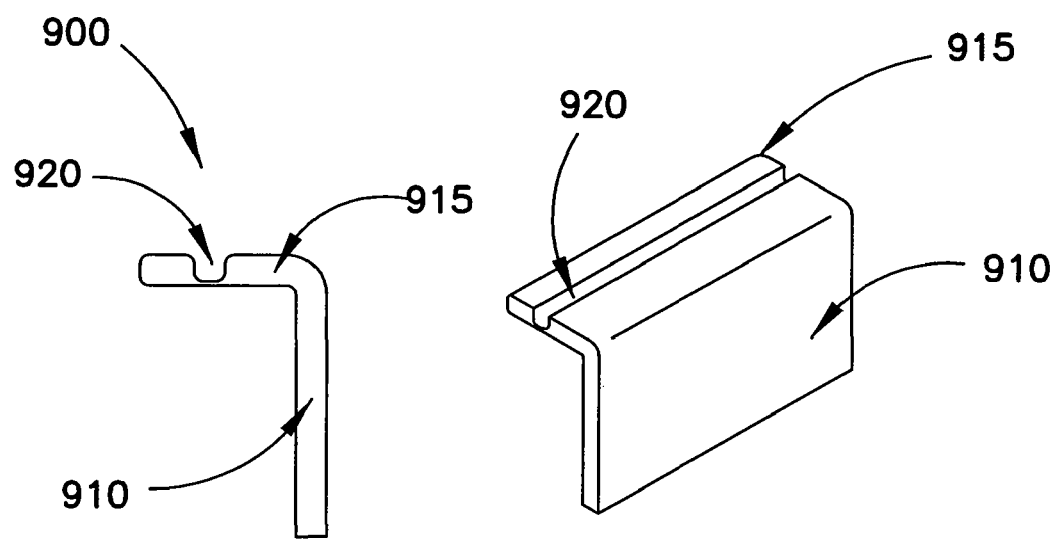
FIG. 9 illustrates a further embodiment of a frangible bent connector.

FIG. 9 illustrates a further embodiment of a bent connector 900 that may be used in the connection structure 325 of FIG. 4. Bent connector 900 is formed from a conductive material that is suitable for establishing an electrical connection as well as a mechanical bond with the material used to form connector 410 of FIG. 4. The bent connector 900 of FIG. 9 is generally L-shaped and includes an arm 910 that extends from an interior to an exterior portion of the battery cell where it engages transverse portion 915. Transverse portion 915 is positioned exterior to the battery cell. Transverse portion 915 effectively forms an electrical terminal of the battery that may be used to access the anode (or cathode) of the coiled core 200.

Bent connector 900 may include a weakening structure, such as groove 920, which causes the bent connector 900 to break its electrical connection in the region of the weakening structure. More particularly, the bent connector 900 breaks its electrical connection with the core 200 when subject to certain extraordinary forces, such as those that occur when the vehicle is involved in an accident/collision. In FIG. 9, a single groove 920 extends substantially along a width of the transverse member 915. Additionally, or alternatively, groove 820 may extend along a length of the arm 910 at a portion of the arm 910 that is exterior to the battery cell. Multiple weakening structures may also be used.

Depending on the electrical resistance characteristics of the material forming the bent connector 900, the groove 920 may increase the resistance in an undesirable manner. In such instances, groove 920 may be filled with a conductive material that is mechanically ductile. A number of materials are suitable for this purpose including, without limitation, tin, conductive rubber, and other conductive ductile materials. The resistance of the area having the groove 920 is thus decreased while the overall safety characteristic that the groove is meant to enhance remains.

The dimensions of the grooves 820 and 920 of the bent connectors 800 and 900 are dependent on the material used to form the connectors 800 and 900. If the bent connector is formed from copper, the depth of the corresponding groove may be approximately 50%-90% of the thickness of the transverse portion. The width of the groove along the transverse portion may be between about 100%-500% of the depth of the groove. If the bent connector is formed from aluminum, the depth of the corresponding groove may be approximately 30%-80% of the thickness of the transverse portion. The width of the groove along the transverse portion may be between about 100%-300% of the depth of the groove.

Figure 10:
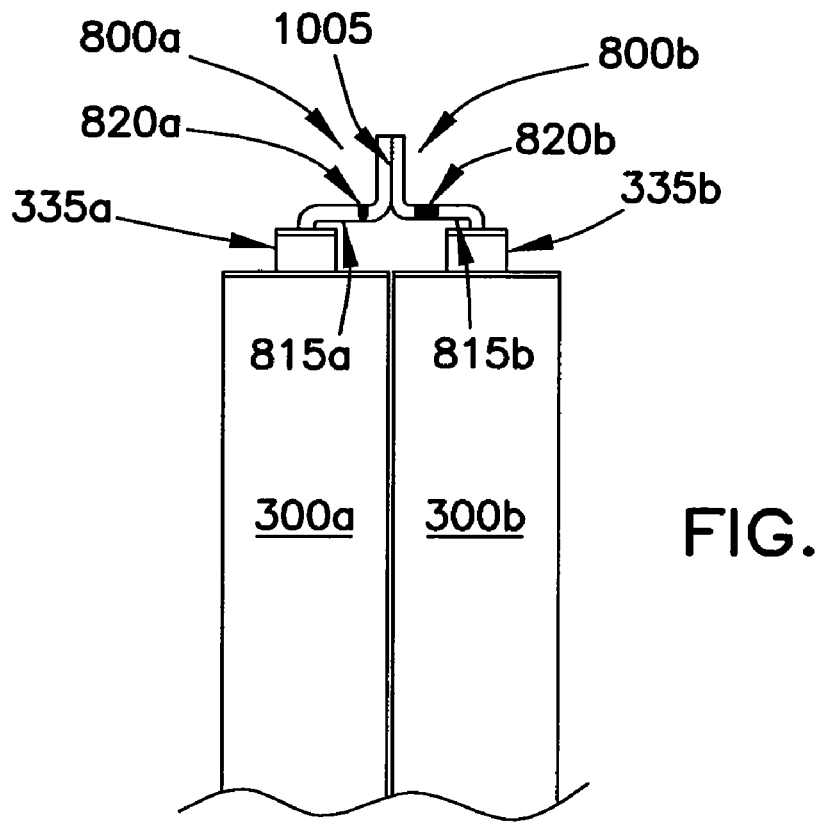
FIG. 10 shows how the bent connector of FIG. 8 may be used to interconnect adjacent battery cells.

FIG. 10 shows how the bent connector of FIG. 8 may be used to interconnect adjacent battery cells. As shown, a battery cell 300*a* is positioned adjacent battery cell 300*b* for connection with one another. Battery cell 300*a* includes an end cover structure 335*a*. A bent cathode connector 800*a* extends from an interior portion of the battery cell 300*a* where it is in electrical communication with the cathode collector of the corresponding coiled core (not shown). The transverse portion 815*a* of the bent connector 800*a* extends in a direction toward the adjacent battery cell 300*b*. Similarly, battery cell 300*b* includes an end cover structure 335*b*. A bent anode connector 800*b* extends from an interior portion of the battery cell 300*b* where it is in electrical communication with the anode collector of the corresponding coiled core (not shown). The transverse portion 815*b* of the bent connector 800*b* extends in a direction toward the adjacent battery cell 300*a*.

The faces of the upstanding arms of connectors 800*a* and 800*b* are joined with one another at junction 1005. Junction 1005 may be formed by welding the faces together, bonding the faces with one another using an adhesive such as a conductive rubber, mechanically interconnecting the faces with one another using a fastener, or similar joining structure and/or method. By interconnecting the bent connectors 800*a* and 800*b* at the faces of the upstanding arms, a low resistance connection capable of carrying a high current is established between the cathode of the battery cell 300*a* and the anode of the battery cell 300*b*. A similar structure may be used at an opposite end of each battery cell 300*a* and 300*b* to provide a low resistance connection capable of the carrying a high current between the anode of battery cell 300*a* and the cathode of the battery cell 300*b* with further adjacent cells to thereby connect all cells 300 with one another. In this manner, adjacent cells of a battery pack are electrically connected in series with one another. However, this interconnection architecture may also be used to electrically connect adjacent battery cells in parallel with one another.

Both bent connector 800a and 800b include corresponding weakening grooves 820a and 820b. When either or both battery cells 300a and/or 300b are jarred from their respective positions as a result of an accidental impact with the vehicle, the material in the region of the grooves 820a and/or 820b will fail and cause the battery cells 300a and 300b to electrically disconnect from one another. The safety of the batteries used in the vehicle is enhanced in this manner.

Figure 11:
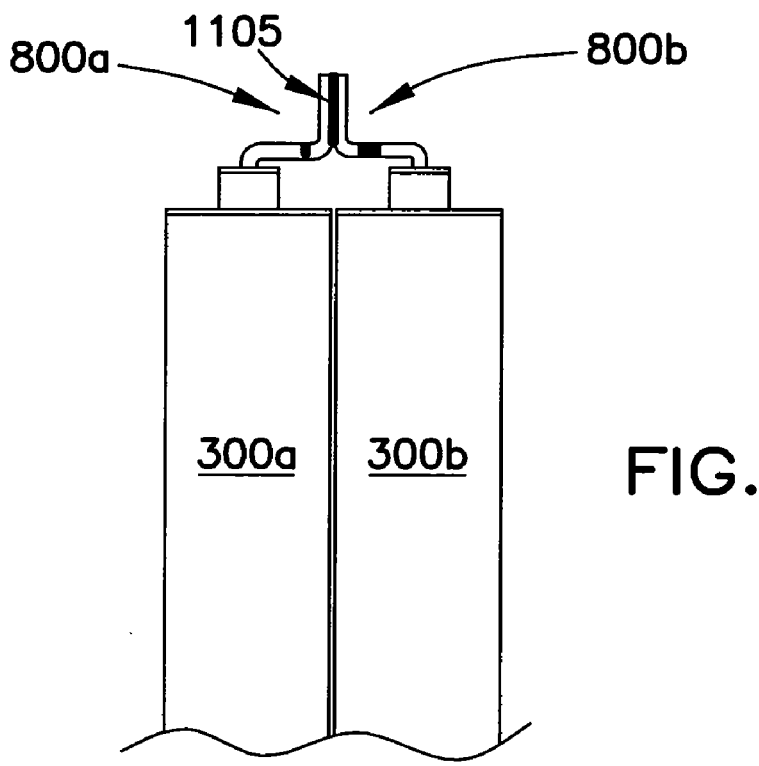
FIG. 11 shows another structure for interconnecting adjacent battery cells.

FIG. 11 shows another structure for interconnecting adjacent battery cells 300a and 300b. The interconnection is substantially the same as shown in FIG. 10. However, bent connectors 800a and 800b are joined to one another using a fusing member 1105 disposed between the faces of the upstanding arms. The fusing member 1105 may be a tin/lead solder composition or similar material that melts and/or vaporizes under excessively high electrical currents/temperatures that may occur during a failure of battery cell 300a, battery cell 300b, and/or the battery system that includes battery cells 300a and 300b. To this end, the thickness, width, length, and composition of the fusing member 1105 is selected to result in electrical disconnection between the bent connectors 800a and 800b when the electrical current and/or temperature between them exceeds a predetermined critical value. The safety of the battery cells 300a and 300b when overcurrent and/or temperature conditions are present is improved using this interconnection architecture.

Figure 35:
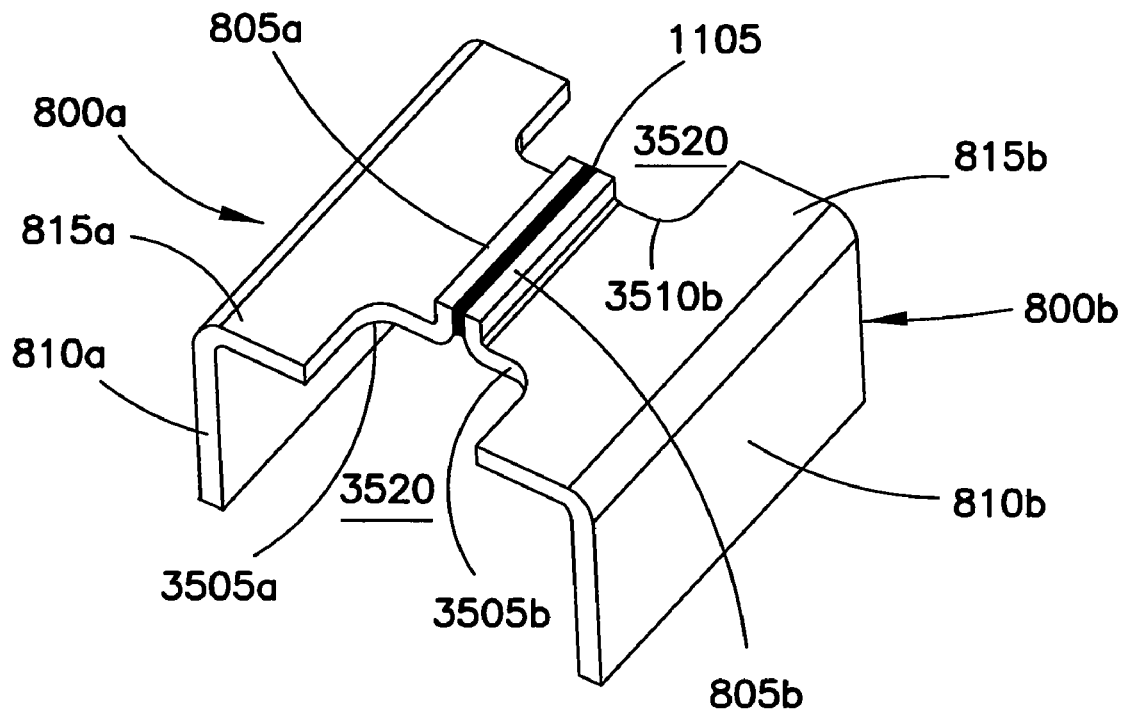
FIGS. 35-41 illustrate further battery cell interconnection structures.
Figure 36:
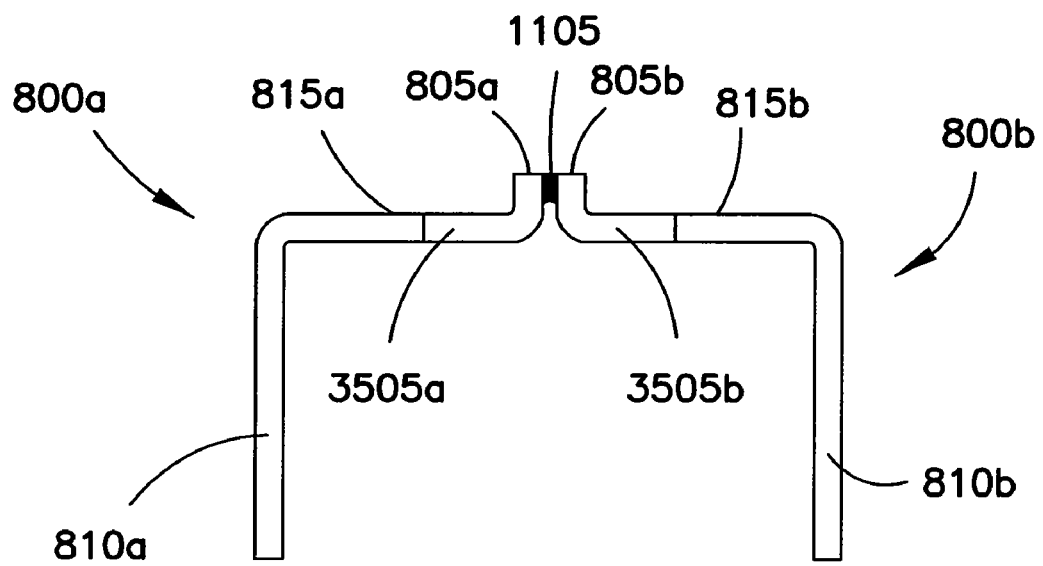

FIGS. 35 and 36 show another structure for interconnecting adjacent battery cells 300a and 300b. As shown, the connection structure includes a first bent connector 800a and a second bent connector 800b. Each bent connector 800a, 800b includes a first arm 810a, 810b, a transverse portion 815a, 815b, and a further arm 805a, 805b. In the embodiment shown in FIGS. 35 and 36, arms 805a and 805b are shorter than the corresponding arms of the connectors shown, for example, in FIGS. 8, 10, and 11. Bent connectors 800a and 800b may be joined to one another using a fusing member 1105 disposed between the faces of the arms 805a and 805b. The fusing member 1105 may be a tin/lead solder composition or similar material that melts and/or vaporizes under excessively high electrical currents/temperatures that may occur during a failure of battery cell 300a, battery cell 300b, and/or the battery system that includes battery cells 300a and 300b. To this end, the thickness, width, length, and composition of the fusing member 1105 is selected to result in electrical disconnection between the bent connectors 800a and 800b when the electrical current and/or temperature between them exceeds a predetermined critical value. The safety of the battery cells 300a and 300b when overcurrent and/or temperature conditions are present is improved using this interconnection architecture.

The connectors 800a, 800b may also be adapted so that they break away from one another when the interconnection structure is subject to excessive forces that may occur during, for example, a vehicle impact. To this end, each transverse portion 815a, 815b includes a narrowed section 3505a and 3505b. As shown, narrowed sections 3505a and 3505a define open regions 3520. Open regions 3520 weaken the interconnection structure to facilitate disconnection of the connectors 800a and 800b under excessive forces. Each arm 805a and 805b may have a width that is substantially the same or otherwise corresponds to the width of the narrowed sections 3505a and 3505b.

Figure 37:
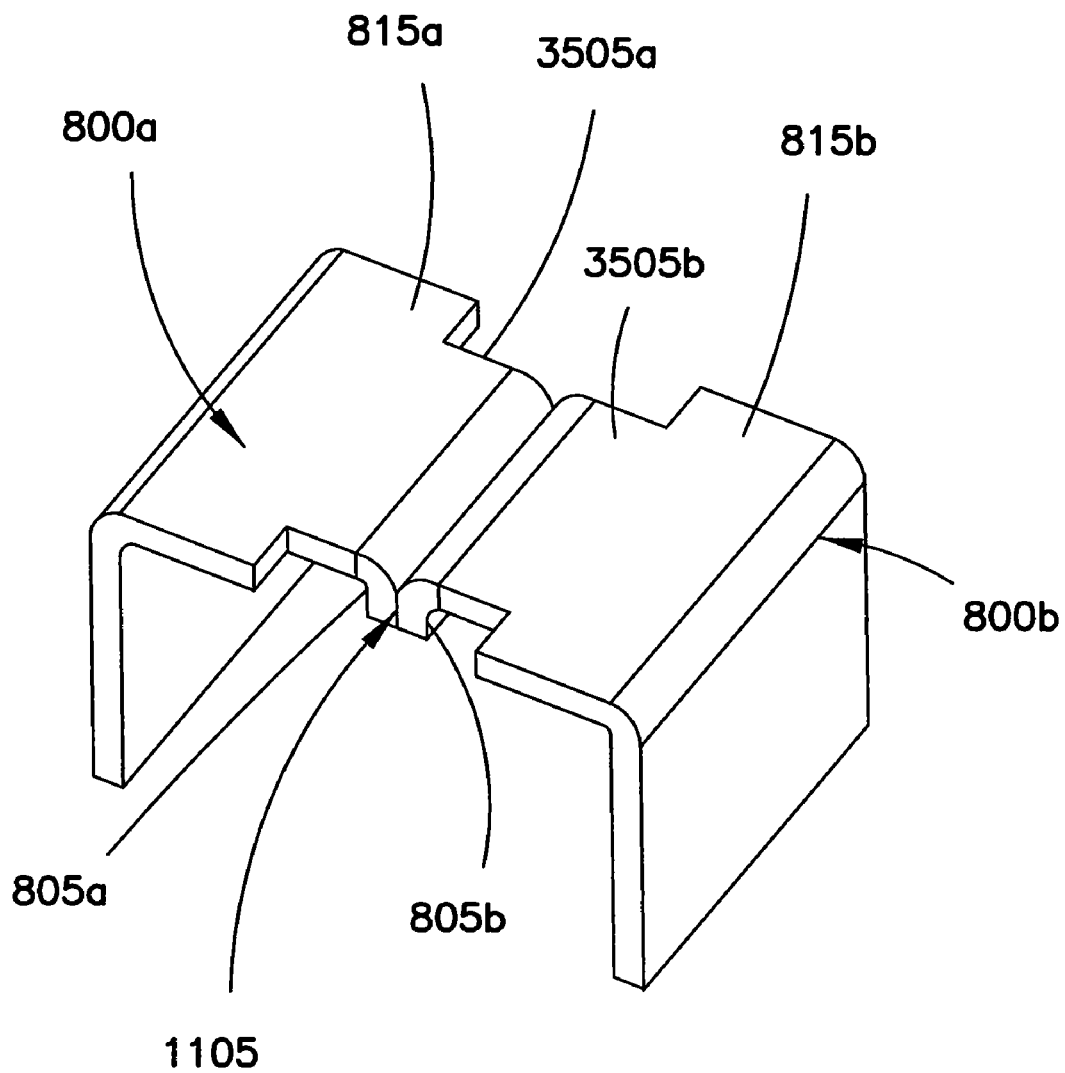

FIG. 37 shows another structure for interconnecting adjacent battery cells 300a and 300b. This interconnection structure is similar to the interconnection structure shown in FIGS. 36 and 37. However, the arms 805a and 805b extend in a direction toward battery cells 300a and 300b.

Figure 38:
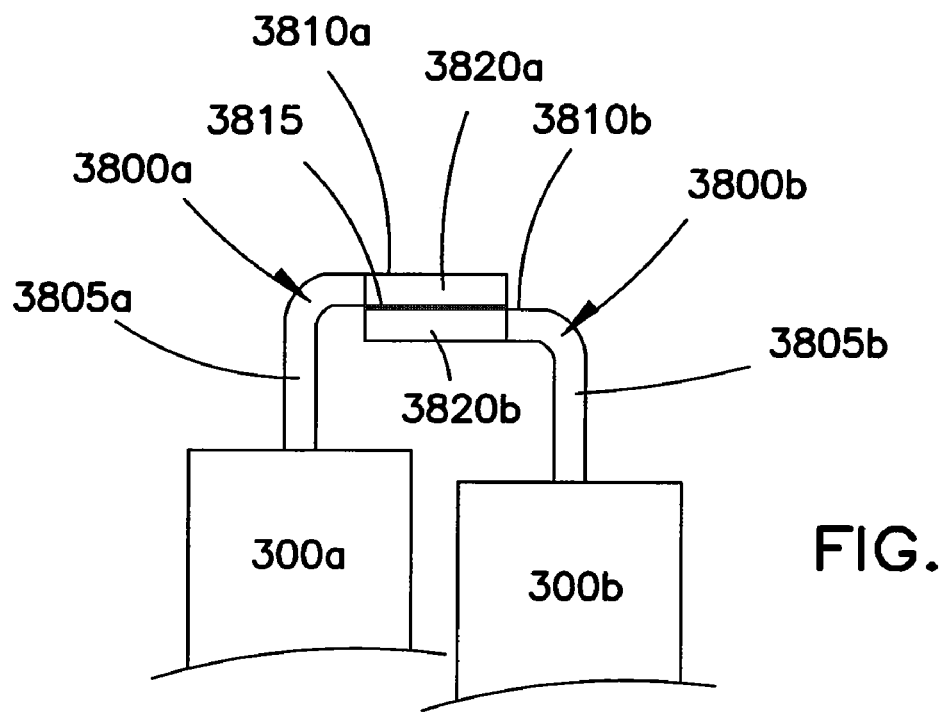

FIG. 38 shows another structure for interconnecting adjacent battery cells 300a and 300b. In this interconnection structure, a first bent connector 3800a extends from battery cell 300a while a second bent connector 3800b extends from battery cell 300b. Each connector 3800a, 3800b includes a first arm 3805a, 3805b that extends from the respective battery cell 300a, 300b and into engagement with a respective second arm 3810a, 3810b. Arms 3810a and 3810b extend toward one another and overlap at a connection region 3815. Arms 3810a and 3810b may be adapted to disconnect from one another under excessive forces, such as those that occur in a vehicle collision. To this end, one or both of arms 3810a and 3810b may include a weakening structure. In FIG. 38, the weakening structure comprises narrowed sections 3820a and 3820b formed in the overlapping portions of arms 3810a and 3810b. The narrowed sections 3820a and 3820b may be constructed as arcuate regions similar to the connection structures shown in FIGS. 35-37.

Figure 39:
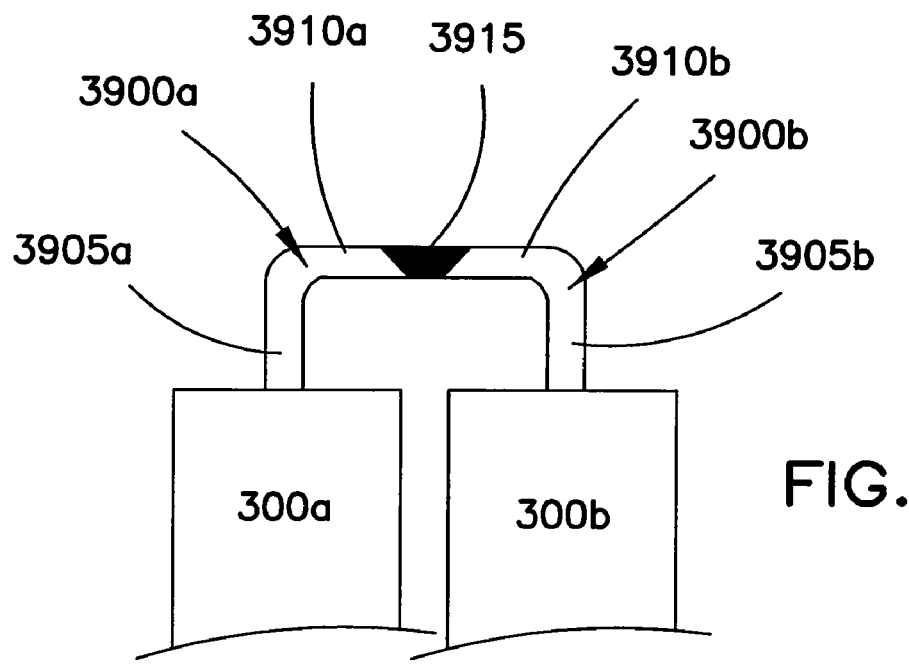

FIG. 39 shows another structure for interconnecting adjacent battery cells 300a and 300b. In this interconnection structure, a first bent connector 3900a extends from battery cell 300a while a second bent connector 3900b extends from battery cell 300b. Each connector 3900a, 3900b includes a first arm 3905a, 3905b that extends from the respective battery cell 300a, 300b and into engagement with a respective second arm 3910a, 3910b. Arms 3910a and 3910b extend toward one another and are engaged in an end-to-end manner at a connection region 3915. Connection region 3915 may include a generally V-shaped region that interconnects the arms 3810a and 3810b using a material that melts and/or vaporizes under temperatures that occur when the current flow between batteries 300a and 300b becomes excessively large. The material in connection region 3915, for example, may be tin solder or another material capable of mechanically and electrically interconnecting arms while melting and/or vaporizing at the desired overcurrent temperature. Each connection arm 3900a, 3900b may include a weakening structure such as the one at 920 on the connector 900 shown in FIG. 9.

Figure 40:
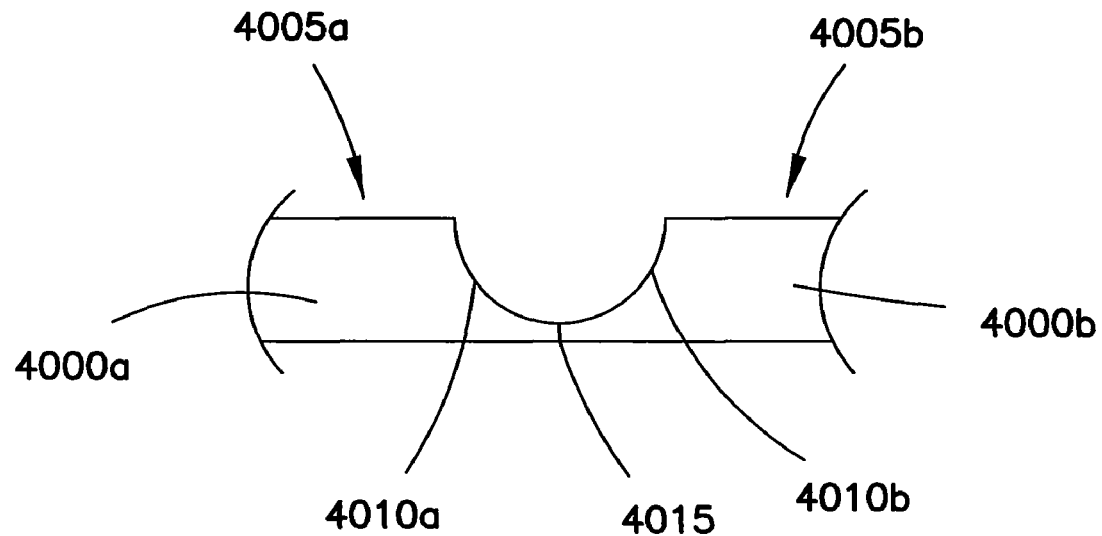
Figure 41:
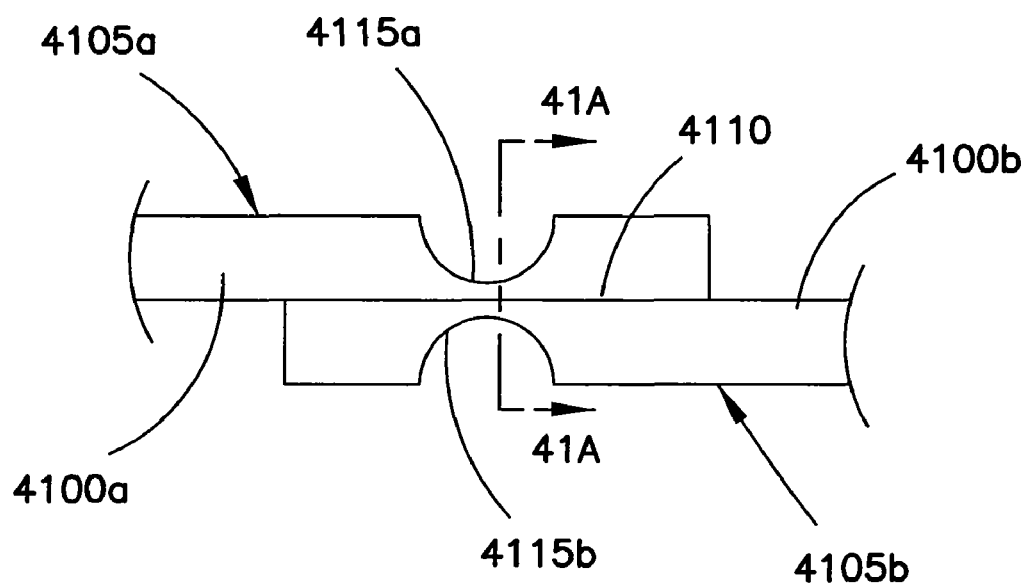

FIGS. 40 and 41 illustrate further interconnection structures that include mechanically weakened regions that break the electrical connection between batteries 300a and 300b at a predetermined location under excessive forces that occur, for example, during a vehicle accident/collision. In FIG. 40, connector 4005a is connected to battery cell 300a while connector 4005b is connected to battery cell 300b. Transverse arms 4000a and 4000b terminate at respective arcuate portions 4010a and 4010b that join with one another at connection region 4015. The arcuate regions 4010a and 4010b are sufficiently strong to facilitate mechanical and electrical interconnection between the connectors 4005a and 4005b under normal operating conditions. However, the thinning of these material regions produces a weakened connection structure at which the connection between the transverse members 4000a and 4000b is severed when subject to forces that occur during a vehicle accident/collision.

In FIG. 41, connector 4105a is connected to battery cell 300a while connector 4100b is connected to battery cell 300b. Transverse arms 4100a and 4100b overlap one another at region 4110 where the connectors 4105a and 4105b are mechanically and electrically joined with one another. Each transverse arm 4100a, 4100b includes a respective arcuate region 4115a, 4115b at which the material forming the transverse arm is thinned. The transverse arms 4100a and 4100b are aligned so that arcuate regions 4115a and 4115b overlie one another in connection region 4110. The resulting structure is sufficiently strong to facilitate mechanical and electrical interconnection between the connectors 4105a and 4105b under normal operating conditions. However, the thinning of the material regions at the joined arcuate regions 4115a and 4115b produces a weakened connection structure at which the connection between the transverse members 4100a and 4100b is severed when subject to forces that occur during a vehicle accident/collision.

Figure 41A:
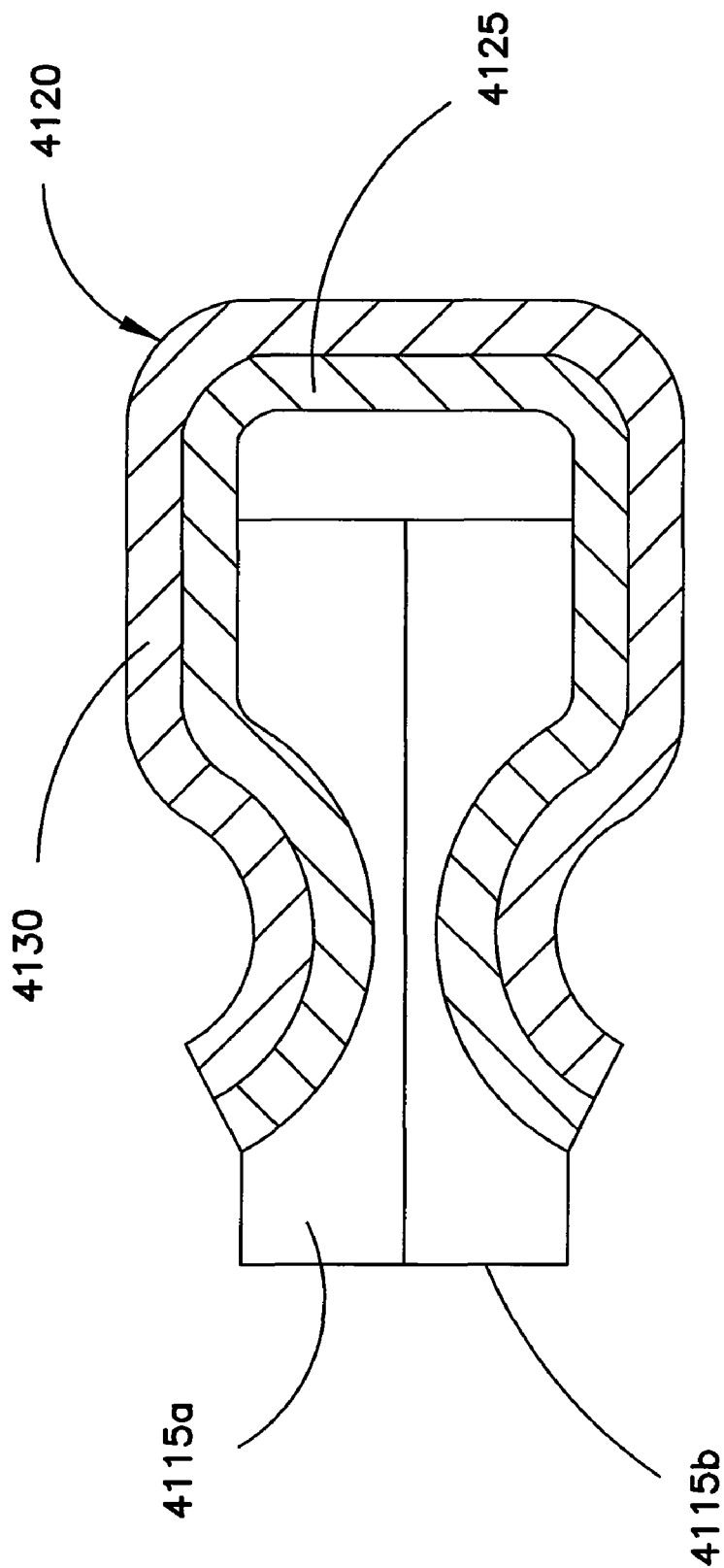
FIG. 41A illustrates a frangible connection structure having a thermally activated severing clamp.

FIG. 41A is a cross-sectional view through terminals 4100a and 4100b taken along section line 41A-41A of FIG. 41. In FIG. 41A, however, a multilayer clamp 4120 is disposed to engage arcuate regions 4115a and 4115b. Clamp 4120 includes a first layer 4125 and second layer 4130 having different thermal expansion characteristics. To this end, first layer 4125 may be an insulating material and have a higher coefficient of thermal expansion than second layer 4130. During an overcurrent condition, the temperature of the terminals 4100a and 4100b increases. As the temperature increases, the first layer 4125 expands at a rate greater than the second layer 4130. Since the expansion of the first layer 4125 is constrained by the second layer 4130, the first layer 4125 is driven against the thinned material sections at the arcuate regions 4115a and 4115b. Ultimately, if the temperature exceeds a predetermined threshold value consistent with an overcurrent condition, the first layer 4125 exerts enough force against the arcuate regions 4115a and 4115b to sever the connection between the terminals 4100a and 4100b.

FIGS. 42 through 46 show various manners in which terminals 4200a and 4200b of adjacent battery cells 300a and 300b may be interconnected with one another. In each instance, the terminals 4200a, 4200b are interconnected with one another using an electrically conductive bridge connector 4205. The bridge connector 4205 may take on a variety of shapes including, but not limited to, a U-shape, an inverted U-shape, a Z-shape, an S-shape, or any other shape having one or more bending angles between about 0° and 180°. The bridge connector 4205 may be formed as a single layered metal structure, multiple layer structure, or as a multiple layer metal foil. Forming the bridge connector 4205 as a multiple layer metal foil allows the bridge connector 4205 to additionally function as a mechanical buffer that absorbs vibrational energy between the terminals 4200a and 4200b thereby increasing the integrity of the overall terminal connection structure.

The bridge connector 4205 may be formed from a single metal material, multiple metal sheets having different thermal expansion coefficients, and/or from a memory alloy. Examples of materials having different expansion coefficients that may be used in a multiple metal sheet structure include a Fe—Ni sheet combination, a Fe—Cu sheet combination, and/or a memory alloy/common metal combination. Memory alloys that may be used in the bridge connector 4205 include Cu-based alloys and/or Fe-based alloys. These include, without limitation, Cu—Zn—Al, Cu—Al—Ni, and/or Fe—Mn. The common metal may be, for example, Cu, Al, and/or Ni.

The bridge connector 4205 connects to face portions of the terminals 4200a and 4200b. The effective welding surface between the bridge connector 4205 and a respective terminal may be about 0.5-4 times the cross-sectional surface of the terminal. Solder having a lower melting point than the metal of the connector and the terminal may be disposed at the junction between each end of bridge connector 4205 and the respective terminal. The connection between each terminal and the bridge connector 4205 may be formed through cold pressure welding, ultrasonic welding, solder welding, flash welding, friction welding, resistance welding, or the like. Preferably the connection is formed using solder welding where the melting point of the alloy used in the solder has a melting temperature between about 150° C. and 250° C. Materials that may be used include Sn, Au-20% Sn, lead −5% Sn, Ag—Sn and so on.

Figure 42:
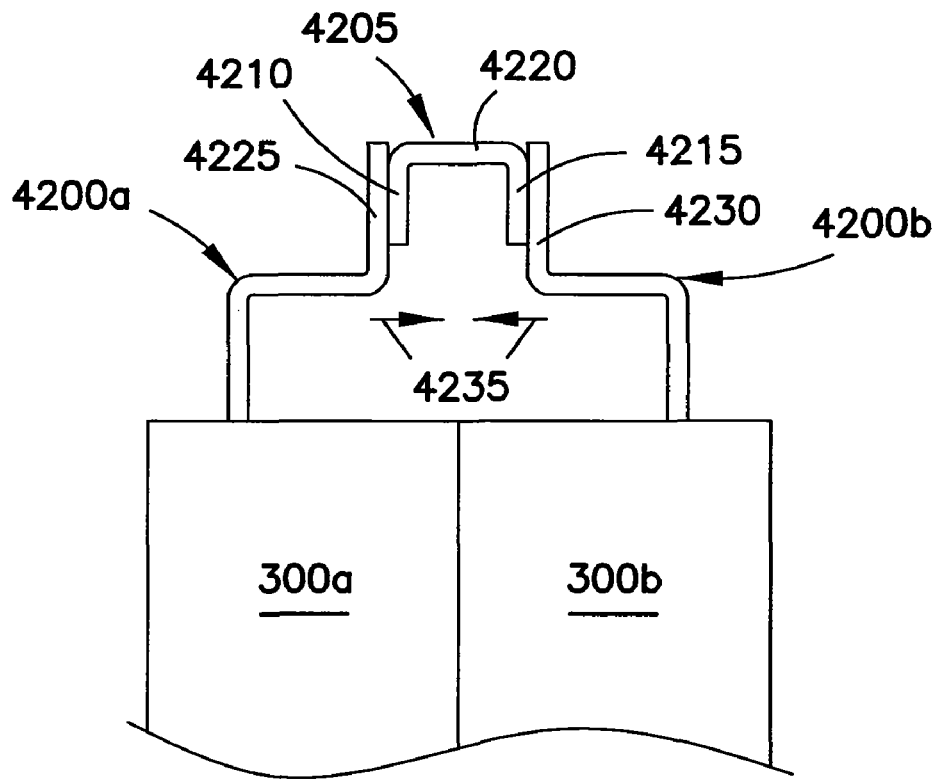
FIGS. 42 through 46 illustrate battery cell interconnection structures where the terminals of the battery cells are interconnected with one another by a bridge connector.

FIG. 42 shows a bridge connector 4205 having an inverted U-shape. In this embodiment, terminals 4200a and 4200b may have the general characteristics of the terminals 800a and 800b shown in FIG. 10. Bridge connector 4205 may include first and second arms 4210 and 4215 that are interconnected with one another by a transverse member 4220. First arm 4210 is connected to member 4225 of terminal 4200a while second arm 4215 is connected to member 4230 of terminal 4200b. Bridge connector 4205 may be formed as a multilayered soft metal piece, such as from a multilayered copper foil. When the battery cells 300a and/or 300b are subject to external forces, the transverse member 4220 may absorb the generated impact stresses and protect the terminals from excessive wear and harm.

The bridge connector 4205 may be formed from a memory alloy or bimetal piece. When the temperature of the interconnection structure elevates suddenly due, for example, to an overcurrent or other abnormal condition, the memory alloy or the bimetal piece may shrink in the direction shown by arrows 4235 to withdraw itself from contact with each of the terminals as the solder between the bridge/terminal junctions melts. As a result, the electrical and mechanical connection between the terminals 4200a and 4200b is broken to prevent the explosion of the battery cells and/or other such dangerous consequences.

Memory alloys that may be used to construct bridge connector 4205 include Cu based metal alloys and/or Fe based metal alloys, such as Cu—Zn, Cu—Zn—Al, Cu—Al—Ni, or Fe—Mn—Si alloys. In connection with the structure shown in FIG. 42, it is assumed that a Cu—Al—Ni alloy is employed. In such instances, the bridge connector 4205 may be initially formed so that the angle between each arm 4210 and 4215 with respect to transverse member 4220 is less than 90°. While in this shape, the bridge connector 4205 may be subject to a high-temperature treatment between about 300-1000° C. for several minutes to impart a memory effect. The bridge connector 4205 is then connected to terminals 4200a and 4200b in its normal assembled position. In this position, the angle between each arm 4210 and 4215 is at an angle of about 90° with respect to the transverse member 4220. The memory alloy will attempt to recover its original shape when the temperature of the bridge connector 4205 is elevated to a temperature commensurate with an overcurrent and/or other abnormal battery cell operating condition.

Figure 43:
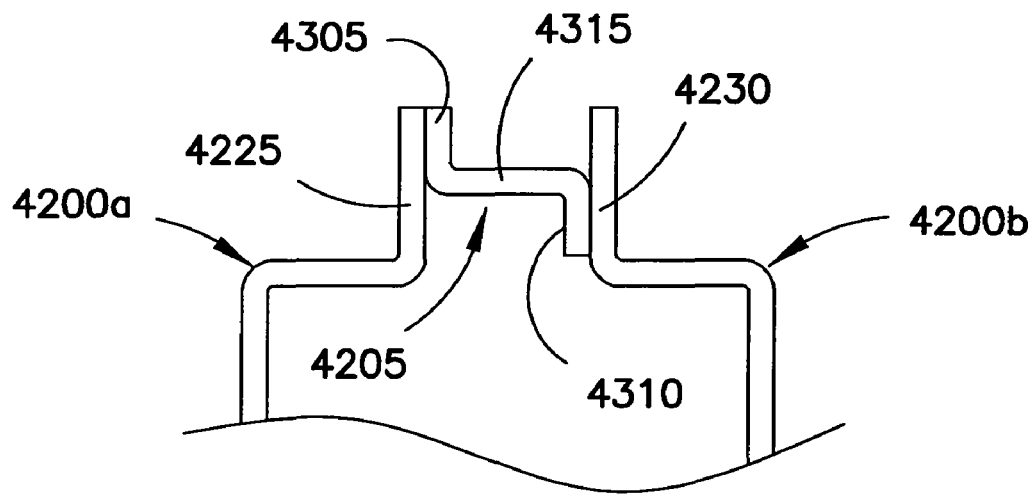

FIG. 43 shows a bridge connector 4205 having an S-shape. In this embodiment, terminals 4200a and 4200b may have the general characteristics of the terminals 800a and 800b shown in FIG. 10. Bridge connector 4205 may include first and second arms 4305 and 4310 that extend in opposite directions and that are interconnected with one another by a transverse member 4315. First arm 4305 is connected to member 4225 of terminal 4200a while second arm 4310 is connected to member 4230 of terminal 4200b. As above, the bridge connector 4205 may be formed as a multilayer metal foil, bimetal piece, and/or memory alloy. When formed from a memory alloy, bridge connector 4205 may have an original shape that corresponds to the shape required to disconnect it from contact with terminals 4200a and 4200b under elevated temperatures that occur during overcurrent and/or other abnormal battery cell operating conditions.

Figure 44:
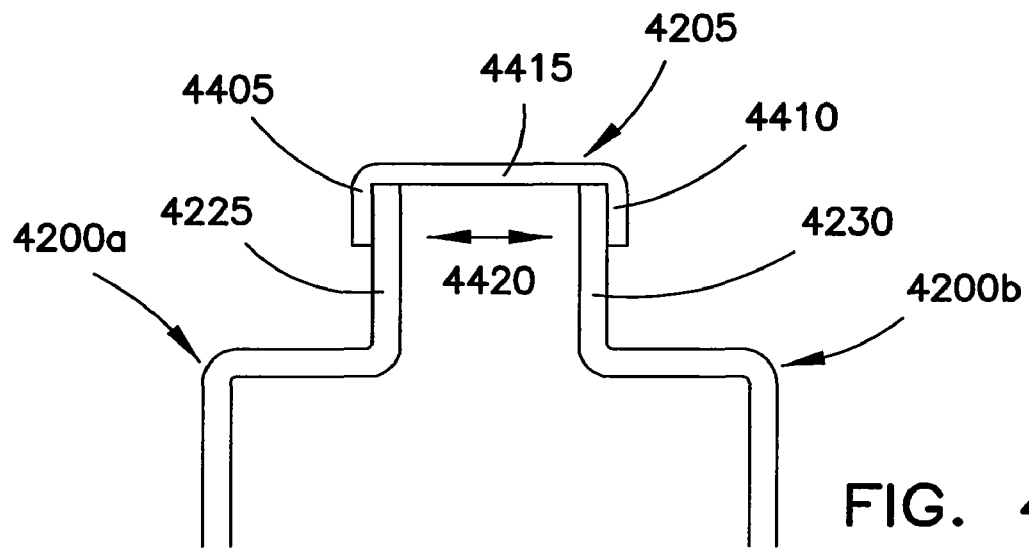

FIG. 44 shows a bridge connector 4205 having an inverted U-shape. In this embodiment, terminals 4200a and 4200b may have the general characteristics of the terminals 800a and 800b shown in FIG. 10. Bridge connector 4205 may include first and second arms 4405 and 4410 that are interconnected with one another by a transverse member 4415. First arm 4405 is connected to an exterior surface of member 4225 of terminal 4200a while second arm 4410 is connected to an exterior surface of member 4230 of terminal 4200b. As above, the bridge connector 4205 may be formed as a multilayer metal foil, bimetal piece, and/or memory alloy. When formed from a memory alloy, bridge connector 4205 may have an original shape that corresponds to the shape required to disconnect it from contact with terminals 4200a and 4200b under elevated temperatures that occur during overcurrent and/or other abnormal battery cell operating conditions. In FIG. 44, the original shape may be set so that the bridge connector 4205 expands in the directions shown by arrows 4420 under such elevated temperatures.

Figure 45:
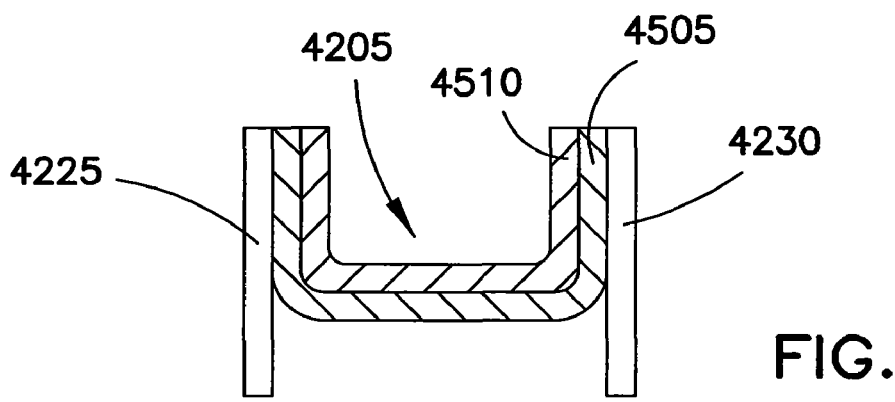

FIG. 45 shows a bridge connector 4205 having a multilayer structure. In this embodiment, the bridge connector 4205 includes a first layer 4505 that is disposed interior to arms 4225 and 4230 and a second layer 4510 that is interior to and coextensive with the first layer 4505. Each layer 4505, 4510 has an inverted U-shape. Layer 4510 may be formed from a common metal while layer 4505 may be formed from a memory alloy. The common metal layer 4510 and memory alloy 4505 may be bonded with one another so that changes in the shape of the memory alloy 4505 result in corresponding changes in the shape of the common metal layer 4510. As such, the bridge connector 4205 changes shape under elevated temperatures that occur during overcurrent and/or other abnormal battery cell operating conditions. This shape change causes the bridge connector 4205 to disconnect terminals 4200a and 4200b from one another.

Figure 46:
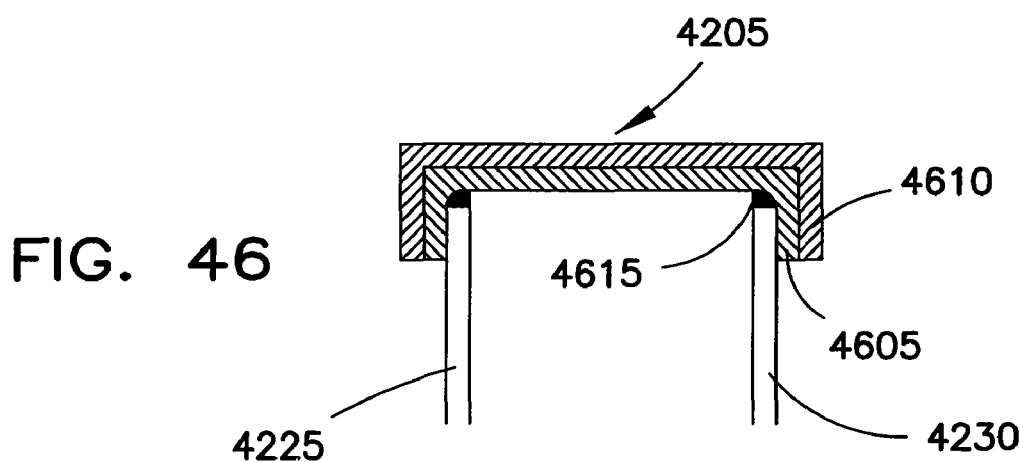

FIG. 46 shows a bridge connector 4205 having a multilayer structure. In this embodiment, the bridge connector 4205 includes a first layer 4605 that is disposed exterior to arms 4225 and 4230 and a second layer 4610 that is exterior to and coextensive with the first layer 4605. Each layer 4505, 4510 has an inverted U-shape. Layers 4610 and 4605 are formed from metals having different thermal expansion coefficients and may be mechanically bonded to one another so that changes in the shape of one layer will result in a corresponding change in the other layer. The difference in thermal expansion coefficients causes the bridge connector 4205 to change shape under elevated temperatures that occur during overcurrent and/or other abnormal battery cell operating conditions thereby disconnecting terminals 4200a and 4200b from one another. To further ensure that the terminals 4225 and 4230 are electrically isolated from one another when the bridge connector 4205 changes shape, an insulating layer 4615 may be disposed at an end portion of each arm 4225 and 4230 proximate the bridge connector 4205.

Figure 47:
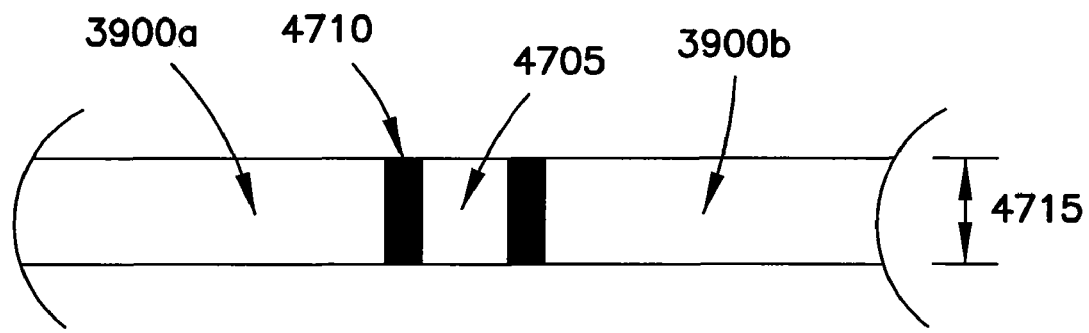
FIGS. 47 and 48 illustrate battery cell interconnection structures having gravity assisted overcurrent protection substructures.
Figure 48:
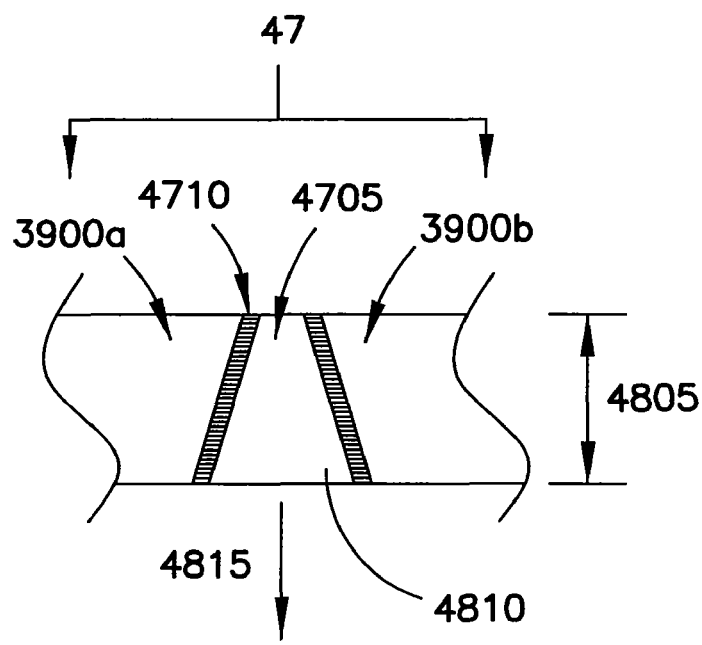

Battery cell interconnections such as those shown in FIG. 39 may include gravity enhanced overtemperature protection structures. An example of one such structure is shown in FIGS. 47 and 48, where FIG. 47 is a top view of the structure and FIG. 48 is a side view of the structure. These figures show the orientation of the terminals when the battery cells are turned on their sides in the manner shown in FIGS. 28A and 69 below.

In the embodiment shown in FIGS. 47 and 48, terminal 3900a is electrically connected to battery cell 300a while terminal 3900b is electrically connected to battery cell 300b. A conductive block 4705 is secured to the end portions of each terminal 3900a and 3900b using a bonding material 4710. The conductive block 4705 extends along the entire width 4805 of connectors 3900a and 3900b as well as along the entire thickness 4715. The bonding material 4710 may be Sn-based solder, Bi-based solder, or Zn-based solder, but is preferably Sn-based. In one example, the solder may have a thickness of between about 0.3 mm and 1 mm and, preferably between about 0.5 mm and 0.8 mm. The melting point of the solder material may be between about 100° Celsius and 450° Celsius. If the melting point is too low, the interconnection structure may not be stable under ordinary operating conditions. If it is too high, the melting point may not be achieved during abnormal overtemperature conditions. Sn-based solder is preferred since it has a melting point of about 231.90 Celsius.

The conductive block 4705 may be formed from a high density metal having a melting point that is at least about 50° Celsius above the melting point of the bonding material 4710. In this manner, the conductive block 4705 may be securely fastened with terminals 3900a and 3900b using a suitable brazing technique. Such techniques may include induction brazing, iron soldering, resistance braze welding, or similar fastening technique.

As shown in FIG. 48, the conductive block 4705 may have a trapezoidal shape in which the base portion 4810 is disposed at the lower portion of the connection structure. The conductive block 4705 is subject to the force of gravity in the direction shown by arrow 4815. When the connection structure is subject to overtemperature conditions such as those that occur during overcurrent or other abnormal operation of the battery system, the bonding material 4710 begins to melt. As the bonding material melts, the conductive block 4705 moves downward in direction 4815 under the influence of gravity. Ultimately, the conductive block 4705 dislodges from engagement with the terminals 3900a and 3900b thereby severing the electrical and mechanical interconnection between them.

Figure 49:
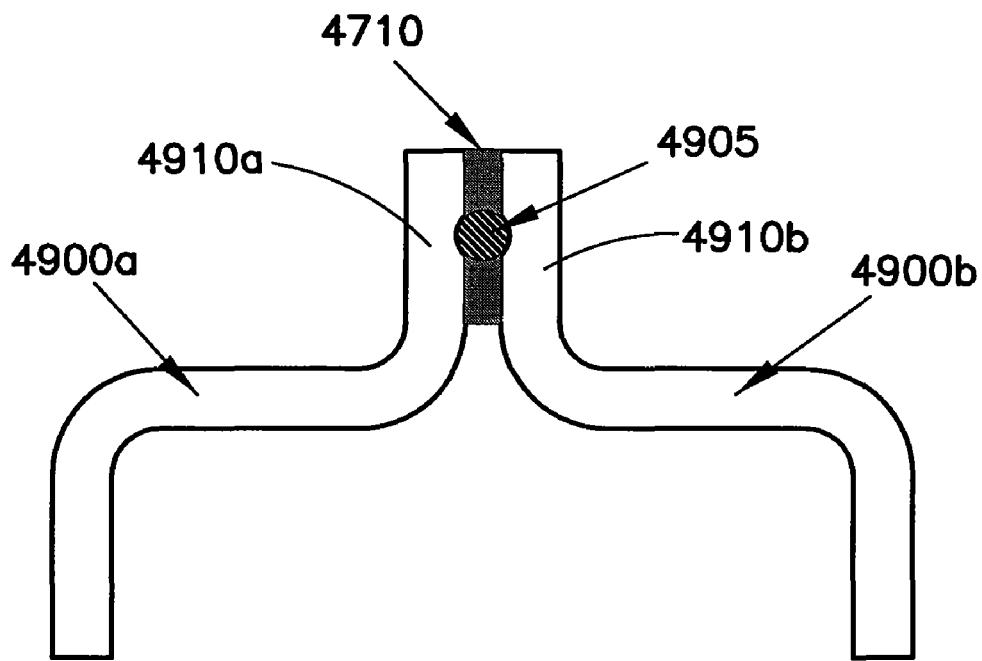
FIGS. 49 through 51 illustrate battery cell interconnection structures having a thermal expansion structure that separates the battery cell terminals as a result of overcurrent conditions.
Figure 50:
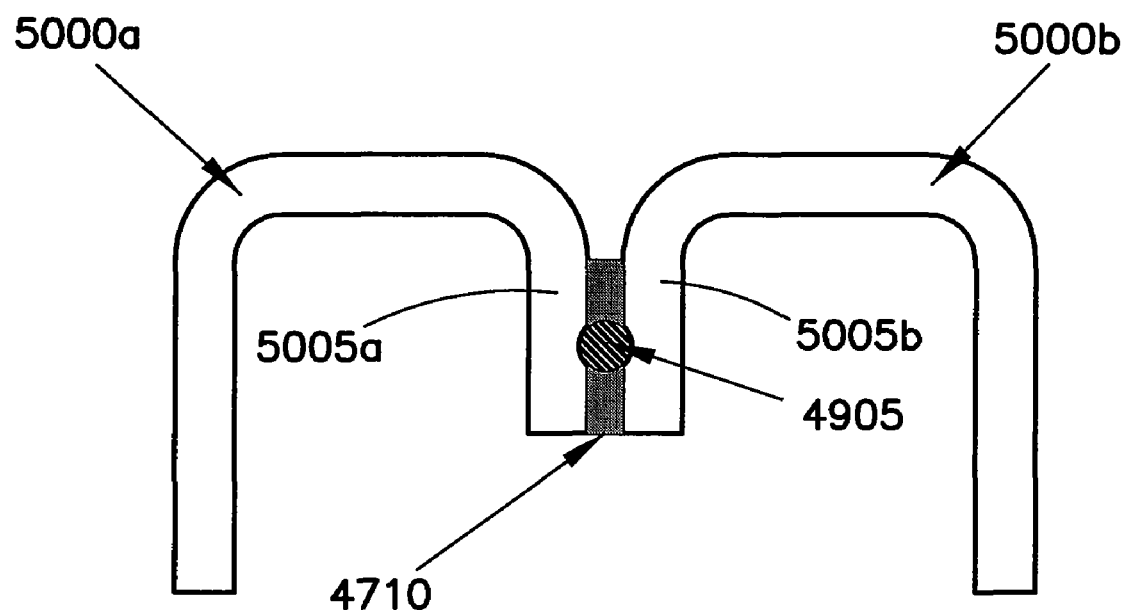
Figure 51:
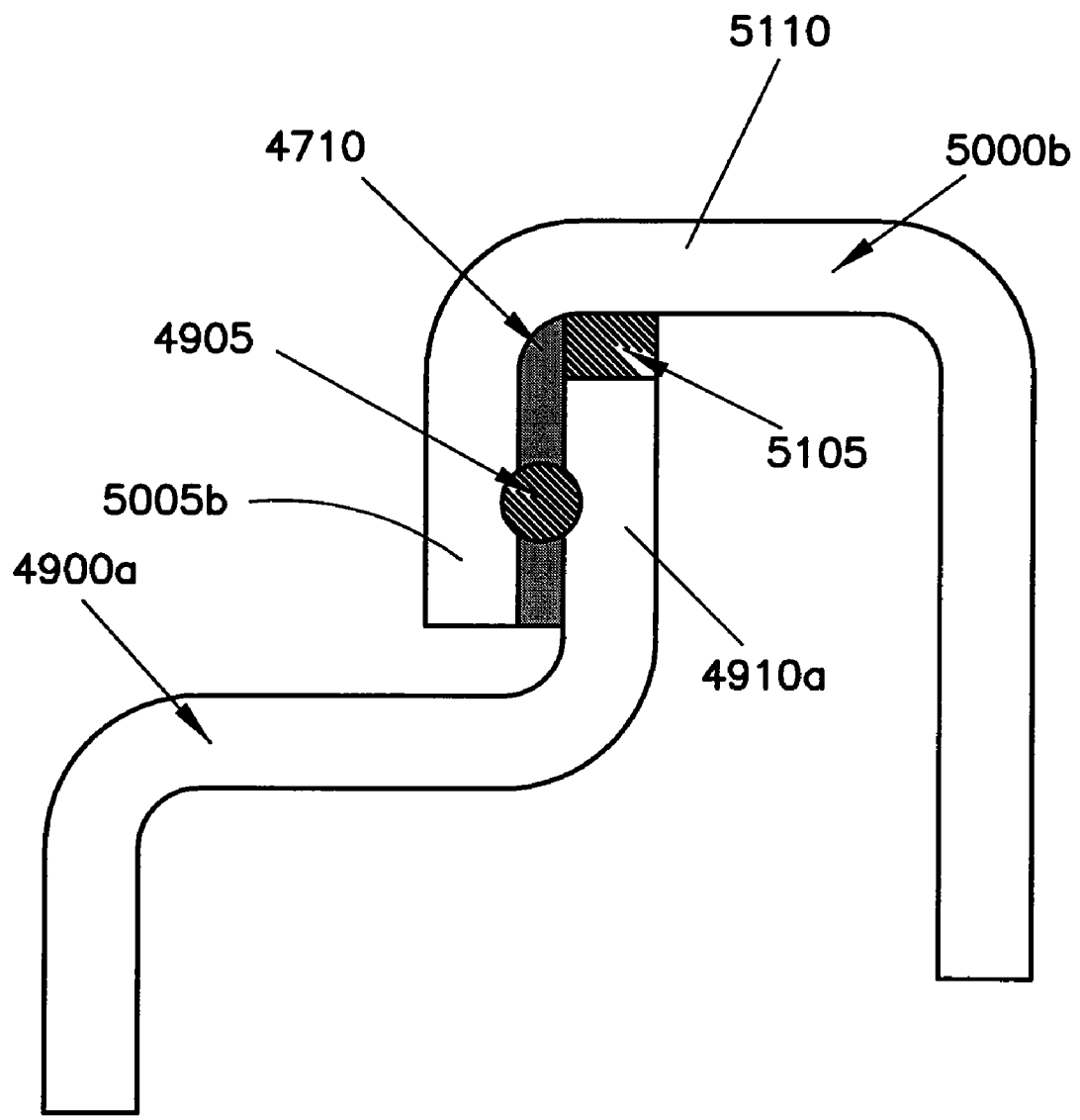

Battery cell interconnections may also include overtemperature protection structures using electrical insulators that are dimensioned to expand the connection between the terminals when the temperature of the interconnection becomes excessive. FIGS. 49 through 51 illustrate three embodiments of such interconnections. In FIG. 49, the terminals 4900a and 4900b are joined to one another by a bonding material 4710. The bonding material 4710 may be Sn-based solder, Bi-based solder, or Zn-based solder, but is preferably Sn-based. In one example, the solder may have a thickness of between about 0.3 mm and 1 mm. The melting point of the solder material may be between about 100° Celsius and 450° Celsius, with a preference of about 232° Celsius. An expansion member 4905 is disposed in the joint between the terminals 4900a and 4900b. As shown, the expansion member 4905 may have a circular cross-section, but other cross-sectional shapes may be used. Further, the expansion member 4905 may be formed from an electrically insulating material having a large thermal expansion coefficient. Still further, the material forming the expansion member 4905 may have a melting point that substantially exceeds the melting point of the bonding material 4710.

When the interconnection structure is subject to an overtemperature condition, the bonding material 4710 begins to melt. Additionally, the expansion member 4905 expands to drive arms 4910a and 4910b apart. The characteristics of the bonding material 4710, expansion member 4905, and spacing between arms 4910a, 4910b are such that the expansion of the expansion member 4905 drives the arms 4910a and 4910b apart a sufficient distance to overcome the surface tension of the melted bonding material 4710. The bonding material 4710 flows from the joint between the terminals and effectively severs the electrical connection between the battery cells.

The interconnection shown in FIG. 50 is similar to the one shown in FIG. 49. The principal difference between them is the shape of the terminals 5000a and 5000b. More particularly, the terminals 5000a and 5000b include inwardly extending arms 5005a and 5005b as opposed to the outwardly extending arms 4910a and 4910b of terminals 4900a and 4900b.

The interconnection structure shown in FIG. 51 is similar to the ones shown in both FIG. 49 and FIG. 50. The principal difference between them is the shape of the terminals. More particularly, the interconnection shown in FIG. 51 includes a terminal 4900a having an outwardly extending arm 4910a that is electrically connected with an inwardly extending arm 5005b of a terminal 5000b. An electrically insulating member 5105 may be disposed between an end portion of arm 4910a of terminal 4900a and transverse portion 5110 of terminal 5000. The electrically insulating member 5105 helps to ensure that terminals 4900a and 5000b are electrically disconnected from one another when the bonding material 4710 melts and flows from the joint between arms 4910a and 5005b.

Figure 52:
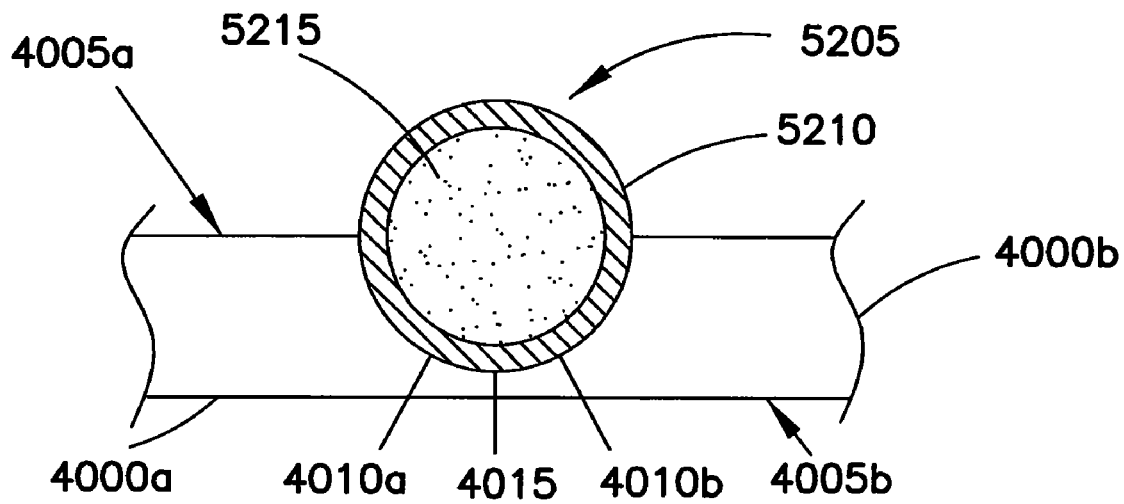
FIGS. 52 and 53 illustrate battery cell interconnection structures having overcurrent protection substructures based on chemical interaction between a chemical released by the substructure and one or more portions of the terminals/terminals of the battery cell interconnection.
Figure 53:
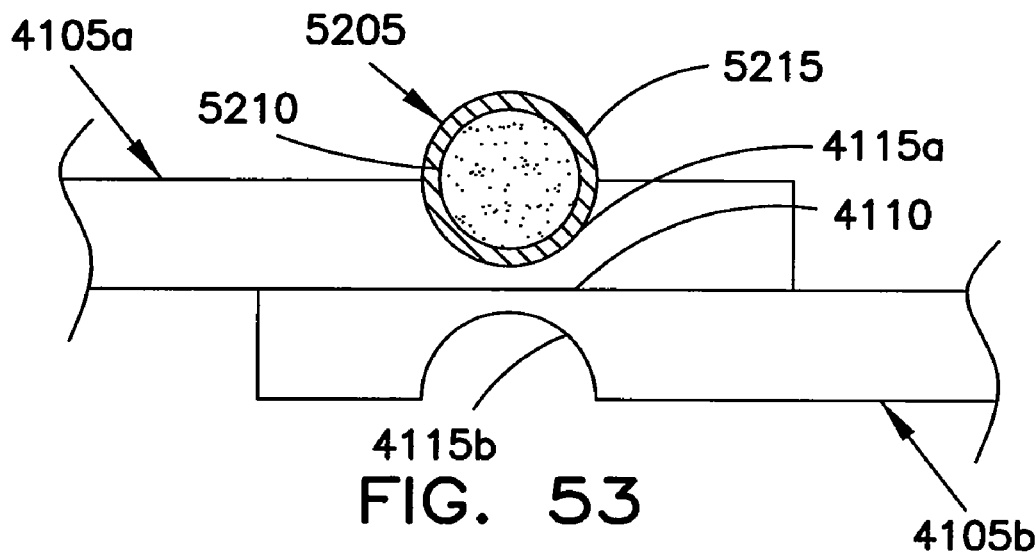

As described above, interconnection structures may include a bonding material between the terminals that melts under the excessively high temperatures that occur due to overcurrent conditions between the battery cells 300a and 300b. Additionally, or in the alternative, the interconnection structures may be provided with substructures that release chemicals which interact with the joint between the terminals so that the terminals are mechanically and electrically separated from one another under such excessively high temperature conditions. FIGS. 52 and 53 show examples of these substructures as applied to the interconnection structures shown in FIGS. 40 and 41, respectively.

In FIG. 52, connector 4005a is connected to battery cell 300a while connector 4005b is connected to battery cell 300b. Transverse arms 4000a and 4000b terminate at respective arcuate portions 4010a and 4010b that join with one another at connection region 4015. Connection region 4015 may include a bonding material such as solder. The arcuate regions 4010a and 4010b are sufficiently strong to facilitate mechanical and electrical interconnection between the connectors 4005a and 4005b under normal operating conditions. However, the thinning of these material regions produces a weakened connection structure at which the connection between the transverse members 4000a and 4000b is severed when subject to forces that occur during a vehicle accident/collision.

One embodiment of a substructure which releases chemicals that interact with the connection region 4015 is shown generally at 5205. In this embodiment, the substructure 5205 includes an outer casing 5210 that contains a chemically reactive material 5215. The casing 5210 has a generally circular cross-section and is adapted to fit within the arcuate regions 4010a and 4010b. Other cross-sectional shapes may be used depending on the particular structure of the terminals that are employed. The casing material should meet several requirements. For example, the casing material should be capable of being bonded with the materials of the arms 4005a and 4005b. Additionally, the casing material should be non-reactive with the chemically reactive material 5215. Further, the temperature at which the casing material begins to melt should be close to the temperature generated during an overcurrent condition. The casing material may be a synthetic resin, rubber, ceramic, or the like. Preferably, the casing is formed from a plastic and/or rubber compound having a melting temperature between 100° C. and 350° C., depending on the overtemperature requirements. Such materials may include PP, PE, ABS, PPO, PPS, PTFE, and PEEK.

The chemically reactive material 5215 is preferably a liquid at the overcurrent temperature. It may or may not be a solid at normal operating temperatures. For example, it may be an acidic or basic chemical solution that is reactive with the material at connection region 4015. Preferably, the chemical is a basic chemical including, for example, NaOH.

Under normal conditions, the temperature of the arms 4000a and 4000b are below the melting point of any material at interconnection region 4015 as well as below the melting point of the casing 5210 of the chemically reactive element 5205. As the temperature increases due to, for example, an overcurrent condition, the casing 5210 begins to melt. As the casing 5210 melts, the chemically reactive material 5215 is released and engages the materials of arms 4000a and 4000b as well as any material in interconnection region 4015. The released chemical reacts with the material at interconnection region 4015, arm 4000a, and/or arm 4000b. The reaction is destructive and results in electrical disconnection of the arms 4000a and 4000b from one another.

In FIG. 53, connector 4105a is connected to battery cell 300a while connector 4100b is connected to battery cell 300b. Transverse arms 4100a and 4100b overlap one another at region 4110 where the connectors 4105a and 4105b are mechanically and electrically joined with one another. Each transverse arm 4100a, 4100b includes a respective arcuate region 4115a, 4115b at which the material forming the transverse arm is thinned. The transverse arms 4100a and 4100b are aligned so that arcuate regions 4115a and 4115b overlie one another in connection region 4110. The resulting structure is sufficiently strong to facilitate mechanical and electrical interconnection between the connectors 4105a and 4105b under normal operating conditions. However, the thinning of the material regions at the joined arcuate regions 4115a and 4115b produces a weakened connection structure at which the connection between the transverse members 4100a and 4100b is severed when subject to forces that occur during a vehicle accident/collision.

As in FIG. 52, the interconnection structure of FIG. 53 includes a substructure 5205 which may release chemicals that interact with the connection region 4110 under overtemperature/overcurrent conditions. The substructure 5205 includes outer casing 5210 that contains the chemically reactive material 5215. The casing 5210 may have a generally circular cross-section and be adapted to fit within the arcuate regions 4115a and 4115b. Operation of the substructure 5205 with respect to the region 4110 is substantially similar to the operation described in connection with FIG. 52.

The interconnection structures shown in FIGS. 52 and 53 are based on a horizontal alignment of the arms of the terminals connecting batteries 300a and 300b. It will be recognized, however, that a substructure of the type generally shown at 5205 may be used in other interconnection structure orientations. In such alternate orientations, the substructure 5205 is constructed and aligned with the terminals so that the reactive material 5215 is released to sever the electrical connection between the terminals. Still further, the substructure 5205 may be positioned on a single one of the terminals to sever the electrical connection between the terminals.

Overcurrent protection may also be based on the removal of a conductive liquid between the terminals of battery cells 300a and 300b. More particularly, the conductive liquid is present between the terminals of the battery cells 300a and 300b under normal operating conditions so that the terminals are electrically interconnected with one another to conduct current. The conductive liquid is drained from between the terminals of the battery cells 300a and 300b when the temperature of the terminals is elevated due, for example, to an overcurrent condition or other system fault.

Figure 54:
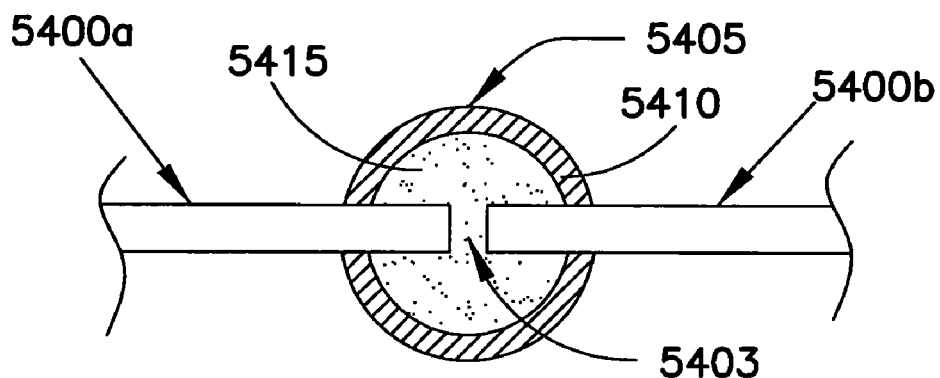

FIG. 54 shows one embodiment of an overcurrent protection substructure based on this principle. In this embodiment, terminal 5400a is connected to battery cell 300a and terminal 5400b is connected to battery cell 300b. Terminals 5400a and 5400b are mechanically isolated from one another at a separation region 5403. Electrical connection between terminals 5400a and 5400b is established using interconnection substructure 5405. The interconnection substructure 5405 includes a casing 5410 that holds a liquid conductor 5415 therein. The liquid conductor 5415 establishes an electrical connection between terminal 5400a and 5400b in region 5403. Metals, metal alloys, and conductive solutions may be used as the liquid conductor 5415. Preferably, the liquid conductor 5415 is mercury or an Na—K alloy. The casing 5405 has a generally circular cross-section, but other cross-sectional shapes may be used depending on the particular structure of the terminals that are employed. The casing material may be non-reactive with the liquid conductor 5415. Further, the temperature at which the casing material begins to melt should be close to the temperature generated during an overcurrent condition. The casing material may be a synthetic resin, rubber, ceramic, or the like. Preferably, the casing is formed from a plastic and/or rubber compound having a melting temperature between 100° C. and 350° C., depending on the overtemperature requirements. Such materials may include PP, PE, ABS, PPO, PPS, PTFE, and PEEK.

Under normal conditions, the temperature of the arms 5400a and 5400b are below the melting point of the casing 5410, and the liquid conductor 5415 is retained in region 5403 to facilitate current flow between terminals 5400a and 5400b. As the temperature increases due to, for example, an overcurrent condition, the casing 5410 begins to melt. As the casing 5410 melts, the liquid conductor 5415 is released from the casing 5410 and open circuits region 5403. Further current flow between batteries 300a and 300b through terminals 5400a and 5400b ceases.

FIGS. 55 through 57B show a further embodiment of an interconnection structure in which overcurrent protection is based on the removal of a conductive liquid between the terminals of battery cells 300a and 300b. In this embodiment, the overcurrent protection substructure, shown generally at 5500, is constructed to operate with terminals that extend horizontally from each battery cell. As shown, terminal 5400a is connected to and extends horizontally from battery cell 300a. Terminal 5400b is connected to and extends horizontally from battery cell 300b. Each terminal 5400a and 5400b extends from the respective battery into a conduction chamber 5505 of the overcurrent protection substructure 5500. A collection chamber 5510 is disposed below the conduction chamber 5505. The conduction chamber 5505 and collection chamber 5510 are made from an insulating material such as plastic, rubber, ceramic, or the like. During normal battery system operation, the conduction chamber 5505 and collection chamber 5510 are sealed in a manner to prevent leakage from one chamber to the other.

The protection substructure 5500 may be assembled in a number of different manners. FIG. 56 shows one such manner. In FIG. 56, the substructure 5500 is formed from two portions 5600a and 5600b. Portion 5600a is connected to and sealed with terminal 5400a. Portion 5600b is connected to and sealed with terminal 5400b. Each portion 5600a and 5600b includes half of the conduction chamber 5505 and half of the collection chamber 5510. The portions 5600a and 5600b may be joined with one another using a hot melt connection, rubber connection, adhesive connection, welded joint, or the like. The portions 5600a and 5600b may be sealed with the corresponding terminals 5400a and 5400b using injection molding, hot melting, adhesive bonding, penetration agents sealing, or the like. The method used to join the portions to one another and to the terminals should be sufficient to prevent leakage of any liquid from either the conduction chamber 5505 or the collection chamber 5510.

Figure 57A:
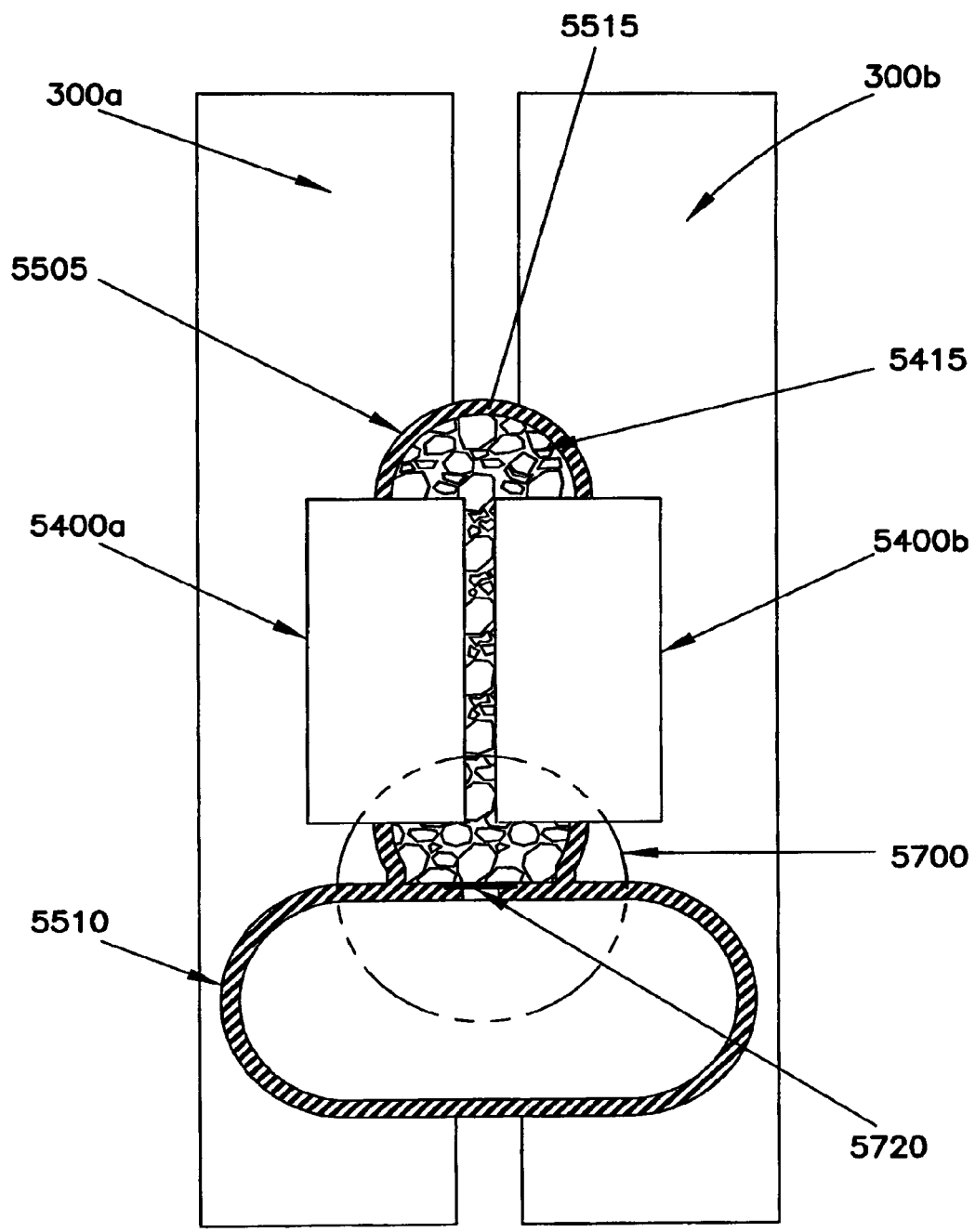
Figure 57B:
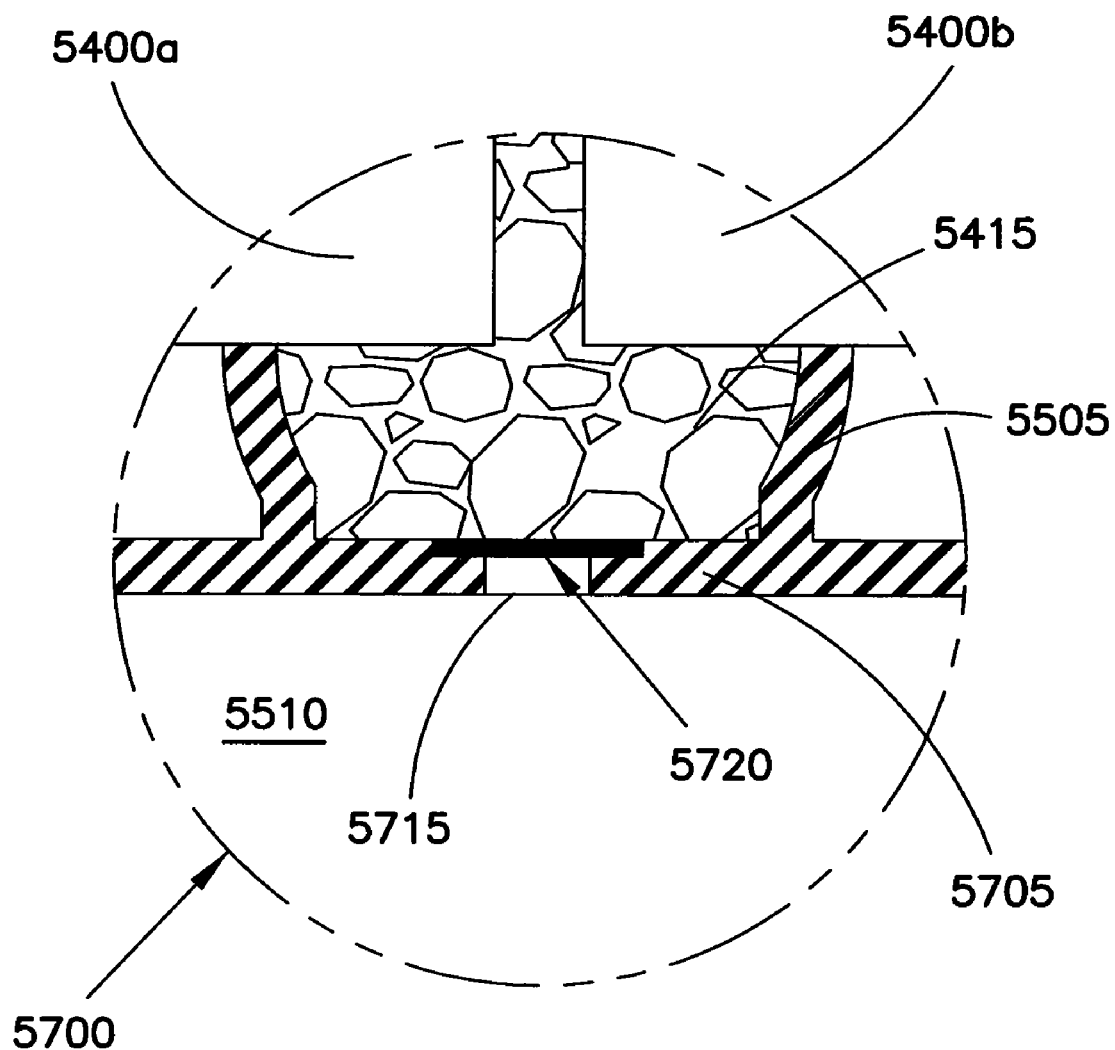

FIGS. 57A and 57B are cross-sectional views through the protection substructure 5500 during normal operation of the battery system. During normal operation, a liquid conductor 5415 of the type described above is contained within the conduction chamber 5505 and establishes an electrical connection between terminal 5400a and terminal 5400b. The liquid conductor 5415 may be injected into the conduction chamber 5505 through an opening 5515 disposed at an upper portion of the conduction chamber 5505. Once the conduction chamber 5505 has been filled with the desired amount of liquid conductor 5415, the opening 5515 may be closed with a plug or other type of seal.

The conduction chamber 5505 is sealed from the collection chamber 5510 to prevent leakage of the liquid conductor 5415 from the conduction chamber 5505 to the collection chamber 5510. FIG. 57B shows one manner of sealing the conduction chamber 5505 from the collection chamber 5510. In this example, the conduction chamber 5505 terminates at a lower chamber wall 5705 that separates the conduction chamber 5505 from the collection chamber 5510. The lower chamber wall 5705 includes a flow opening 5715 that is normally sealed by a separation member 5720. Separation member 5720 may be made from a plastic and/or rubber material having a melting temperature between about 100° C. and 350° C., depending on the desired temperature at which the overcurrent protection is to be activated. Suitable materials include, for example, PP, PE, ABS, PPO, PPS, PTFE, and/or PEEK.

During an overcurrent/battery failure condition, the temperature of the liquid conductor 5415 will increase. As the temperature reaches the melting point of the separation member 5720, the separation member 5720 will become ineffective in sealing the conduction chamber 5505 from the collection chamber 5510. The liquid conductor 5415 will flow from the conduction chamber 5505 to the collection chamber 5510 through the flow opening 5715. The flow may occur under the force of gravity and/or under the force generated by an elevated pressure in the conduction chamber 5505 (e.g., the force resulting from the overcurrent temperature of the liquid conductor 5415). As the liquid conductor 5415 exits the conduction chamber 5505, it will create an open circuit condition between terminals 5400a and 5400b. In order to ensure that all of the liquid conductor 5415 drains from the conduction chamber 5505, the volume of the collection chamber 5510 should be at least equal to or greater than the volume of the conduction chamber 5505.

The protection substructure 5500 is easily manufactured and readily repaired/recycled. By collecting the liquid conductor 5415 in the collection chamber 5510, it may be reused in a repaired or new protection substructure 5500. This is particularly beneficial if the liquid conductor 5415 is not environmentally friendly. Additionally, the protection substructure 5500 may be easily repaired by directing the liquid conductor 5415 back into the conduction chamber 5505 and replacing the sealing member 5720.

Figure 58:
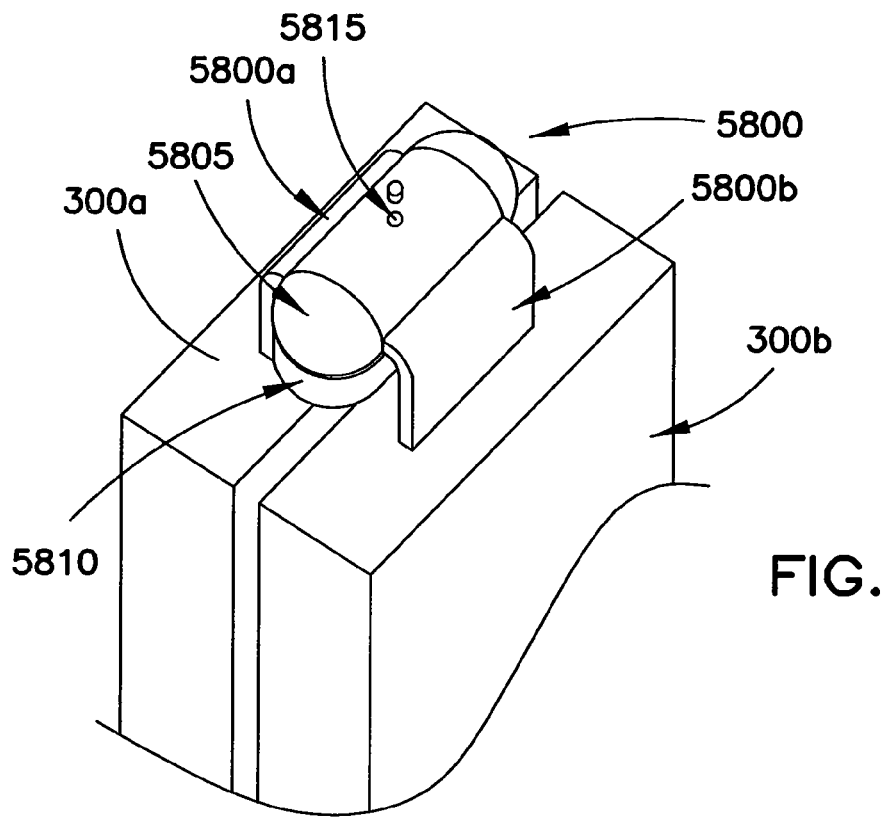
Figure 59:
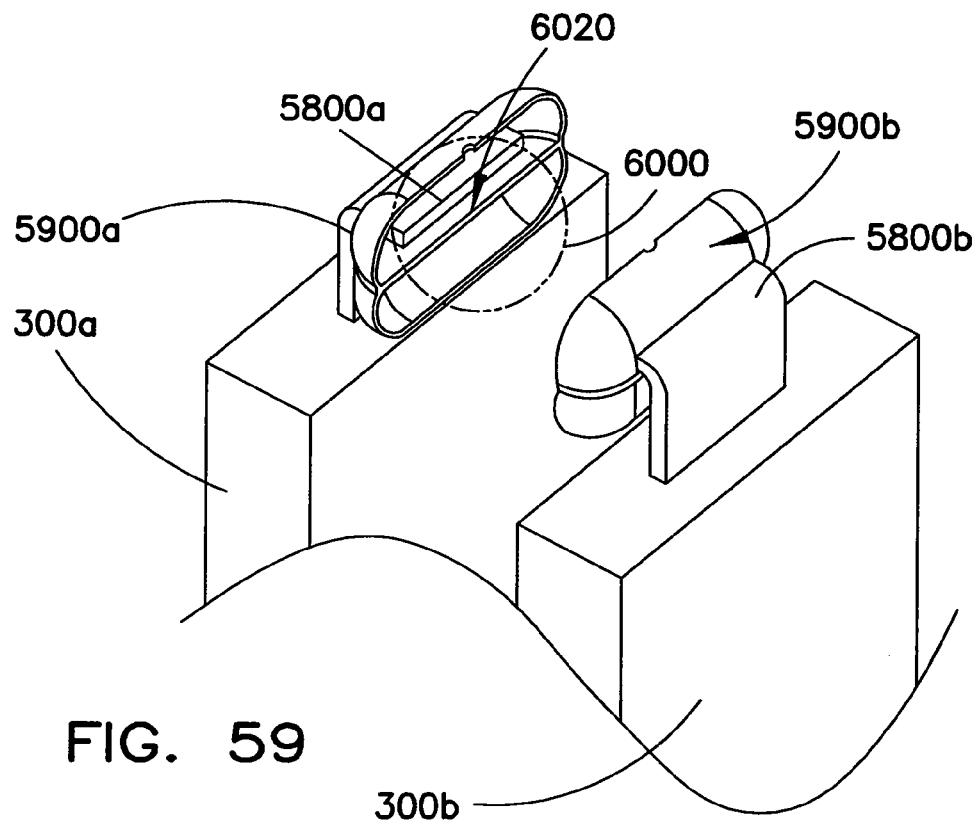
Figure 60:
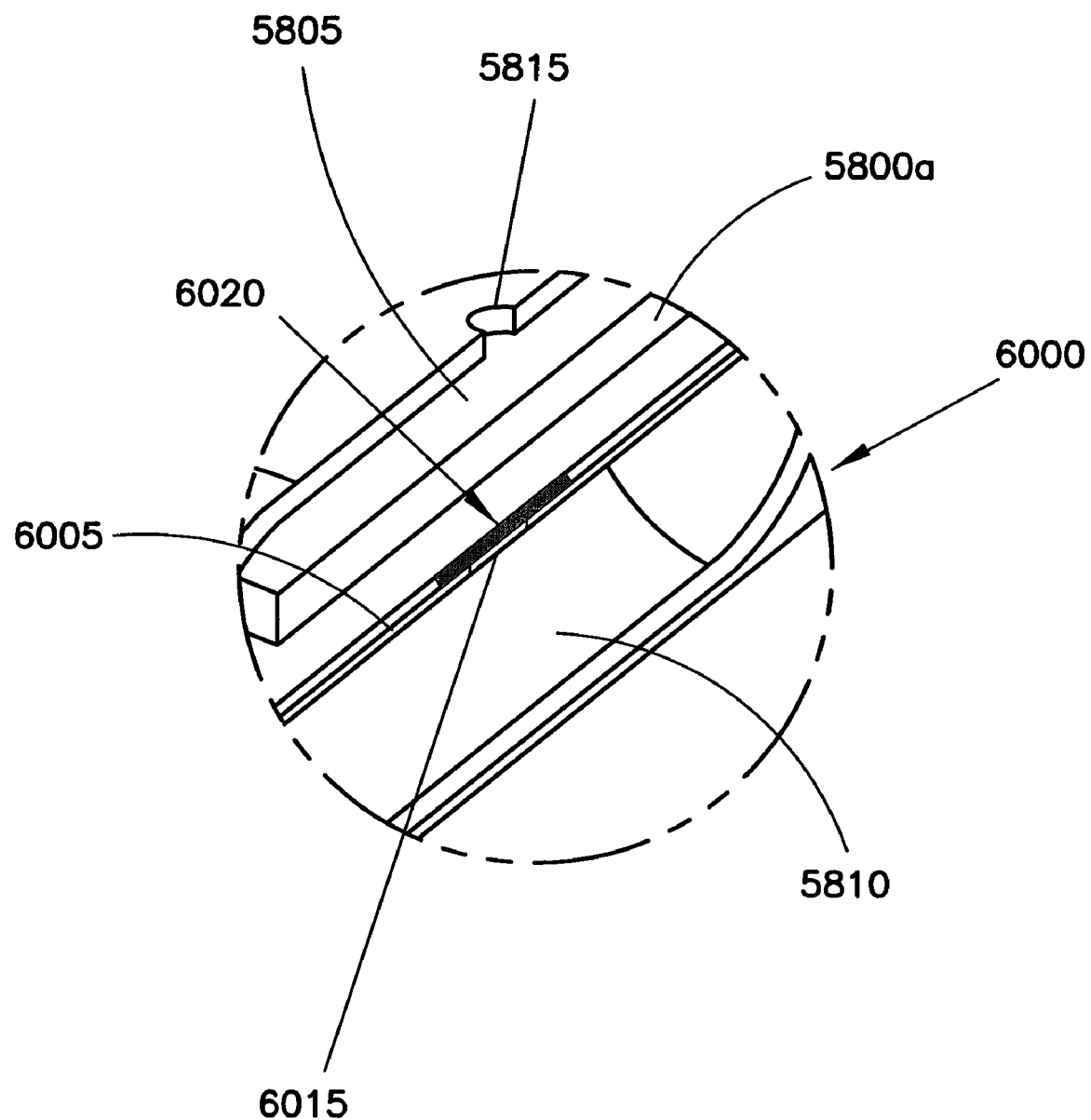

FIGS. 58 through 60 show a still further embodiment of an interconnection structure in which overcurrent protection is based on the removal of a conductive liquid between the terminals of battery cells 300a and 300b. In this embodiment, the overcurrent protection substructure, shown generally at 5800, is constructed to operate with terminals that extend vertically from the respective battery cell. As shown, terminal 5800a is connected to and extends vertically from battery cell 300a. Terminal 5800b is connected to and extends vertically from battery cell 300b. Each terminal 5800a and 5800b extends from the respective battery into a conduction chamber 5805 of the overcurrent protection substructure 5800. A collection chamber 5810 is disposed below the conduction chamber 5805. The conduction chamber 5805 and collection chamber 5810 are made from an insulating material such as plastic, rubber, ceramic, or the like. During normal battery system operation, the conduction chamber 5805 and collection chamber 5810 are sealed in a manner to prevent leakage from one chamber to the other.

The protection substructure 5800 may be assembled in a number of different manners. FIG. 59 shows one such manner. In FIG. 59, the substructure 5800 is formed from two portions 5900a and 5900b. Portion 5900a is connected to and sealed with terminal 5900a. Portion 5900b is connected to and sealed with terminal 5800b. Each portion 5900a and 5900b includes half of the conduction chamber 5805 and half of the collection chamber 5810. The portions 5900a and 5900b may be joined with one another using a hot melt connection, rubber connection, adhesive connection, welded joint, or the like. Further, the portions 5900a and 5900b may be sealed with the corresponding terminals 5800a and 5800b using injection molding, hot melting, adhesive bonding, penetration agent sealing, or the like. The methods used to join the portions to one another and to the terminals should be sufficient to prevent leakage of any liquid from either the conduction chamber 5805 or the collection chamber 5810.

FIG. 60 is a cross-sectional view through the protection substructure 5800. During normal operation, a liquid conductor 5415 of the type described above is contained within the conduction chamber 5805 and establishes an electrical connection between terminal 5800a and terminal 5800b. The liquid conductor 5415 may be injected into the conduction chamber 5805 through an opening 5815 disposed at an upper portion of the conduction chamber 5805. Once the conduction chamber 5805 has been filled with the desired amount of liquid conductor 5415, the opening 5815 may be closed with a plug or other type of seal.

The conduction chamber 5805 is sealed from the collection chamber 5810 to prevent leakage of the liquid conductor 5415 from the conduction chamber 5805 to the collection chamber 5810. In FIG. 60, the conduction chamber 5805 terminates at a lower chamber wall 6005 that separates the conduction chamber 5805 from the collection chamber 5810. The lower chamber wall 6005 includes a flow opening 6015 that is normally sealed by a separation member 6020. Separation member 6020 may be made from a plastic and/or rubber material having a melting temperature between about 100° C. and 350° C., depending on the desired temperature at which the overcurrent protection is to be activated. Suitable materials include, for example, PP, PE, ABS, PPO, PPS, PTFE, and/or PEEK.

Figure 12:
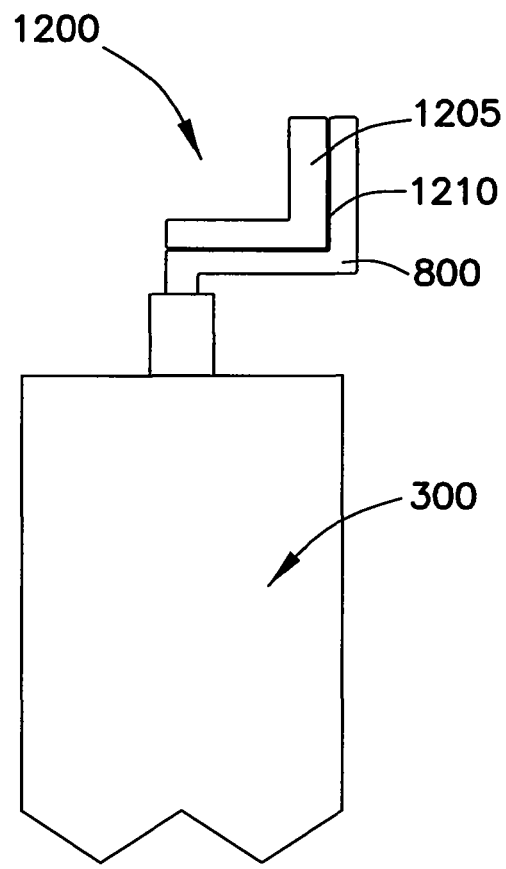
FIGS. 12 and 13 show a connection structure that may be utilized to bring the core of a battery cell to an optimal operating temperature.
Figure 13:
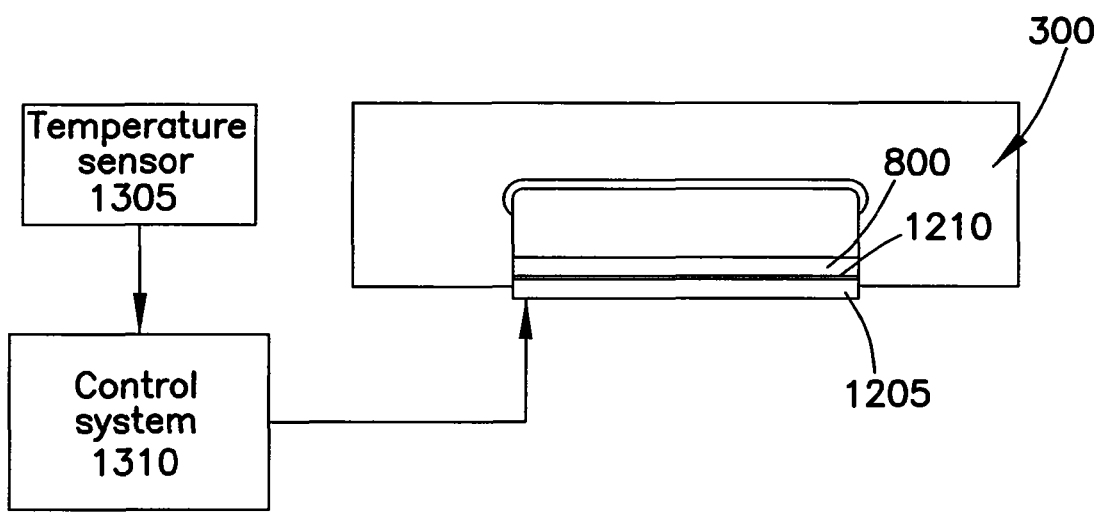

During an overcurrent/battery failure condition, the temperature of the liquid conductor 5415 will increase. As the temperature reaches the melting point of the separation member 6020, the separation member 6020 will become ineffective in sealing the conduction chamber 5805 from the collection chamber 5810. The liquid conductor 5415 will flow from the conduction chamber 5805 to the collection chamber 5810 through the flow opening 6015. The flow may occur under the force of gravity and/or under the force generated by an elevated pressure in the conduction chamber 5805 (e.g., the force resulting from the overcurrent temperature of the liquid conductor 5415). As the liquid conductor 5415 exits the conduction chamber 5805, it will create an open circuit condition between terminals 5800a and 5800b. In order to ensure that all of the liquid conductor 5415 drains from the conduction chamber 5805, the volume of the collection chamber 5810 should be at least equal to or greater than the volume of the conduction chamber 5805. FIGS. 12 and 13 show a connection structure 1200 that may be utilized to bring the core of battery cell 300 to an optimal operating temperature when the ambient temperature falls below a predetermined threshold. Connection structure 1200 includes a heating element 1205, such as a ceramic heater, that is secured to bent connector 800. A layer of a thermally conductive material 1210 is disposed between the bent connector 800 and the heating element 1205. Heating element 1205 may have an L-shaped cross-section and be dimensioned to conform with a surface of bent connector 800 opposite the surface used to establish electrical contact with an adjacent battery cell. Layer 1210 may be formed from a material, such as a thermally conductive rubber, which serves as a conductive heating element, an electrical insulator, and/or as an adhesive between the heating element 1205 and the bent connector 800. Additionally, or in the alternative, bent connector 800 and heating element 1205 may be secured with one another using a mechanical fastener that is formed from an electrical insulator, such as PA66.

FIG. 13 shows a system that may be used to raise the temperature of the core of battery cell 300 when temperature conditions indicate that the core is at or may fall below a predetermined temperature threshold. As shown, the system includes a temperature sensor 1305 that is disposed to monitor a temperature associated with the need for core heating. The temperature sensor 1305 may be disposed to monitor the ambient temperature of the vehicle, the ambient temperature of the battery system environment, the temperature of the battery cell 300, and/or other desired temperature. The temperature information is provided to a control system 1310. The control system 1310 uses the temperature sensor information to determine when the temperature detected by the sensor 1305 falls below a predetermined threshold. When this occurs, the control system 1310 directs electrical power to the heating element 1205. The electrical power may be provided by a generator connected to a gas powered engine of the vehicle and/or by a battery power system. Heating element 1205 responds to the electrical power by generating heat which is transferred through the layer 1210 to the bent connector 800. Bent connector 800, in turn, acts as a thermally conductive element that transfers heat to the interior of battery cell 300 thereby raising the temperature of the coiled core 200.

Figure 14A:
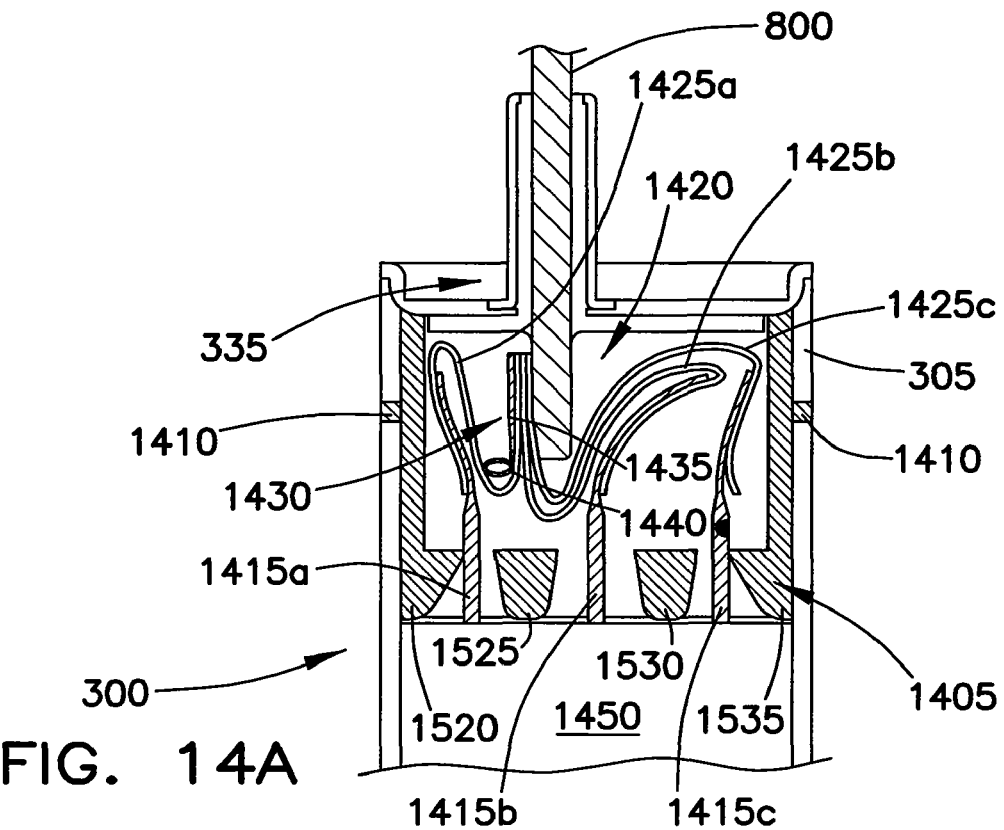
FIG. 14A shows one manner of connecting a multiple core battery cell to the bent connector of FIG. 8.

FIG. 14A shows one manner of connecting a multiple core structure 1450 of a battery cell 300 to the bent connector 800. In this embodiment, the multiple core structure 1450 includes three separate cores that are each constructed in the manner of core 200. For the sake of simplicity, only a single end of the battery cell 300 is shown, although the same basic structure may be used for connecting the opposite end of the multiple core structure 1450 with a corresponding end connector 800.

In FIG. 14A, multiple core structure 1450 is disposed within the rectangular protective shell 305. An end cover assembly 335 engages with and seals an opening at the end of shell 305. A gasket 1405 formed from an electrically insulating material is disposed within the shell 305 and positioned between the end of multiple core structure 1450 and the end cover assembly 335. Bent connector 800 extends into the interior of the battery shell 305 through the end cover assembly 335 so that it is offset from a centerline running longitudinally through the shell 305.

Figure 15:
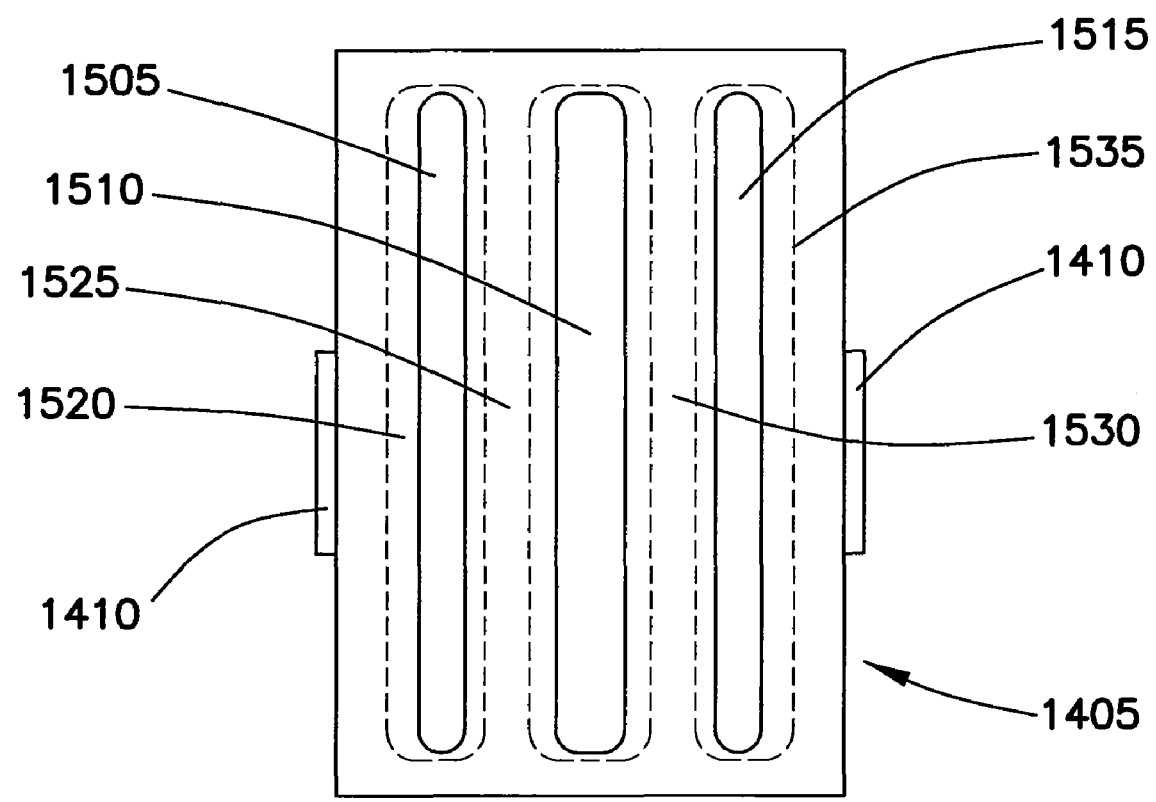
FIG. 15 is a plan view of a gasket used at each end of the protective shell of the battery cell.

A plan view of the gasket 1405 is shown in FIG. 15. The gasket 1405 includes three openings 1505, 1510, and 1515. Each opening is defined by a respective set of contoured elements disposed on each side of the opening. Opening 1505 is defined by contoured elements 1520 and 1525, opening 1510 by contoured elements 1525 and 1530, and opening 1515 by contoured elements 1530 and 1535. Each contoured element includes a rounded surface at a side proximate the coiled core 200 and a respective planar surface opposite the rounded surface. Contoured elements 1525 and 1530 are spaced from one another so that opening 1510 is larger than openings 1515 and 1520. As a result, the planar surface of contoured element 1525 is positioned to facilitate protection of the core 200 in the event that the bent connector 800 is driven toward the core 200 under extraordinary forces, such as those that may occur during a vehicle collision.

With reference again to FIG. 14A, current collector strips 1415 extend from the anode (or cathode) of each core 200 of the multiple core structure 1450. Each current collector strip 1415 may be formed from one or more foil layers, such as the foil layers forming the substrate layers of the anode (or cathode) of each core 200. Although each current collector strip 1415 is shown as a single foil layer, each current collector strip 1415 may also be formed from multiple foil layers that are grouped with one another as they extend from the anode (or cathode) of each core 200 of the multiple core structure 1450. In FIG. 14A, there are three current collector strips 1415a, 1415b, and 1415c that extend from the anode (or cathode) of a respective core 200 of the multiple core structure 1450. These current collector strips extend through respective openings 1505, 1510, and 1515 and into a cavity 1420 of the gasket 1405. Within cavity 1420, each current collector strip 1415a, 1415b, and 1415c is electrically and mechanically bonded to a respective flexible connector foil 1425a, 1425b, and 1425c. Various connection processes may be used to join the structures including, without limitation, ultrasonic welding, resistance welding, laser welding, and/or another binding process.

As shown in Figure of 14A, the connector foils 1425a, 1425b, and 1425c are coiled within the cavity 1420 to join at a common side of the bent connector 800. Connector foils 1425b and 1425c are coiled within a first side of the cavity 1420 while connector foil 1425a is coiled within a second side of the cavity 1420. The first side of the cavity 1420 is larger than the second side of the cavity 1420 due to the offset of the connector 800 with respect to the longitudinal centerline of the shell 305. Consequently, connector foils 1425b and 1425c have more room in which to coil around to fasten with the connector 800 than connector foil 1425a. The angles at which the connector foils 1425b and 1425c are bent, therefore, are relatively gradual. Gradual bending angles are more desirable than drastic bending angles and are less likely to result in breakage of the corresponding connector foil. However, connector foil 1425a is disposed in a smaller portion of cavity 1420. As such, connector foil 1425a may require a more drastic bend angle in order to coil around for connection to the connector 800. Drastic bending angles are subject to substantial mechanical and thermal fatigue and may result in breakage of the connector foil 1425a.

In order to render the bending configuration of the connector foil 1425a more reliable, a coil guide member 1430 is bonded to the connector foil 1425a. Coil guide member 1430 includes a bonding portion 1435 and a rounded portion 1440. The bonding portion 1435 is secured with the connector foil 1425a exterior to its connection with the other connector foils 1425b and 1425c. Rounded portion 1440 has a shape and diameter that directs connector foil 1425a to bend at a gradual angle as it approaches the bent connector 800 thereby increasing the reliability of the connector foil 1425a. Further, coil guide member 1430 may be dimensioned to drive the collector 1415a and connector foil 1425a toward a side wall of the gasket 1405. In this manner, the collector 1415a and connector foil 1425a do not experience as much movement as might otherwise occur when the battery cell 300 is vibrated. Similarly, the lengths of connector foils 1425b and 1425c may be selected so that the corresponding bending configuration limits vibration of these components within the chamber 1420. The reliability and safety of the battery cell 300 is increased with such structures.

The use of the coil guide member 1430 may be extended to assemblies having more than three connector foils as well as assemblies having less than three connector foils. In each instance, the coil guide member 1430 is preferably secured to a connector foil that bends on the side at which it is connected to bent connector 800 as opposed to a connector foil that coils below and around bent connector 800 for connection. Further, additional coil guide members may be secured with connector foils 1425b and 1425c to prevent unnecessary bending of these connector foils as well.

Figure 14B:
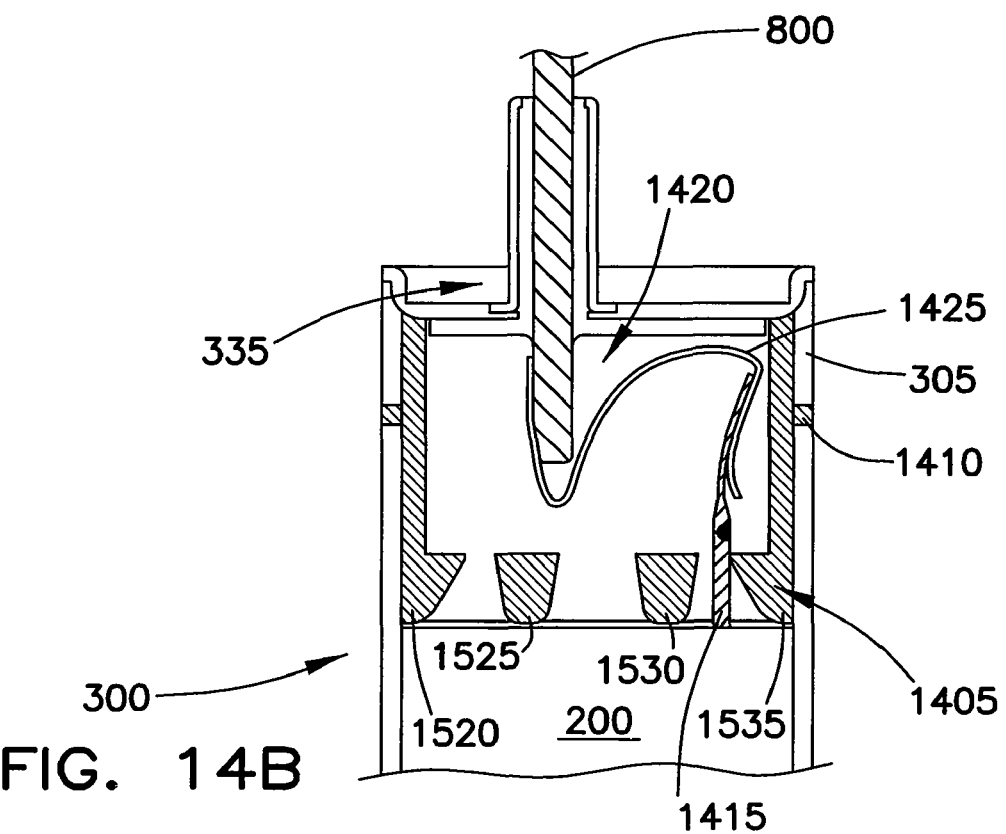
FIG. 14B shows one manner of connecting a single core structure of a battery cell to the bent connector of FIG. 8.

FIG. 14B shows one manner of connecting a core of a battery cell 300 to the bent connector 800. In this embodiment, only a single core 200 is utilized. Accordingly, only a single current collector 1415 extends from the core 200 for electrical connection with the bent connector 800. To reduce the degree of the angles that need to be formed in connecting foil 1425 to reach bent connector 800, the current collector 1415 is disposed through the opening 1515 that is furthest from the bent connector 800. In all other respects, the end cover 300 of FIG. 14B is the same as the one shown in FIG. 14A.

The gasket 1405 may include tabs 1410 that engage corresponding recesses in the protective shell 305. Tabs 1410 may be used to secure the gasket 1405 in the shell 305. Additionally, or in the alternative, gasket 1405 may be secured within the protective shell 305 through welding, one or more mechanical fasteners, an adhesive, or other connection mechanism.

Gasket 1405 assists in protecting the core 200 in several different ways. For example, the portion of the gasket 1405 proximate the core 200 helps maintain the core 200 in proper longitudinal alignment within the interior of the protective shell 305. The offset contoured member 1525 assist in preventing the connector 800 and the connections at its side face from contacting the core 200 during an accident or mechanical failure. The narrowing of the openings provided by contoured members 1520, 1525, 1530, and 1535 help guide current collectors 1415a, 1415b, and 1415c into the chamber 1420 during the manufacturing of battery cell 300. Still further, gasket 1405 helps to stiffen the protective shell 305 to provide increased protection to the coiled core 200.

Figure 16:
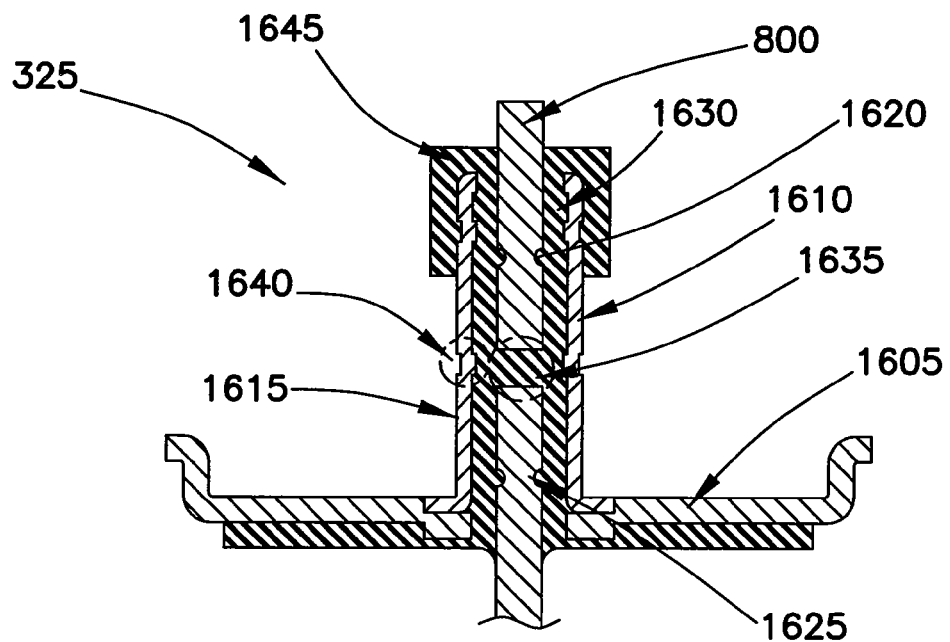
FIGS. 16 and 17 show one manner of sealing the end of the protective shell that surrounds the periphery of the coiled core.
Figure 17:
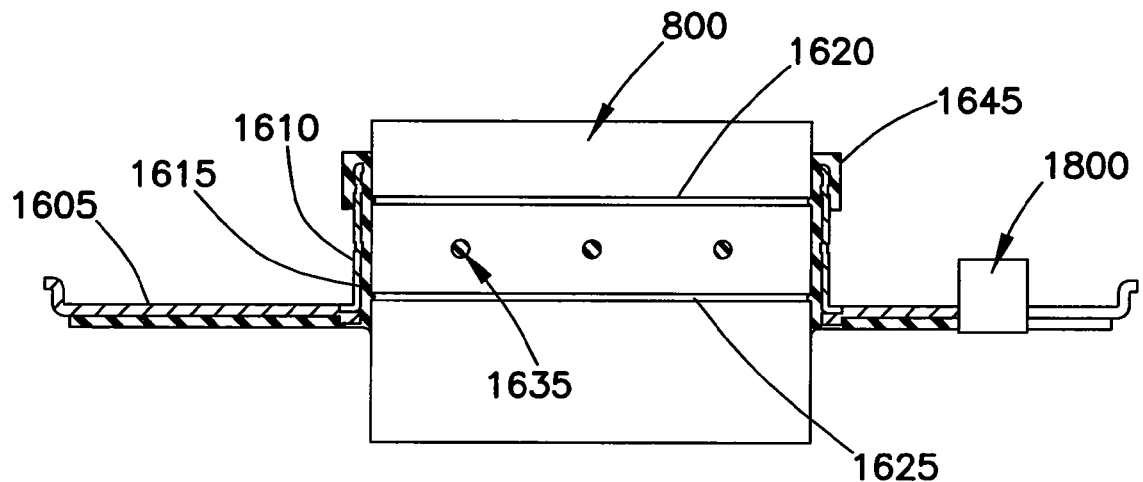

FIGS. 16 and 17 show one manner of sealing the end of protective shell 305 with the end cover assembly 325. FIG. 16 is a cross-sectional view through a transverse section of the end cover assembly 325 while FIG. 17 is a cross-sectional view through a longitudinal section of the and cover assembly 325.

End cover assembly 325 includes a cover plate/end cap 1605, a scabbard 1610, connector 800, and a sealing material 1615. To manufacture the end cover assembly 325, the cover plate 1605 and scabbard 1610 are welded to one another to form an integral structure. Without limitation, the welding operation may include laser welding, argon arc welding, and other welding processes. The cover plate 1605 and scabbard 1610 may be formed from stainless steel. Once the cover plate 1605 and scabbard 1610 have been welded to one another, they may be placed over the connector 800 which extends from an interior portion of the battery cell to an exterior portion. End cover assembly 325 includes a cover plate 1605, a scabbard 1610, connector 800, and a sealing material 1615. To manufacture the end cover assembly 325, the cover plate 1605 and scabbard 1610 are welded to one another to form an integral structure. Without limitation, the welding operation may include laser welding, argon arc welding, and other welding processes. The manufacturing operations that take place after the cover plate 1605 and scabbard 1610 have been welded to one another are not heat intensive. Consequently, the likelihood that other components of the battery cell will suffer damage as a result of the manufacturing of the end cover assembly 325 is reduced.

The cover plate 1605 and scabbard 1610 may be formed from stainless steel. Before further processing, the surfaces of the cover plate 1605, scabbard 1610, and connector 800 that will be contacted by the sealing material 1615 may be abraded to increase adhesion between these structures and the sealing material 1615.

With reference to both FIGS. 16 and 17, the connector 800 includes upper channels 1620 disposed on opposed faces of the connector 800 and lower channels 1625 disposed on opposed faces of the connector 800. The upper and lower channels 1620 and 1625 extend substantially along the length of connector 800. Channels 1620 are positioned so that they are generally juxtaposed to inwardly extending lips 1630 of the scabbard 1610.

Connector 800 also includes a plurality of via holes 1635 that extend completely through the width of the connector. As shown in FIG. 16, the via holes 1635 are positioned adjacent a further set of inwardly extending lips 1640 of the scabbard 1610. As shown in FIG. 17, the via holes 1635 may be disposed at various positions along the length of the connector 800 and between the channels 1620 and 1625.

Once the cover plate 1605 and scabbard 1610 have been welded to one another, the connector 800 is directed to its desired position within an interior channel of the scabbard 1610 and the sealing material 1615 is injected into the interstitial regions between the connector 800, scabbard 1610, and cover plate 1605. The sealing material is injected under high pressure to fill channels 1620, 1625, via holes 1635, as well as the regions around inwardly extending lips 1630 and 1640.

The sealing material 1615 may be a plastic (e.g., PFA, PES, PPS, modified PP, etc.), a rubber compound, a resin (e.g., an epoxy resin, phenol aldehyde modified epoxy resin, etc.), an agglutination rubber (e.g., a double component epoxy, hot melt rubber, etc.). The sealing material 1615 should be an electrical insulator and be capable of sustaining exposure to the electrolyte and hydrochloric acid. Further, the sealing material 1615 should be capable of bonding with the various metals used to form the connector 800, scabbard 1610, and cover plate 1605 (e.g., copper, aluminum, stainless steel, and other metals).

The sealing material 1615 extends beyond the upper portion of the scabbard 1610. More particularly, the sealing material 1615 fills the interior region between the scabbard 1610 and connector 800 and wraps around the outside of the scabbard 1610 to form a protective flange 1645. The protective flange 1645 further enhances the integrity of the seal. Further, the protective flange 1645 may absorb some of the vibrational and impact forces that would otherwise be imparted to the connector 800.

Figure 61:
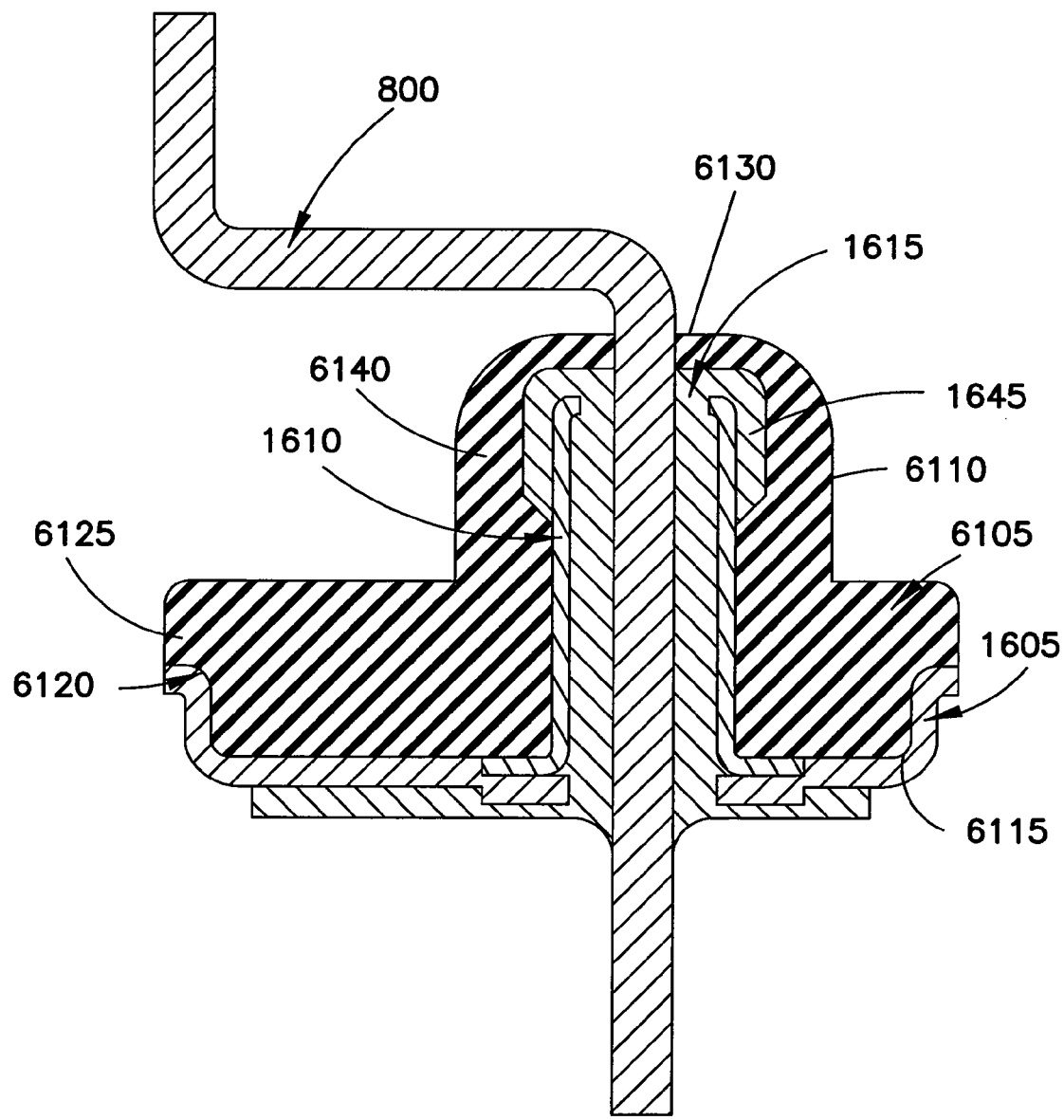
FIGS. 61 through 64 illustrate various embodiments of a protection cover for the end cover assembly of the battery cell.

As shown in FIG. 61, the end cover assembly 325 may include a further protection cover 6105 that generally conforms to the outermost portions of other members of the end cover assembly 325. In the illustrated embodiment, protection cover 6105 includes a first portion 6115 that extends along and conforms with an outer surface of the cover plate 1605. Cover plate 1605 may include a cover plate flange 6120 that engages a corresponding flange 6125 of the first portion 6115. The protection cover 6105 also includes a second portion 6110 that extends at an angle of, for example, about 90° from the first portion 6115. The second portion 6110 extends about and conforms with an outer surface of the scabbard 1610 and protective flange 1645, and terminates in an opening 6130 through which terminal 800 protrudes. Preferably, the second portion 6110 seals with the terminal 800 at the opening 6130. Still further, the second portion 6110 includes an interior flange 6140 that engages the protective flange 1645. The region of the second portion 6110 beneath the interior flange 6140 may be dimensioned so that the protective flange 1645 applies a force against the protection cover 6105 to assist in securing the protection cover 6105 against the cover plate 1605.

The protection cover 6105 may be formed from an electrical insulator. For example, the protection cover 6105 may be formed from a plastic (e.g., PFA, PES, modified PP, or the like), rubber (e.g., EPDM, styrene-butadiene rubber, or the like), resin (epoxy resin, phenolic aldehyde modified epoxy resin, or the like). Such materials are insulators, fire resistant, and are not readily degraded by the electrolyte of the battery cell. By forming the protection cover 6105 using insulating materials, short-circuits resulting from physical distortion of the connector 800 (e.g., during a vehicle collision/accident) with respect to the cover plate 1605 are reduced and/or eliminated. Similarly, the protection cover 6105 may extend about the edge portions of the cover plate 1605 to avoid undesired electrical contact between the battery cell and other battery system structures.

Figure 62:
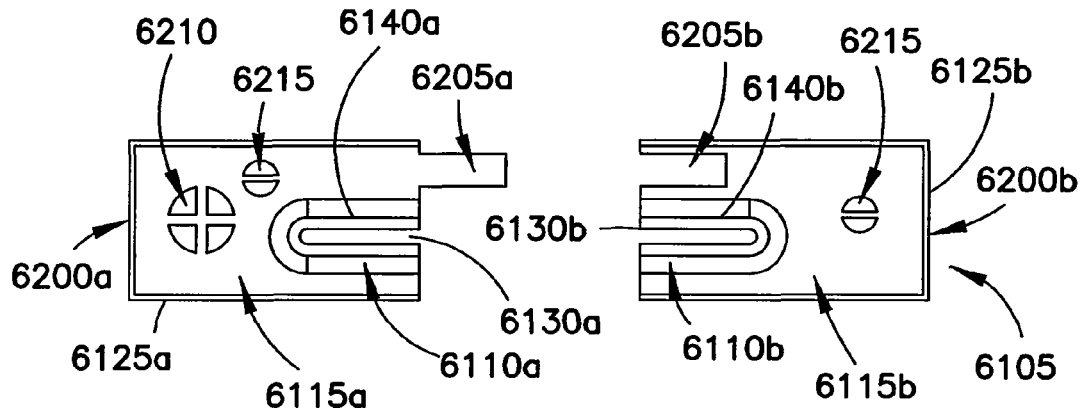
Figure 63:
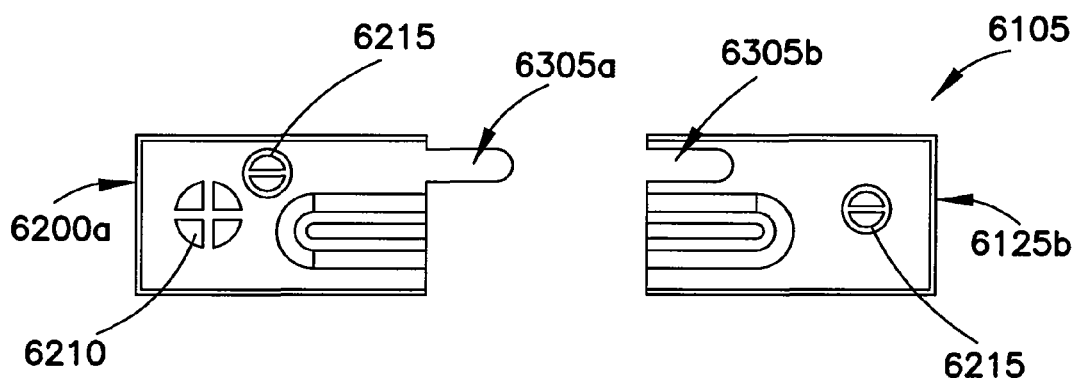
Figure 64:
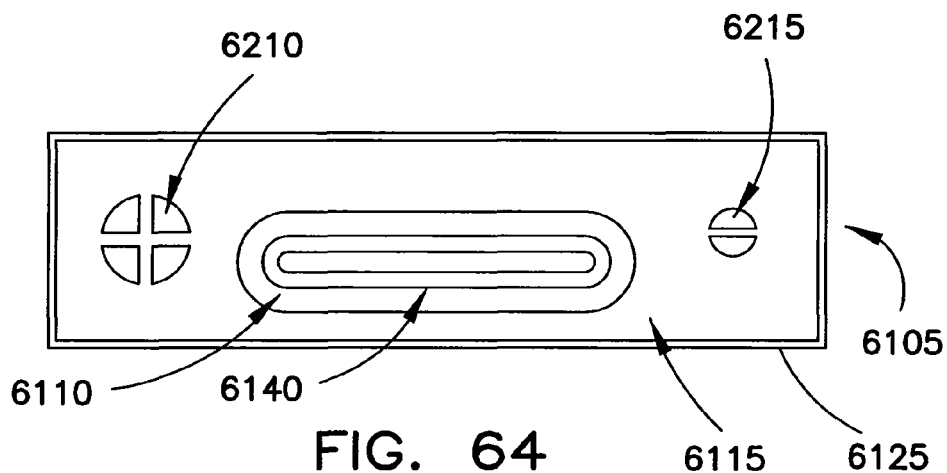

Protection cover 6105 may be formed as an integral structure or multipiece structure. FIGS. 62 and 63 illustrate multipiece protection cover structures while FIG. 64 illustrates an integral protection cover structure.

In FIG. 62, the protection cover 6105 is formed from two individual protection cover halves 6200a and 6200b. Each half 6200a and 6200b includes a respective first portion 6115a, 6115b that is dimensioned to extend along and conform with an outer surface of the cover plate 1605. Each half 6200a and 6200b also includes a respective flange 6125a, 6125b that engages the corresponding cover plate flange 6120. Second portions 6110a, 6110b extend at an angle, for example, of about 90° from the first portions 6115a, 6115b. The second portions 6110a, 6110b are dimensioned to extend about and conform with an outer surface of the scabbard 1610 and protective flange 1645. Openings 6130a, 6130b are disposed through each half 6200a, 6200b and are dimensioned to allow terminal 800 to protrude therethrough. Second portions 6110a, 6110b include interior flanges 6140a, 6140b that engage the protective flange 1645. Protective flange 1645 may apply a force against the interior flanges 6140a, 6140b to assist in securing the protection cover 6105 against the cover plate 1605.

The protection cover halves 6200a, 6200b are joined with one another using mating structures. In FIG. 62, half 6200a includes a rectangular extension 6205a that is dimensioned to engage rectangular opening 6205b of half 6200b. In applying the protection cover 6105 to the end cover assembly 325, halves 6200a and 6200b may be directed laterally toward one another so that the interior flanges 6140a and 6140b engage an underside of the protective flange 1645. Concurrently, the mating structures 6205*a* and 6205*b* are directed toward one another until they are substantially or fully engaged. Depending on the dimensions and characteristics of the protection cover 6105, a bonding agent may be applied to an exterior surface of each of the mating structures 6205*a* and 6205*b* prior to assembly to increase the overall integrity of the protection cover 6105. Other bonding techniques may also be used.

The mating structures may take on a variety of different shapes. In FIG. 63, half 6200*a* includes an oval extension 6305*a* that is dimensioned to engage a corresponding oval opening 6305*b* of half 6200*b*. Other mating structure shapes (e.g., triangular, trapezoidal, or the like) may also be used.

In FIG. 64, the protection cover 6105 is formed as a singular, integrated structure. When formed in this manner, the protection cover material is preferably highly elastic so that the protection cover may be applied to the end cover assembly 325 over terminal 800.

The protection cover 6105 may include visual indicia indicative of the characteristics of the battery cell/terminal. In the protection covers shown in FIGS. 62-64, a visual indicator 6215 of the pole type is provided to identify the corresponding terminal as a cathode terminal or anode terminal. The exemplary indicator 6215 identifies the corresponding terminal 800 as a cathode terminal.

With reference to FIG. 17, the end cover assembly 325 includes a blow out vent 1800. The blow out vent 1800 is adapted to prevent a catastrophic rupture of the battery cell 300 in the event that the interior pressure of the battery cell 300 reaches an unsafe level. If this pressure is not relieved, the battery cell 300 may explode. In each of FIGS. 62 through 64, the protection cover 6105 includes an exhaust vent 6210 that overlies the blow out vent 1800 so that the protection cover does not prevent the release of gases and/or other materials from the blow out vent 1800.

Figure 18:
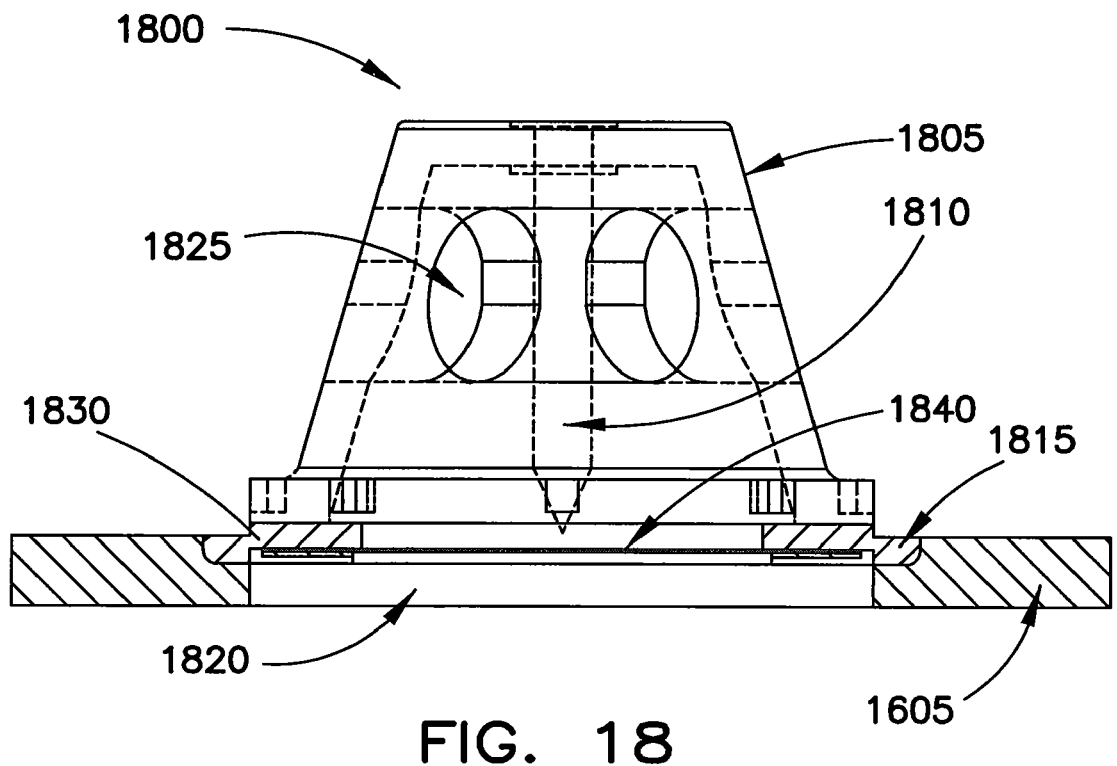
FIGS. 18-20 show one embodiment of a blow out assembly that may be used on the end cover assembly of a battery cell.

FIG. 18 shows one embodiment of a blow out assembly 1800 that may be used on the end cover assembly 325. Blow out assembly 1800 includes a vent cover 1805, a rupture pin 1810, and a vent base 1815. As shown, the blow out assembly 1800 is secured over an exhaust vent 1820 of the cover plate 1605.

The vent cover 1805 may be in the form of a truncated trapezoidal cone with an exposed bottom surface. A plurality of exhaust openings 1825 are disposed through the sides of the vent cover 1805. The cumulative area of the exhaust openings 1825 should be greater than the area of opening 1820. The rupture pin 1810 extends through an opening at the top of the vent cover 1805 where it is secured using, for example, spot laser welding.

Figure 19:
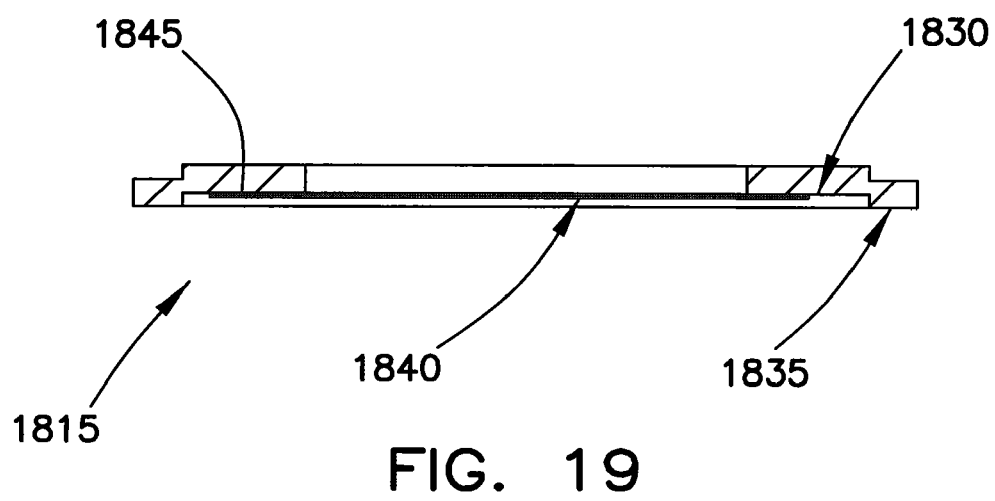
Figure 20:
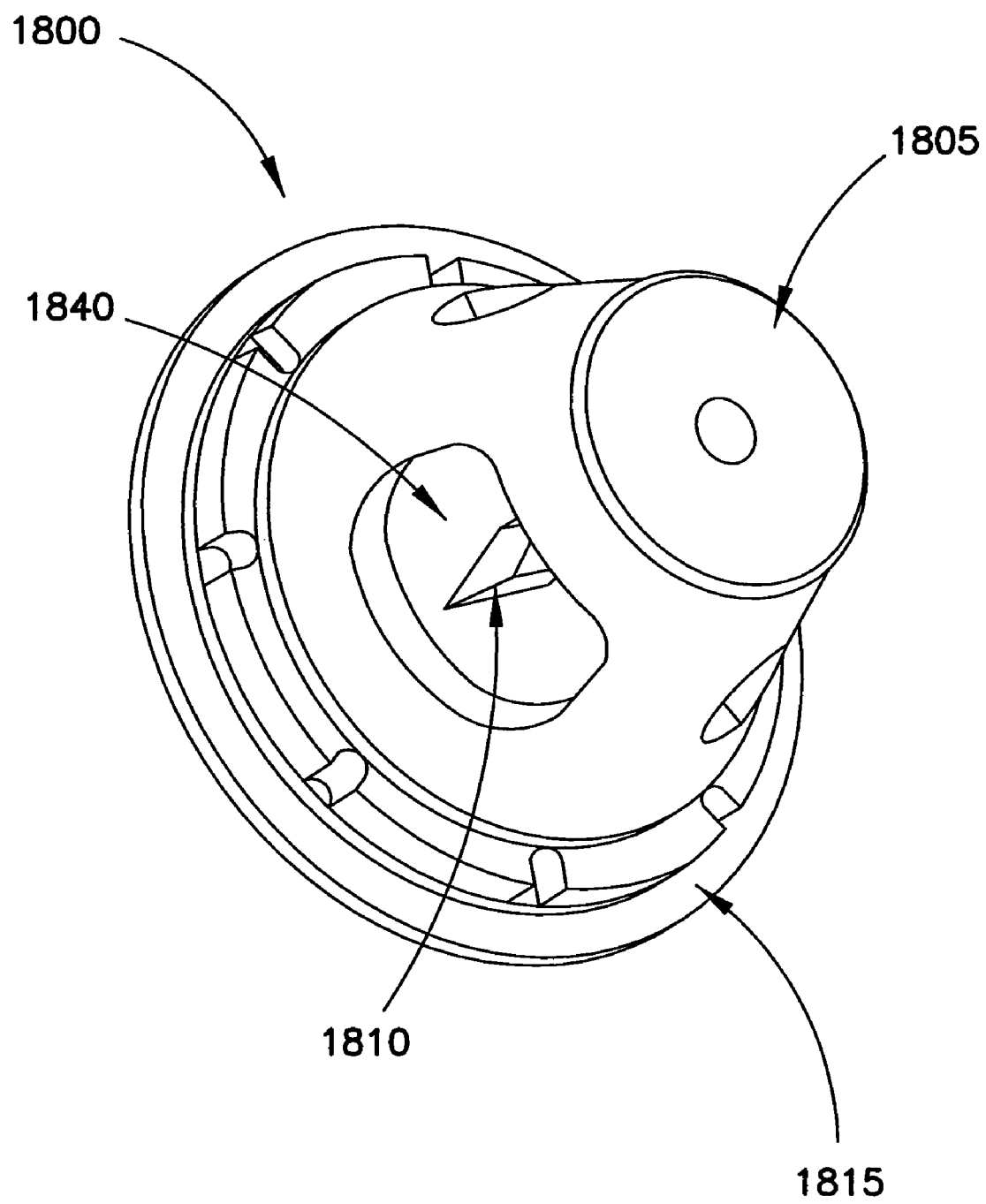

The vent base 1815, as shown in both FIGS. 18 and 19, includes an annular ring 1830 and a flange 1835. A deformable membrane 1840 is attached to the annular ring 1830 by welding it over the interior opening of the ring. The width of the annular ring 1830 has a diameter that is preferably less than about 70% of the width of its interior opening. Further, the width of lip 1845 of the annular ring 1830 preferably does not exceed 70%-80% of the width of the exhaust vent 1820.

The deformable membrane 1840 is preferably formed from the same material as the cover plate 1605 (e.g. aluminum, stainless steel, etc.) and has a thickness between about 0.01 mm-0.1 mm, with a preferable thickness between 0.01 mm and 0.05 mm. The thickness of the deformable membrane 1840, however, may be adjusted based on the overpressure level at which the vent assembly 1800 is to fail. The deformable membrane 1840 may be brazed to properly seal over the opening of the annular ring 1830 and may be formed from a metal foil, such as aluminum foil, copper foil, etc.

Valve base 1815 is welded to the cover plate 1605 using a high energy beam such as a laser or electronic beam. The vent cover 1805 includes a boss 1850 that is secured with vent base 1815. Boss 1850 includes a plurality of openings 1855 that are distributed about its circumference to facilitate a high energy beam welding of the vent cover 1805 to the vent base 1815.

As the pressure within the battery cell 300 approaches a critical level, the deformable membrane 1840 distorts in the direction of the rupture pin 1810. Upon reaching the critical pressure, the deformable membrane 1840 is pierced by the rupture pin 1810 to release the pressure and preventing explosion of the battery cell 300. The pressure at which rupture of the deformable membrane 1840 occurs can be adjusted by adjusting the distance between the deformable membrane 1840 and the rupture pin 1810. Further, the shape of the rupture pin 1810 may be used to cause different rupture modes under different critical pressures. Still further, during assembly of the battery cell, when the air within the battery cell 300 is exhausted during manufacturing, there is a reverse distortion of the deformable membrane 1840 that increases the distance between the membrane and the rupture pin 1810. This characteristic facilitates rapid manufacture of normal batteries and safe removal of abnormal batteries from the production line.

Figure 21:
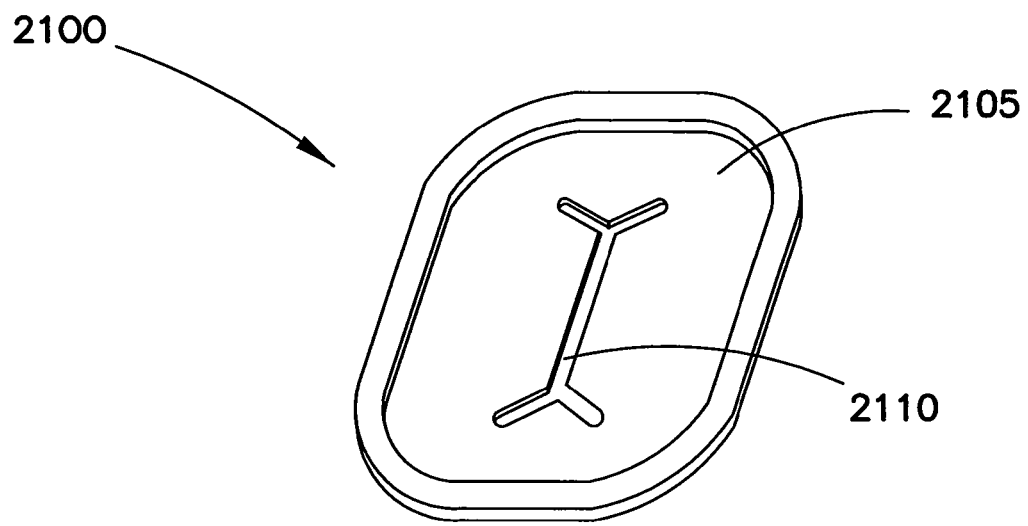
FIGS. 21 and 22 show alternative pressure relief structures that may be used to supplement and/or replace the blow out assembly shown in FIG. 18.
Figure 22:
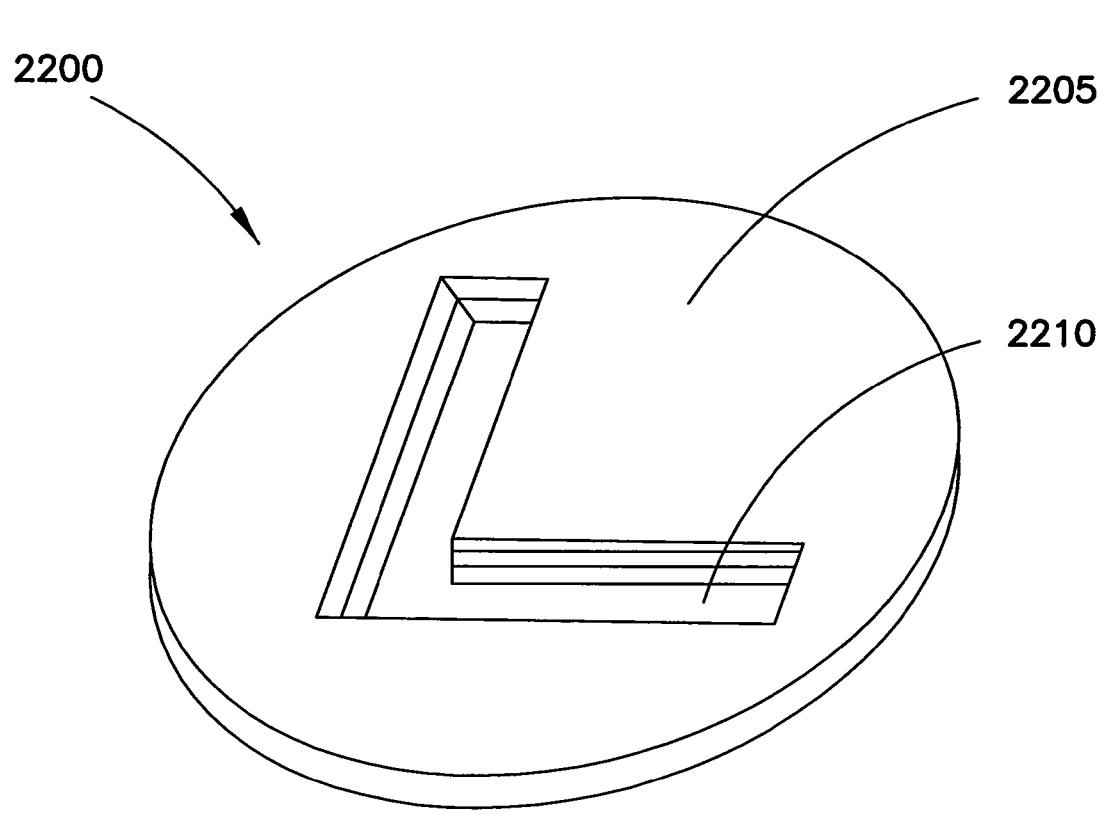

FIGS. 21 and 22 show alternative pressure relief structures 2100 and 2200. Each structure may be disposed sealed with a corresponding exhaust opening of the cover plate 325. Relief structure 2100 is formed from a deformable membrane 2105 having a weakening groove 2110. Similarly, relief structure 2200 is formed from a deformable membrane 2205 having a weakening groove 2210. The principal differences between structures 2100 and 2200 are in the shape formed by the edges of each membrane and the shape of the weakening groove disposed in each membrane. The dimensions of the deformable membranes 2105 and 2205 of each pressure relief structure 2100 and 2200 as well as the depth and extent of each weakening groove 2110 and 2210 are dependent on the particular pressure at which the respective structure is to fail to prevent explosion of the battery cell. A still further alternative pressure relief structure includes filling the exhaust vent with a polymer sealing material, where the polymer seal is adapted to fail above a predetermined pressure.

Figure 65:
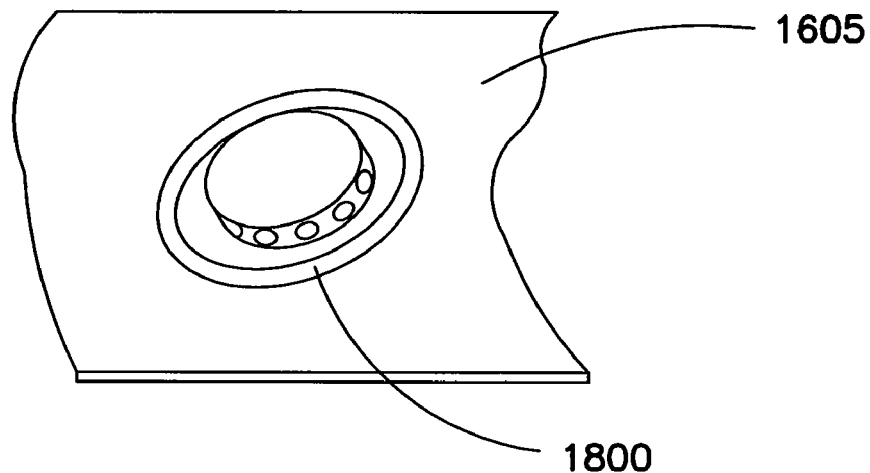
FIGS. 65 through 67 illustrate a further embodiment of a blow out vent.
Figure 66:
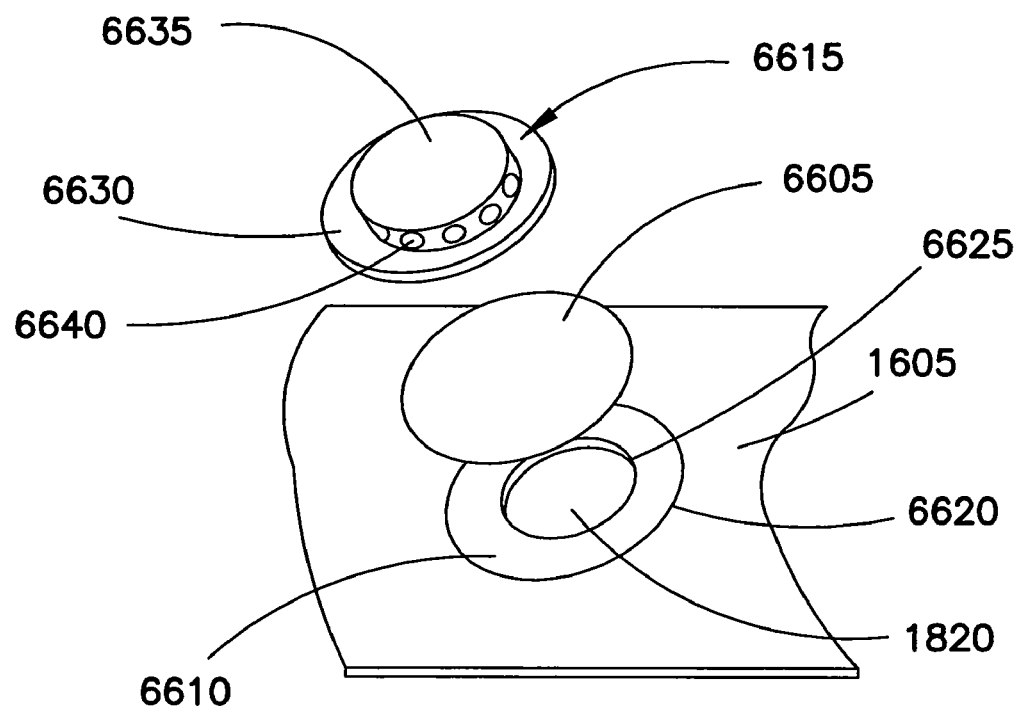
Figure 67:
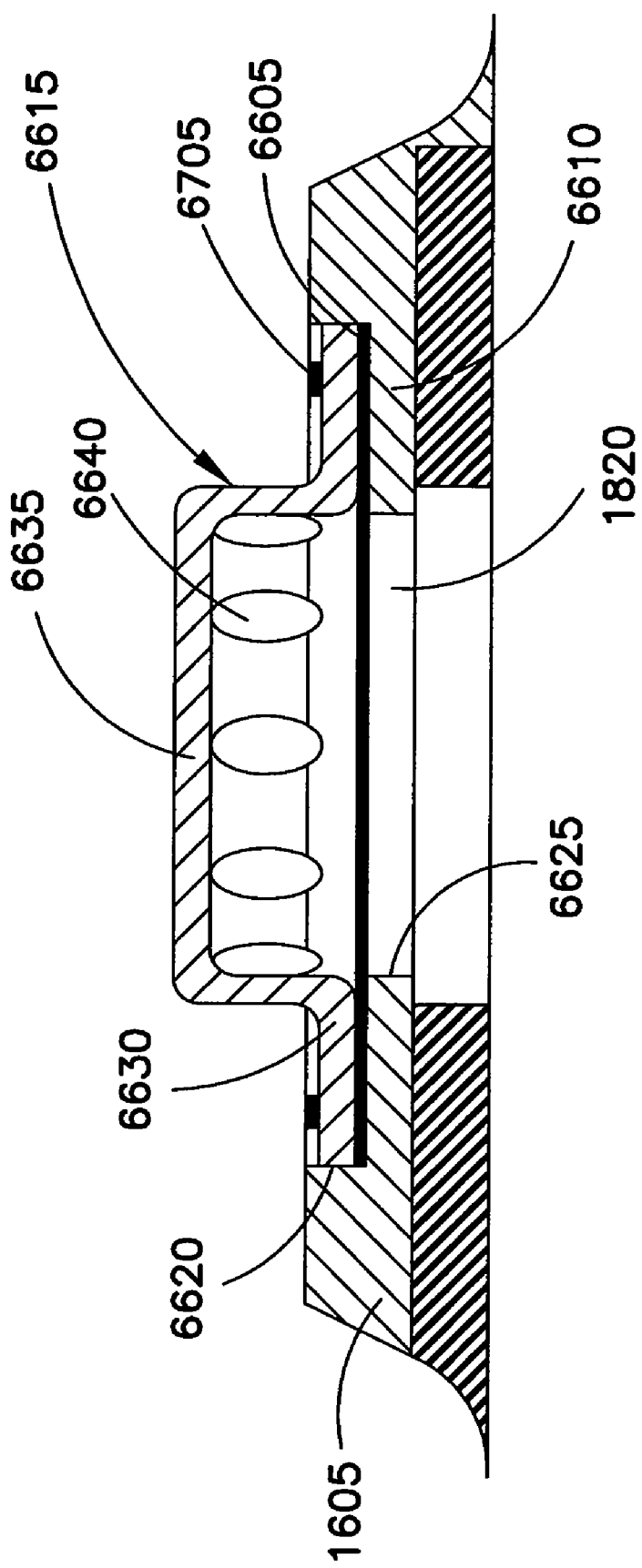

FIGS. 65-67 illustrate a further embodiment of a blow out vent 1800. FIG. 65 shows the blow out vent 1800 in an assembled state on the cover plate 1605. FIG. 66 is an exploded view of the blow out vent 1800 while FIG. 67 is a cross-sectional view of the vent.

In this embodiment, blow out vent 1800 includes a membrane 6605 that is disposed over a trough 6610 that, in turn, surrounds an exhaust opening 1820 of cover plate 1605. The trough 6610 includes an interior edge 6625 defining opening 1820 and an outer edge 6620 defining the periphery of the trough 6610. The radial difference between edges 6620 and 6625 may be about 10% to 15% of the radius of exhaust opening 1820.

Membrane 6605 is dimensioned to fit snugly within the outer edge 6620 of the trough 6610. A variety of materials may be used to form the membrane 6605 including, for example, aluminum, aluminum alloy, steel, or any other material that satisfies the material failure requirements for the vent 1800. Further, the material may be selected so that it is one which may be easily welded. The thickness of the material may be between about 0.01 mm and 0.1 mm. Although the illustrated membrane 6605 is circular, other shapes (e.g., rectangular, elliptical, square, or the like) may also be used.

A safety mask 6615 is disposed over membrane 6605. The safety mask 6615 includes a rim 6630 that fits snugly with outer edge 6620 of trough 6610, where it is welded to the outer edge 6620 at one or more joints 6705. Welding techniques that may be used include, for example, laser welding and/or electron beam welding.

A crown portion 6635 extends from rim 6630 in a direction away from membrane 6605. The crown portion 6635 may have a radius that is generally equal to the radius of the opening 1820. A plurality of oval-shaped openings 6640 are disposed in the sidewalls of the crown portion 6635. The total area of the oval-shaped openings 6640 may be approximately equal to or greater than the area of opening 1820. The wall thickness of the safety mask 6615 may be between about 0.1 mm-0.5 mm.

The foregoing blow out vent structure may be used to achieve numerous advantages. For example, assembly of the structure is both simple and economical. When the membrane 6605 and safety mask 6615 are assembled over the opening 1820, the assembly may be easily secured with the cover plate 1605 by welding the rim 6630 of the safety mask 6615 to the outer edge 6620 of the trough 6610. Safety mask 6615 assists in protecting membrane 6605 from external forces thereby ensuring the integrity of the overall blow out vent 1800. Still further, the safety mask 6615 may be used to reduce the expulsion of non-gaseous materials from the battery cell when the interior pressure of the battery cell exceeds safe levels.

Figure 23:
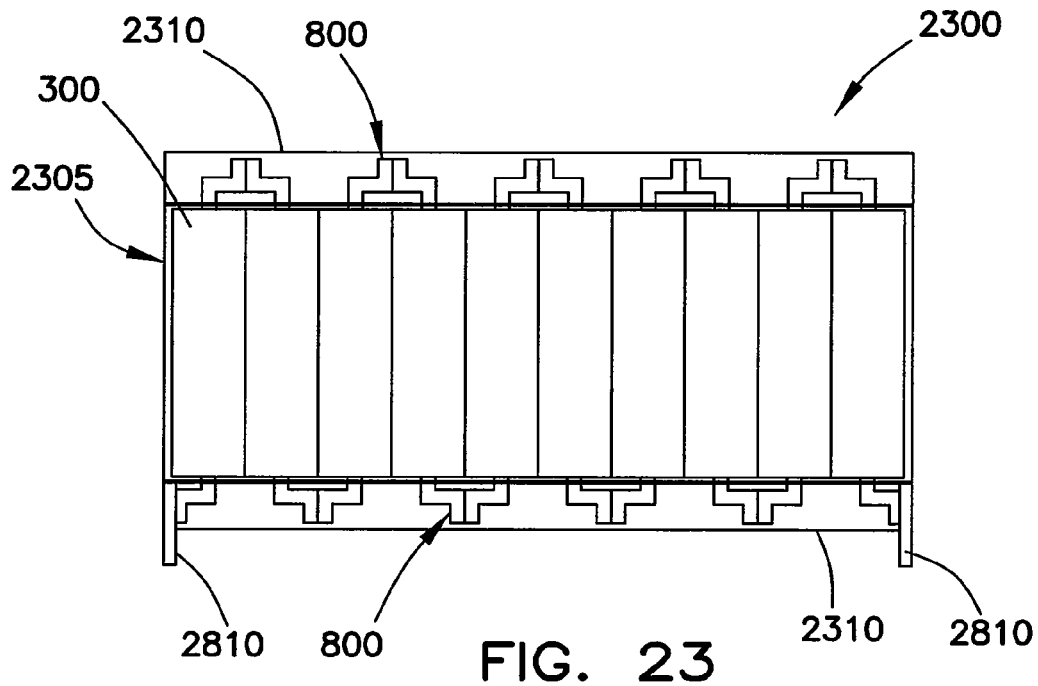
FIG. 23 is a block diagram of a battery pack in which multiple battery cells are interconnected with one another and grouped within a single housing.

FIG. 23 is a block diagram of a battery pack 2300 in which multiple battery cells 300 are interconnected with one another in series and grouped within a single housing 2305. The number of battery cells 300 in a single housing 2305 may range from 8 to 15, with 10 battery cells per pack being preferable. Terminal connectors 2810 are disposed at opposite ends of the battery pack 2300 and are used to provide a means for establishing an electrical and mechanical connection between multiple battery packs 2300. Housing 2305 is preferably hermetically sealed and water-tight, but includes ducts 2310 to receive a flow of a thermal fluid therethrough. The ducts 2310 are disposed laterally on opposite sides of the battery pack 2300 so that the flow of thermal fluid runs proximate the connectors 800 to either heat or cool the battery cells 300 of the battery pack 2300. The protective shells of adjacent battery cells may be proximate one another in that they are in direct contact with one another or disposed immediately adjacent one another at opposite faces of an insulator sheet.

Figure 24:
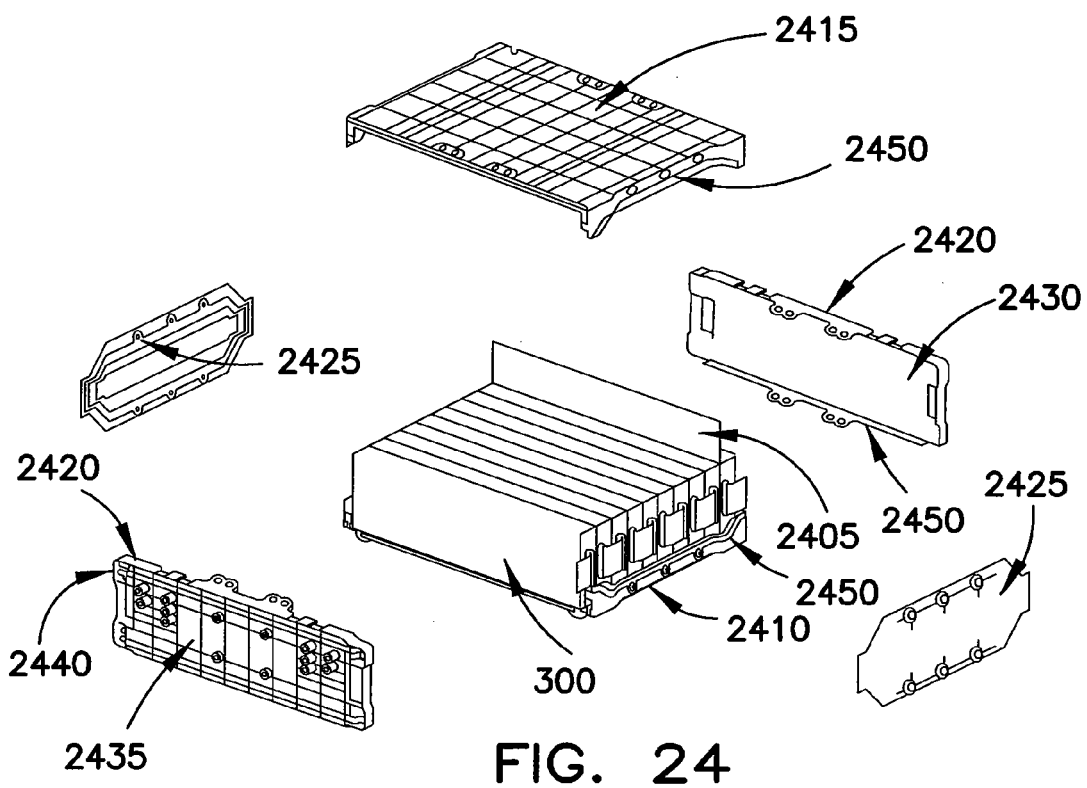
FIGS. 24 through 26 illustrate one embodiment of a housing that may be used to form a battery pack.

FIG. 24 is an exploded view of one embodiment of a housing 2305 that may be used to form battery pack 2300. In this embodiment, housing 2305 includes a plurality of series connected battery cells 300. The battery cells 300 are connected with one another in the manner shown in FIG. 23. A separator 2405 made from an insulating material is disposed between each battery cell 300 to electrically isolate the protective shells of the battery cells 300 from one another. Preferably, however, the separators 2405 are not employed. Rather, the protective shells are preferably in direct contact with one another so that they form a single thermal unit. Temperature control is thereby more easily maintained.

Battery cells 300 are disposed between a bottom plate 2410 and a top plate 2415 to limit movement of the battery cells 300 along the y-axis. Baffle structures 2420 are disposed on each side of the group of battery cells 300 and oriented to traverse the length of the battery cells 300. The baffle structures 2420 cooperate with one another to limit movement of the battery cells 300 along the x-axis. Side plates 2425 are disposed at opposite ends of the battery cells 300 and extend along the width of the battery cell group. The side plates 2425 limit motion of the battery cells 300 along the z-axis.

Sealing elements 2450 may be located between each baffle structure 2420 and the top and bottom plates 2415, 2410 as well as between each side plate 2425 and the top and bottom plates 2415, 2410. In this manner, the top and bottom plates 2415, 2410 form water-tight seals with the mating components. Such seals assist in preventing short circuits that would otherwise result when a battery cell 300 fails and allows liquid to escape.

Figure 25:
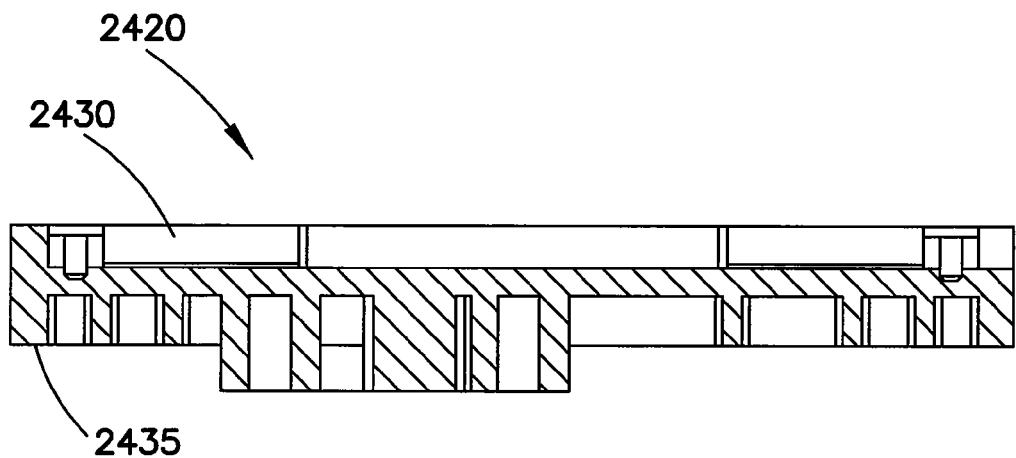

The baffle structures 2420 are made of an insulating plastic material having the desired mechanical strength, thermal degradation resistance, low temperature ductility, and resistance to battery and environmental chemicals in the vehicle. One embodiment of a baffle structure 2420 is shown in FIG. 25. Each baffle structure 2420 is comprised of a baffle plate 2430, a baffle stiffener 2435, and apertures 2440 disposed at the corners of the baffle structure 2420. Apertures 2440 are adapted to accept corresponding tension rods that extend between the baffle structures 2420 to secure the battery cells 300 therebetween. The total thickness of each baffle structure 2420 may be between about 3 mm and 15 mm. The thickness of each baffle plate 2430 may be between about 3 mm and 5 mm. The thickness of each baffle stiffener 2435 may be between about 5 mm and 2 mm. The baffle stiffener 2435 evenly distributes horizontal and vertical forces throughout the baffle structure 2420 and increases the ability of the baffle structure 2420 to protect the battery cells 300. Via holes may be pre-positioned to facilitate the use of mechanical fasteners, such as screws, at the four corners of the baffle structure 2420. Such mechanical fastening is convenient for connecting the top and bottom plates 2415, 2410 to the baffle structure 2420. There are L-shaped structures on the baffle structure 2420 that are positioned to mate with the top and bottom plates 2415, 2410. The top plate 2415 is located between an upper L-shape structure and a lower L-shape structure of the baffle structure 2420. An aperture is located between the top plate 2415 and the upper L-shaped structure of the baffle structure 2420. The aperture is adapted to receive a pin which limits movement between the top plate 2415 and the baffle structure 2420 thereby inhibiting movement of the battery cells 300 along the x-axis and y-axis.

Figure 26:
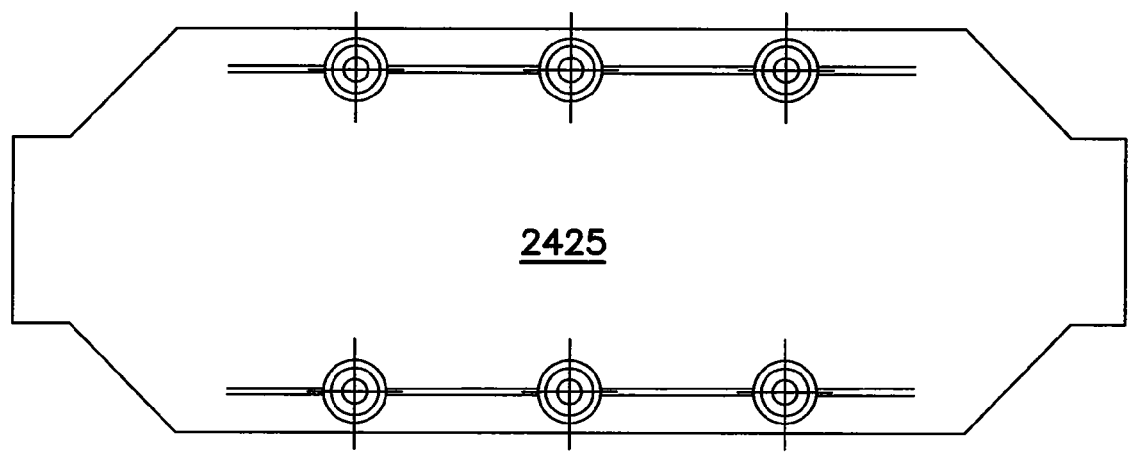

The top and bottom plates 2415, 2410 are made from a plastic insulator material having the desired mechanical and chemical characteristics. As shown in FIG. 26, the top and bottom plates 2415, 2410 are each comprised of a flat plate 2605, a stiffener 2610, and apertures 2615. The apertures 2615 are adapted to receive corresponding tension rods that extend between the top and bottom plates 2415, 2410. The whole thickness of each of the top and bottom plates 2415, 2410 may be between about 3 mm and 15 mm. The thickness of each flat plate 2605 may be between about 3 mm and 5 mm. The thickness of each stiffener 2610 is between about 5 mm and 10 mm. The stiffener 2610 is adapted to distribute horizontal and vertical forces evenly over the respective top and bottom plate structures 2415, 2410. Pre-embedded bolts on the top and bottom plates 2415, 2410 are used to connect the top and bottom plates 2415, 2410 with the baffle structures 2420 as well as with the side plates 2425. A boss at the inner side of the top plate 2410 limits motion of the battery cells 300 along the y-axis.

The side plates 2410 are made of plastic insulator material having the desired mechanical and chemical characteristics. As shown in FIG. 26, each side plate 2425 has an outline that matches the side openings formed when the top plate 2415 and bottom plate 2410 are connected with one another.

Figure 27:
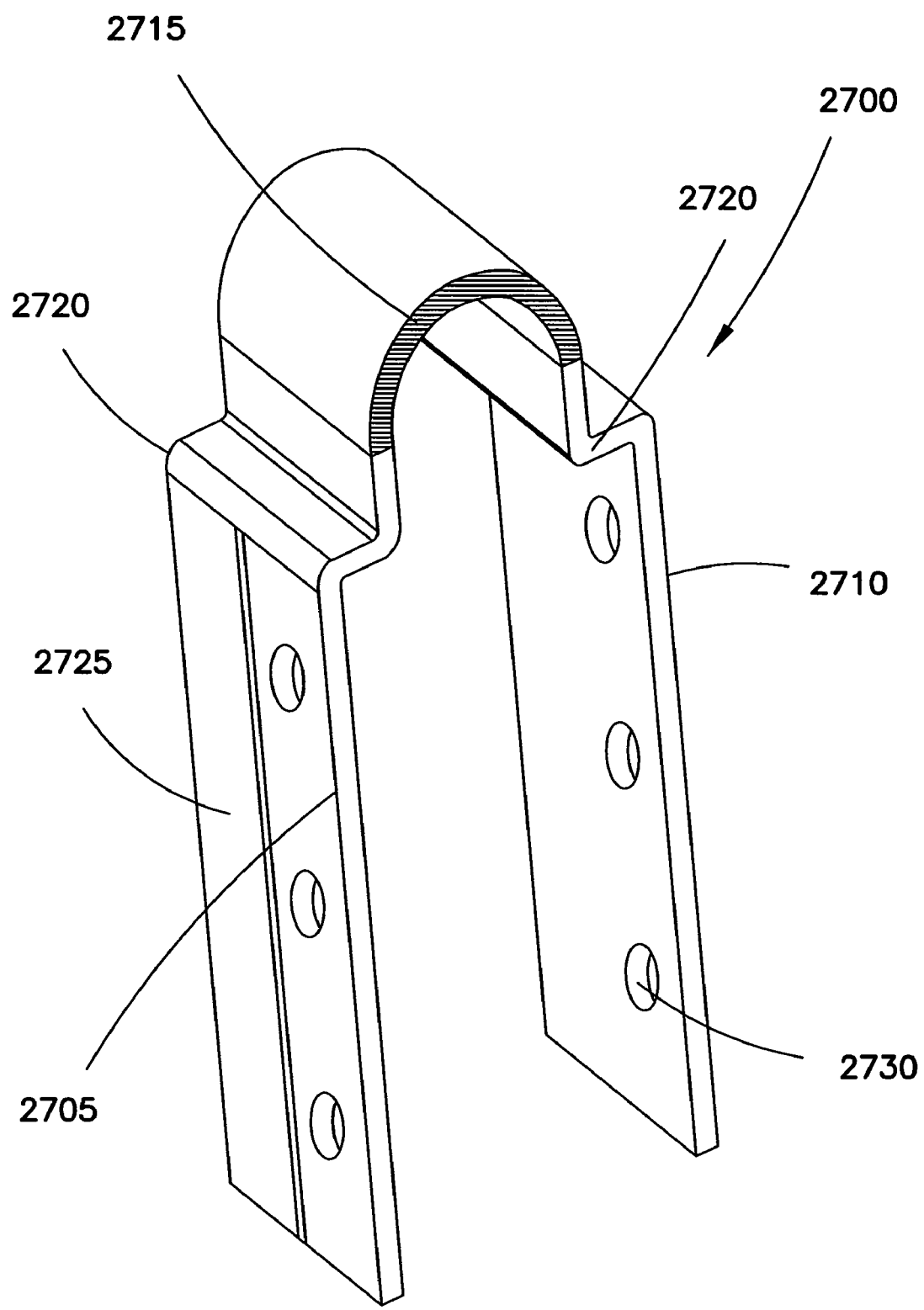
FIG. 27 shows a connector that may be used to mechanically and electrically interconnect adjacent battery packs.

The battery pack housing 2305 is advantageous for several reasons. For example, the battery pack housing 2305 limits movement of the battery cells 300 along every motion excess thereby improving the reliability of the battery pack 2300 and prolonging the battery service life. The movement of the battery cells 300 may be readily limited along each axis by designing the baffle structures 2420 and the top and bottom plates 2415 in a manner which decreases the volume occupied by the battery pack 2300. By forming the housing 2305 from an insulating material, the risk of short-circuits is reduced because the battery cells 300 cannot electrically connect with each other through the housing 2305. Further, by using a plastic material to form the components of the housing 2305 the weight of the battery pack 2300 is reduced. Still further, the likelihood that short-circuits will result from battery cell leakage is reduced since a sealing material is provided at the joints between the various components of the battery pack 2300 thereby preventing fluid leakage from the battery pack FIG. 27 shows a connector 2700 that is used to mechanically and electrically interconnect adjacent battery packs 2300. Connector 2700 includes a first conductive arm 2705 and a second conductive arm 2710 that are connected by an arch-shaped, multilayer metal foil 2715. The arch-shaped foil 2715 may have a thickness between about 0.01 mm and 5.0 mm and may be formed from copper foil to make it convenient for welding. Alternatively, conductive arms 2705 and 2710 as well as the arch-shaped foil 2715 may be formed from nickel, aluminum, or other metal. Preferably, conductive arms 2705, 2710 and arch-shaped foil 2715 are made from the same material to increase the overall conductivity of the connector 2700. Formation of the arch-shaped foil 2715 may include hot pressing a plurality of thin metal sheets to one another while forging them into an arch-shaped structure. Each conductive arm 2705 and 2710 includes an L-shaped joint 2720 proximate the arch-shaped foil 2715 at which the arch-shaped foil 2715 is welded and/or hot pressed to the respective arm. The size of each conductive arm 2705, 2710 and arch-shaped foil 2715 is determined by the size of the electrode terminals of the battery packs that use connector 2700 as well as the current carrying capacity needed between the battery packs. The arch-shaped foil 2715 may be dimensioned so that it fails when subject to an impact force that exceeds a predetermined magnitude to thereby disconnect the battery pack from an adjacent battery pack. Still further, the arch-shaped foil 2715 may be dimensioned to function as a fuse to disconnect adjacent battery packs when the current between the adjacent battery packs exceeds a predetermined level.

Figure 68:
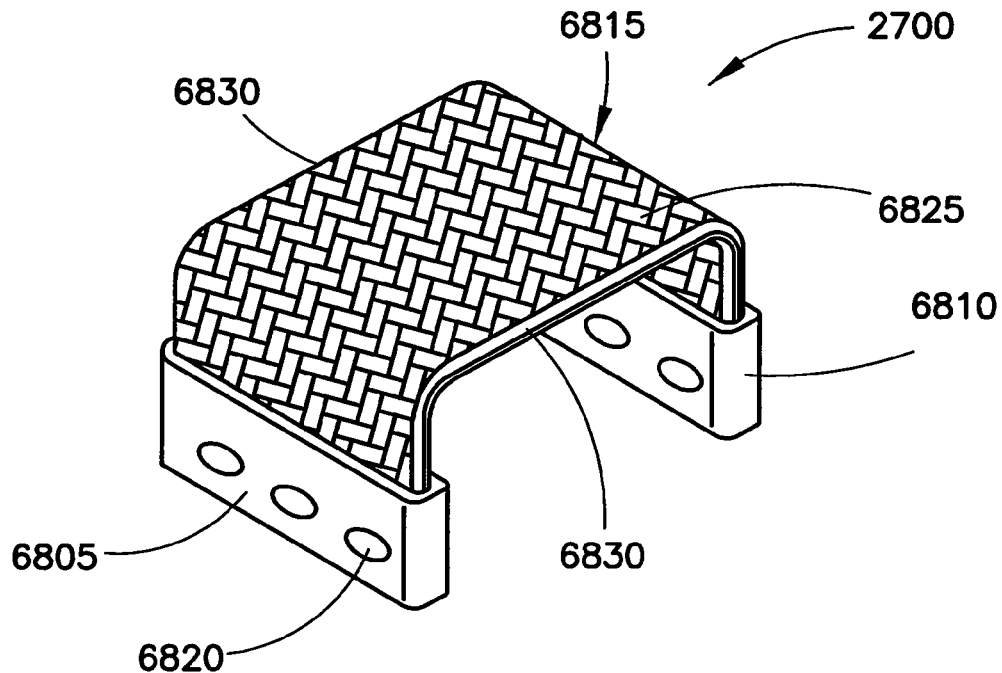
FIG. 68 shows a further embodiment of a connector that may be used to mechanically and electrically interconnect adjacent battery packs.

FIG. 68 shows a further connector 2700 that may be used to mechanically and electrically interconnect adjacent battery packs 2300. In this embodiment, connector 2700 includes a first conductive arm 6805 and a second conductive arm 6810 that are connected by an arch-shaped metal member 6815. The arch-shaped metal member 6815 may be formed as a metal mesh 6825 that extends between opposed arch-shaped support arms 6830. The metal mesh 6825 may have a thickness between about 0.01 mm and 5.0 mm and may be formed from strands of a single type of metal or multiple metals to make it convenient for welding. Arms 6805, 6810 may be formed as metal sheets having openings 6820 through which fasteners extend to secure the connector 2700 to the respective battery packs. Conductive arms 6805 and 6810 as well as the arch-shaped metal member 6815 may be formed from copper, nickel, aluminum, or other metal. Preferably, conductive arms 6805, 6810 and arch-shaped metal member 6815 are made from the same material to increase the overall conductivity of the connector 2700. The size of each conductive arm 6805, 6810 and arch-shaped metal member 6815 is determined by the size of the electrode terminals of the battery packs that use connector 2700 as well as the current carrying capacity needed between the battery packs. The arch-shaped metal member 6815 may be dimensioned so that it fails when subject to an impact force that exceeds a predetermined magnitude to thereby disconnect the battery pack from an adjacent battery pack. Further, the arch-shaped metal member 6815 may be adapted to function as a fuse to disconnect adjacent battery packs when the current between the adjacent battery packs exceeds a predetermined level. Still further, connector 2700 may be formed so that it is sufficiently elastic to mechanically buffer any motion between adjacent battery packs.

Figure 69:
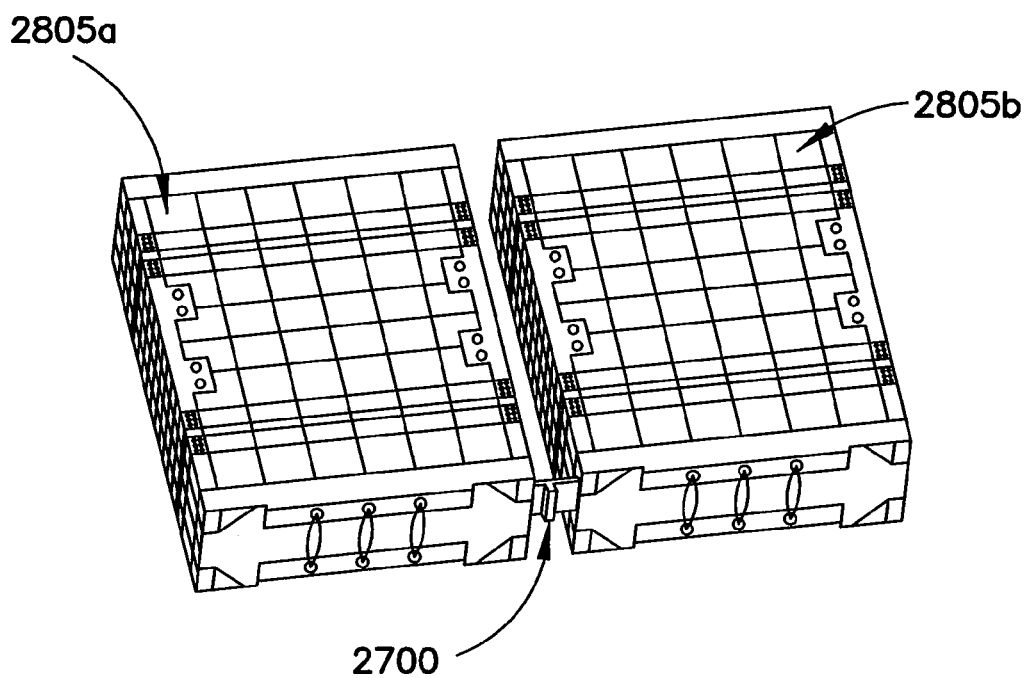
FIG. 69 shows how the connectors of FIGS. 27 and 68 may be used when the battery packs are configured in a side-to-side arrangement.

FIG. 28 shows how connectors 2700 are used to interconnect multiple battery packs 2805a and 2805b that are arranged in a head-to-head configuration. However, the battery packs 2805a and 2805b may also be arranged in a side-to-side manner as shown in FIG. 69 and still use connectors 2700. As shown, battery packs 2805a and 2805b each have a pair of battery pack terminals disposed along a single side of the pack, one terminal at each end of the side. The battery pack terminals may be adapted to break when subject to the extraordinary forces that occur during a vehicle accident or the like. A connector 2700 is used at each end of the battery pack to establish a mechanical as well as electrical connection between the battery pack terminals. For simplicity, only terminals 2810a and 2810b are shown and discussed, although the same configuration is used between each terminal of a battery pack that is adjacent a terminal of another battery pack. The connector 2700 between the batteries packs 2805a and 2805b provides a mechanical buffer that absorbs impact forces when there is a relative displacement between the battery packs 2805a and 2805b. Still further, the connector 2700 may be adapted to sever the connection between adjacent battery packs when subject to the extraordinary forces that occur during a vehicle accident or the like.

The connector 2700 is secured to the battery packs 2800a and 2800b by connecting the conductive arm 2710 to a connection plate 2830a of terminal 2810a and the conductive arm 2705 to a connection plate 2830b of the adjacent terminal 2810b. Each conductive arm 2705 and 2710 includes a groove 2725 adapted to receive a welding wire (see FIG. 27). Further, each arm 2705, 2710 includes a plurality of apertures 2730 adapted to receive mechanical fasteners. To connect the adjacent terminals of the battery packs 2805a and 2805b, a welding wire is placed in each groove 2725. Each arm 2705, 2710 is then welded (e.g., using brazing, laser welding, ultrasonic welding, etc.) to the corresponding terminal. Preferably, each arm is attached to the corresponding terminal using brazing. Brazing allows easy maintenance of the interconnection between the battery packs and, further, simplifies replacement of a battery pack in the battery system since the metal alloy forming the interconnection may be easily reheated to separate the battery pack from other battery packs in the battery system. Additionally, mechanical fasteners 2840, such as screws, bolts, or the like, are inserted into apertures 2715 to engage corresponding apertures of the respective terminal and establish a more reliable connection between the conductive arm and corresponding terminal. Welding and securing the connector 2700 to the corresponding terminals of adjacent battery packs in this manner establishes a low resistance, high current capacity path between the adjacent battery packs. Although the adjacent battery packs may be connected so that they are electrically parallel with one another, the preferred arrangement is to have them connected serially.

Figure 29:
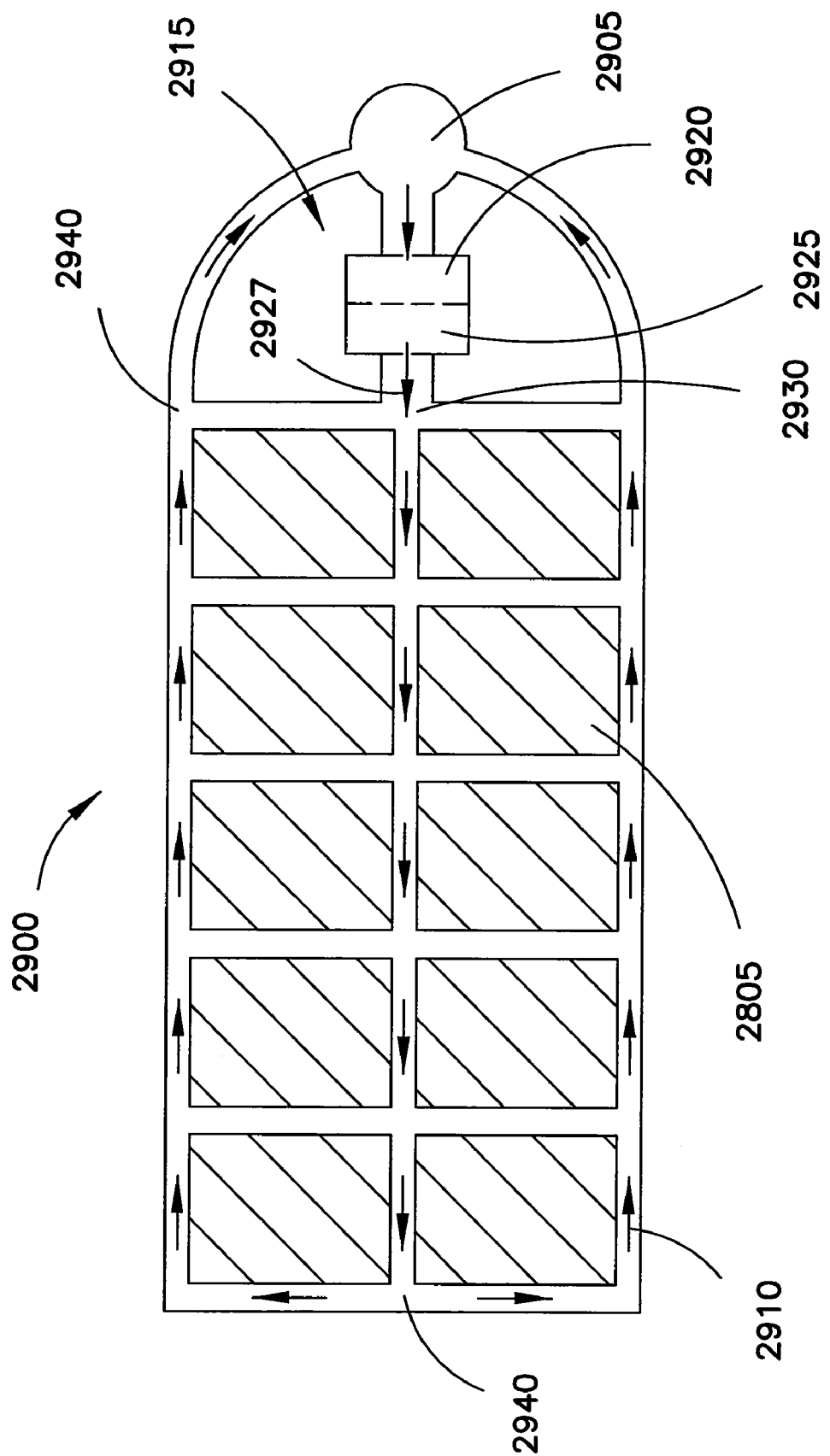
FIG. 29 shows a battery system that supplies electrical power to and receives electrical power from a motor/generator of a vehicle capable of being driven by electric power.

FIG. 29 shows a battery system 2900 that supplies electrical power to and receives electrical power from a motor/generator of a vehicle capable of being driven by electric power. Battery system 2900 includes multiple battery packs 2805. The number of battery packs may be about five, and preferably ten. Each battery pack 2805 includes a plurality of cells 300, preferably in a range between 8 and 15 packs, and, more preferably, ten packs. The cells 300 of each battery pack 2805 are electrically connected in series with one another. Further, the multiple battery packs 2805 are electrically connected in series with one another.

Each battery pack 2805 is disposed in a respective battery pack housing 2305. The vehicle is provided with a compartment containing the multiple battery packs and their housings. The compartment facilitates electrical connection to the motor/generator. The battery pack housing 2305 for each battery pack 2805 is substantially sealed from the ambient environment (e.g., water-tight) with the exception that openings are provided through each battery pack 2805 in a region proximate their respective terminals. The openings of adjacent battery pack housings 2305 are interconnected by duct work to facilitate circulation of a cooling fluid, such as air, throughout the battery system 2900.

The compartment containing battery system 2900 may be shaped and sized to fit partially under a rear passenger seat of the vehicle and partially in a trunk compartment of the vehicle. Alternatively, the compartment may be shaped and sized to fit under a floor of the vehicle.

In FIG. 29, a thermal fluid, such as air, is driven through the battery system 2900 by a pump 2905. The pump 2905 drives the thermal fluid through the system 2900 in the directions designated by the flow arrows 2910. As illustrated by the flow arrows, the pump 2905 directs the thermal fluid through a thermal processing unit 2915 before it is provided to an entrance 2927 of a central duct 2930 for distribution to other portions of the system 2900. The thermal processing unit 2915 may include a condenser 2920 to cool the thermal fluid and a heater 2925 to heat the thermal fluid. The condenser 2920 is activated when the temperature of the battery system 2900 exceeds a predetermined threshold. Likewise, the heater 2925 is activated when the temperature of the battery system 2900 falls below a predetermined threshold.

As the thermal fluid circulates through the central duct 2930, it either heats or cools the terminal portions of each battery pack 2805 proximate the central duct 2930. Upon reaching an end portion 2940 of the duct work, the thermal fluid is directed toward the exterior ducts 2910, 2940 of the battery system 2900. This allows the thermal fluid to either heat or cool the terminal portions of each battery pack 2805 proximate the exterior ducting of the battery system 2900. The battery cells 300 within the battery system 2900 thus operate in a controlled environment in which the temperature is maintained at an optimal level. Some of the thermal fluid may be channeled from the ducts of the battery system 2900 to the passenger compartment of the vehicle. In this manner, the heat generated by the battery system 2900 is used to heat the interior passenger compartment of the vehicle. The amount of thermal fluid channeled from the ducts of the battery system 2900 may be controlled by an individual within the passenger compartment to regulate the compartment temperature.

Figure 30:
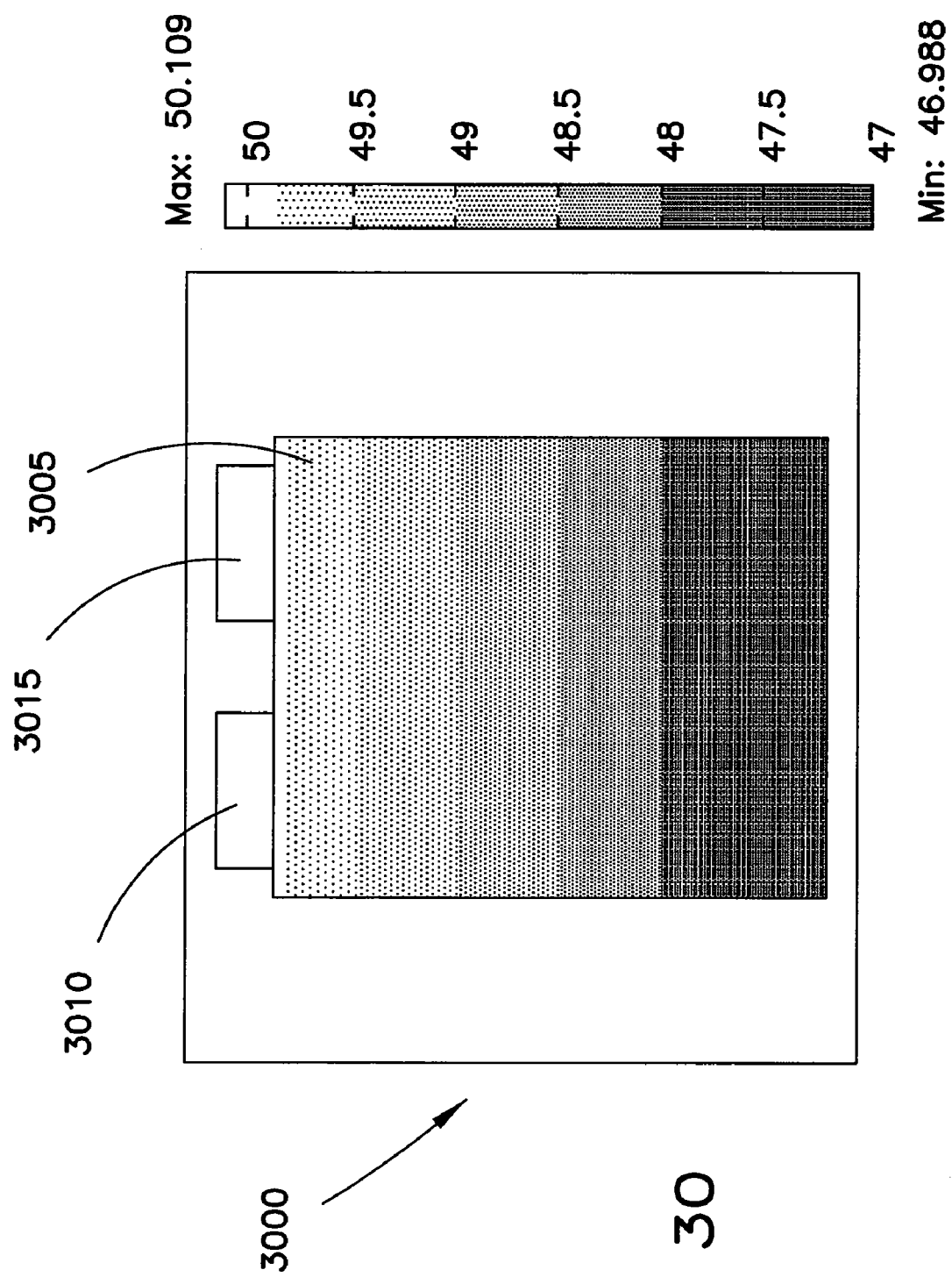

FIGS. 30 through 34 illustrate advantages associated with providing connections to the anode and cathode of a coiled core at opposite ends of the core. For comparison, FIG. 30 shows a battery 3000 having a core 3005, an anode connector 3010, and a cathode connector 3115. The anode connector 3010 and cathode connector 3015 are positioned at the same side of the core 3005. The current distribution in the core 3005 during operation is indicated by shading. As shown, there is a substantial current density proximate the connectors 3010 and 3015. Areas of high current density are associated with elevated temperatures in accordance with Ohm's law. Consequently, the areas proximate connectors 3010 and 3015 run hot during operation and degrade the performance of the battery. The longevity of the battery 3000 is also impacted.

Figure 31:
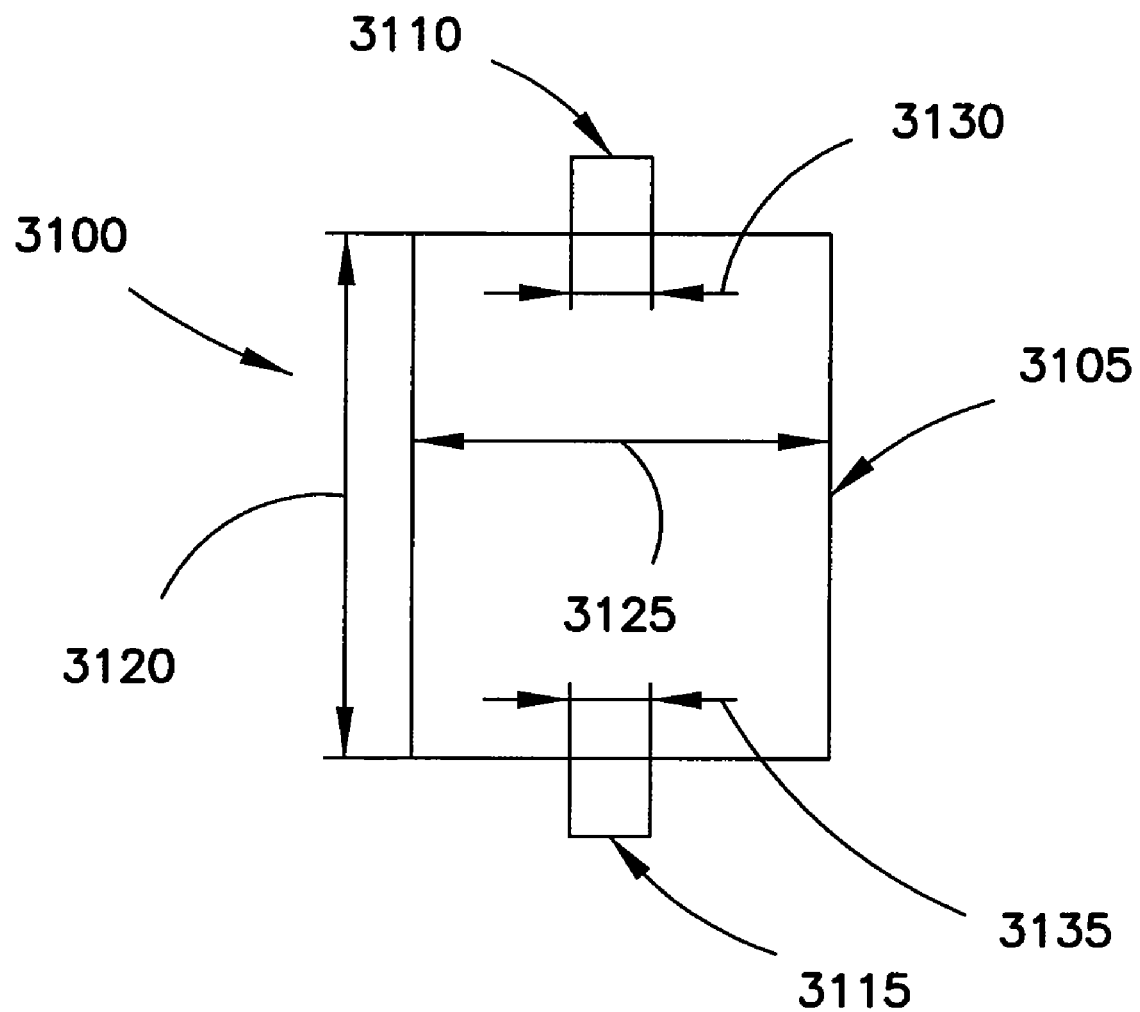

FIG. 31 shows a battery 3100 having a coiled core 3105, an anode connector 3110, and a cathode connector 3115. The anode connector 3110 and cathode connector 3115 are disposed at opposite sides of the coiled core 3105. The core 3105 has a length 3120 and a width 3125. Anode connector 3110 has a width 3130 while cathode connector 3115 has a width 3135. Although width 3130 and 3135 are shown as being less than the width 1025, these widths may be extended so that they are substantially commensurate with the width 3125 of the core 3105.

The dimensions shown in FIG. 31 may take on various proportions. For example, the ratio of length 3120 with respect to width 3125 may be between about 1.5 to 4.5, with a preference between about 2.5 and 3.5. The ratio of width 3130 with respect to width 3135 may be between about 0.8 and 1.2, with a preference between 0.9 and 1. The ratio of the width 3130 (as well as the width 3135) with respect to the width 3125 may be between about 0.3 and 0.6, with a preference between 0.4 and 0.5.

Figure 32:
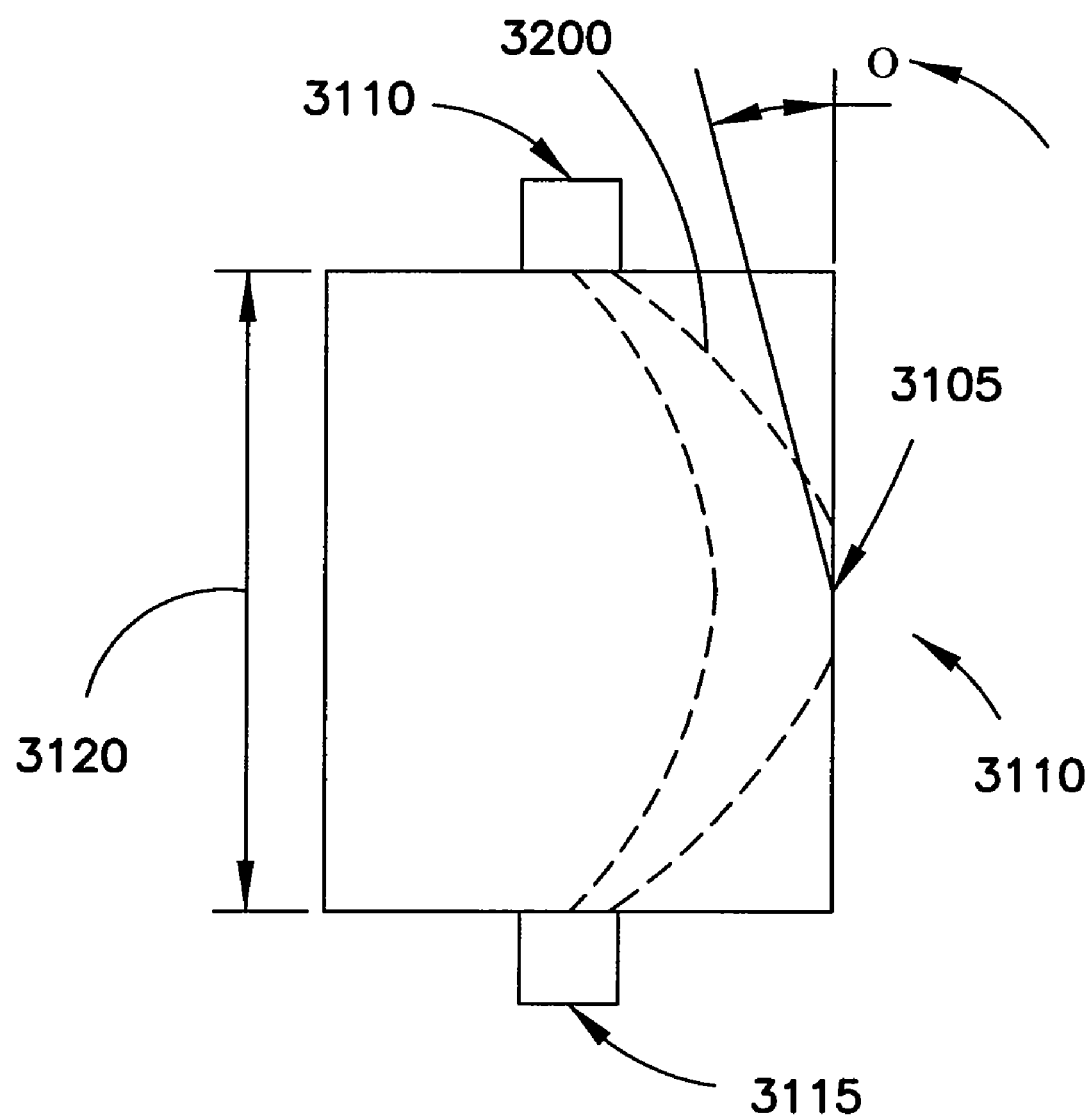

FIG. 32 illustrates a situation in which the width 3130 and width 3135 are approximately the same. In this situation, the electric field 3200 forms an angle $\theta$ with respect to an edge of the core 3105. The value of angle $\theta$ is determined by $\tan^{-1}((W-a)/L)$, where W is the width 3125, a is the width 3130, and L is the length 3120. When the angle $\theta$ is between about 0° and 20° the current density may be optimized. This occurs when $0<(W-a)/L<0.37$.

Figure 33:
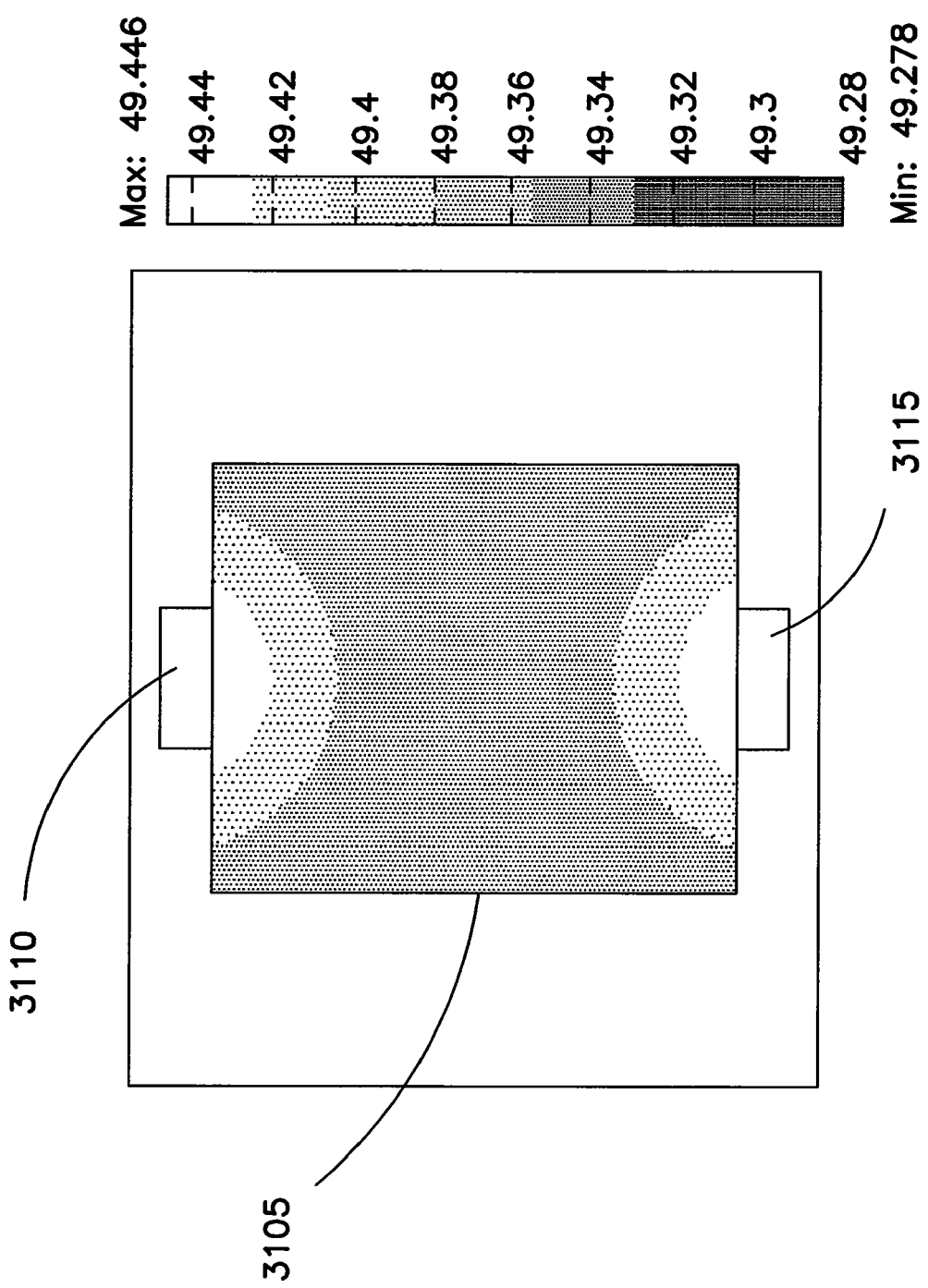

FIG. 33 illustrates the current density in the core 3105 during operation. As shown, the current density is not concentrated at one side of the core 3105 but, rather, is distributed at opposite sides proximate anode connector 3110 and cathode connector 3115. The current density proximate the middle of the core 3105 is reduced compared with FIG. 30. Consequently, the central portion of the core 3105 is not subject to significant temperature elevations. Further, temperature variations are not concentrated at a single side of the core 3105.

FIG. 34 is a table comparing the performance of a battery constructed in accordance with FIG. 30 (designated battery A) versus a battery constructed in accordance with FIG. 31 (designated battery B). The columns of FIG. 34 correspond to the following values:

Column 3405 corresponds to the number of discharge/recharge cycles for each battery;

Column 3410 corresponds to the battery capacity after the number of cycles shown in column 3405;

Column 3415 corresponds to the ratio of the current battery capacity to the original battery capacity after the number of cycles shown in column 3405;

Column 3420 corresponds to the maximum temperature proximate the anode connector that occurs during operation of the battery after it has been subject to the number of cycles shown in column 3405;

Column 3425 corresponds to the maximum temperature proximate the cathode connector that occurs during operation of the battery after it has been subject to the number of cycles shown in column 3405; and Column 3430 corresponds to the maximum temperature proximate the center of the core that occurs during operation of the battery after it has been subject to the number of cycles shown in column 3405.

As shown, there are significant differences between the performance parameters of battery A and battery B. The performance differences become increasingly evident as the battery undergoes more charge/recharge cycles. Consequently, the performance of battery B is better than battery A over time and battery B has a greater longevity.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle comprising:
   at least one electrical motor/generator;
   a battery system for supplying electrical power to, and receiving electrical power from, the motor/generator, the battery system comprising multiple battery packs;
   each battery pack including a plurality of cells, each cell having a protective shell and connector terminals extending from the protective shell, the plurality of cells electrically connected in series through respective connector terminals;
   each battery pack having a battery pack housing configured to house the plurality of cells, and each battery pack housing including ducting configured to direct a thermal fluid to circulate among the connector terminals extending from respective protective shells;
   the thermal fluid configured to directly cool or warm only the connector terminals without providing direct cooling or warming to the cell contained in the protective shell, wherein multiple battery packs are electrically connected in series to facilitate electrical connection to the motor/generator; and
   a compartment configured to contain the multiple battery packs in their housings, the compartment including duct connectors configured to interconnect the ducting of each battery pack housing to facilitate circulation of a thermal fluid to each battery pack housing.

2. The vehicle of claim 1, wherein each of the battery pack housings is water-tight, and wherein each of the battery pack housings includes at least one pair of openings to allow the thermal fluid to circulate therebetween.

3. The vehicle of claim 2, wherein the duct connectors are configured to connect openings between adjacent battery packs.

4. The vehicle of claim 2, wherein the thermal fluid is air.

5. The vehicle of claim 1, wherein the compartment is shaped and sized to fit partially under a rear passenger seat in the vehicle and partially in a trunk compartment.

6. The vehicle of claim 1, wherein the compartment is shaped and sized to fit under a floor in the vehicle.

7. The vehicle of claim 1, comprising at least 5 battery packs, each having at least 5 cells.

8. The vehicle of claim 1, comprising 10 battery packs, each having 10 cells.

9. The vehicle of claim 1, wherein every cell has a rectangular prism shape, wherein the length is greater than the height and the height is greater than the thickness.

10. The vehicle of claim 9, wherein the cells in each battery pack are arranged with the largest face of each cell immediately proximate the largest face of an adjacent cell.

11. The vehicle of claim 10, wherein the battery packs are arranged in the compartment and the compartment is arranged in the vehicle so that the lengths of the cells are transverse to the direction of vehicle travel.

12. The vehicle of claim 11, wherein the battery packs are arranged in two columns in line with the direction of vehicle travel.

13. The vehicle of claim 11, wherein each cell has a positive terminal at one end and a negative terminal at the other end and wherein, except for the cells at opposed ends of the battery pack, the cells in each pack are arranged so that the positive terminal from one cell is mechanically and electrically connected to the negative terminal of one adjacent cell and the negative terminal from said one cell is mechanically and electrically to the positive terminal of the other adjacent cell.

14. The vehicle of claim 1, wherein the compartment is adapted for the flow of a thermal fluid therethrough, whereby the cells are cooled and whereby heat from the battery system is selectively provided to an interior portion of the vehicle.

15. The vehicle of claim 14, wherein the thermal fluid is air.

16. A vehicle comprising:
    at least one electrical motor/generator;
    a battery system for supplying electrical power to and receiving electrical power from the motor/generator, the battery system comprising multiple battery packs, each battery pack comprising a battery pack housing having electrical terminals, and a plurality of cells secured within the battery pack in a side-by-side orientation and connected to provide power to and receive power from the electrical terminals of the battery pack housing;
    each cell having a protective shell and electrical cell terminals extending from the protective shell;
    the plurality of cells having a first set of interconnected electrical cell terminals at a first end thereof and a second set of interconnected electrical cell terminals at a second end thereof,
    wherein each battery pack housing includes baffles to direct a cooling fluid to flow through the battery pack proximate the first and second set of interconnected electrical cell terminals;
    the cooling fluid configured to directly cool only the electrical cell terminals without providing direct cooling to the cell contained in the protective shell; and
    ducts interconnecting the baffles of the battery pack housings to facilitate circulation of the cooling fluid to the electrical cell terminals.

17. A battery system for providing power to an electric motor of a vehicle comprising:
    a plurality of battery packs, each battery pack comprising a battery pack housing having electrical terminals, a plurality of cells secured within the battery pack in a side-by-side orientation and connected to provide power to the electrical terminals of the battery pack housing,
    the plurality of cells having a first set of interconnected electrical cell terminals at a first end thereof and a second set of interconnected electrical cell terminals at a second end thereof;

each cell having a protective shell wherein respective electrical cell terminals extend from the protective shell;

baffles formed in the battery pack housing configured to direct a thermal fluid to flow through the battery pack proximate the first and second set of interconnected electrical cell terminals;

the thermal fluid configured to directly cool or warm only the electrical cell terminals without providing direct cooling or warming to the cell contained in the protective shell, and a battery cooling and/or heating system having ducts interconnecting the baffles of the battery pack housings, and a pump adapted to drive the thermal fluid through the ducts and baffles.

18. The battery system of claim 17, wherein the pump directs a flow of the thermal fluid through a thermal processing unit before the thermal fluid is provided to the ducts and baffles.

19. The battery system of claim 18, wherein the thermal processing unit comprises: a condenser adapted to cool the thermal fluid; and a heater adapted to heat the thermal fluid.

20. The battery system of claim 19, wherein the condenser is activated when the temperature of the battery system exceeds a predetermined threshold, and wherein the heater is activated when the temperature of the battery system falls below a predetermined threshold.

* * * * *